United States Patent [19]

Ross

[11] Patent Number: 5,929,854
[45] Date of Patent: Jul. 27, 1999

[54] DIALOG BOX METHOD AND SYSTEM FOR ARRANGING DOCUMENT WINDOWS

[76] Inventor: Michael M. Ross, 28/10 Rehov Ruppin, Tel Aviv, Israel, 63457

[21] Appl. No.: 08/565,503

[22] Filed: Nov. 30, 1995

[51] Int. Cl.⁶ ........................................................ G06F 3/00
[52] U.S. Cl. ............................................................ 345/342
[58] Field of Search ...................... 395/326–358

[56] References Cited

U.S. PATENT DOCUMENTS

| | | | |
|---|---|---|---|
| 4,714,918 | 12/1987 | Barker et al. | 345/342 |
| 4,961,070 | 10/1990 | Maher et al. | 345/342 |
| 5,060,170 | 10/1991 | Bourgeois et al. | 345/342 |
| 5,263,134 | 11/1993 | Paal et al. | 345/342 |
| 5,371,847 | 12/1994 | Hargrove | 345/342 |
| 5,459,832 | 10/1995 | Wolf et al. | 345/342 |
| 5,487,143 | 1/1996 | Southgate | 345/342 |
| 5,712,995 | 1/1998 | Cohn | 345/342 |

OTHER PUBLICATIONS

Advanced Interface Design Guide, IBM Corp., pp. 59–87, 95–99, Jun. 1989.

*Primary Examiner*—John E. Breene
*Attorney, Agent, or Firm*—Michael I. Chakansky

[57] ABSTRACT

Methods and systems for optimizing the display and selection of document windows for word processing and desktop publishing in a multiple document interface. Pairs of document windows can be displayed side by side (or above and below) each other according to user preferences and without regard to the number or type of documents that have been opened. The system enables users to work with the same or different views of different documents or with different views of the same document in a highly intuitive and convenient manner.

10 Claims, 30 Drawing Sheets

DIALOG BOX METHOD AND SYSTEM FOR ARRANGING DOCUMENT WINDOWS

A portion of the disclosure of this patent document, including, but not limited to, all the figures and computer code, contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

FIELD OF THE INVENTION

The present invention relates generally to the word processing field. More specifically, this invention relates to the display of multiple documents in sophisticated desktop publishing applications running under graphical user interfaces.

BACKGROUND OF THE INVENTION

The graphical user interface, as exemplified by Microsoft Windows and the Apple Macintosh, enables users to work with more than one application program at the same time. In addition, the individual applications may have the capability of supporting many task or document windows, generally designated by the term "multiple document interface" (or MDI).

In the case of the powerful word processing applications, such as Microsoft Word, WordPerfect, and FrameMaker, the capability of performing independent work in multiple documents is generally considered an essential element of their functionality. It simply means that users do not have to close one file (by writing it from the computer's memory to a permanent storage system) before opening another file (by performing the reverse operation). There are many benefits derived from this, among which are: (i) the ability to switch, or activate, open windows quickly and so work alternately among different documents; (ii) the ability to copy, cut and paste text, graphic images, or other document objects from one window to another; and (iii) the ability to make comparisons between documents and implement revisions among different documents in a flexible manner.

While the multiple document interface offers many advantages over earlier interfaces, such as that provided in DOS-based applications, the potential advantage of this additional functionality of the MDI has not been fully realized in the case of word processing applications for several reasons.

Even though the number of document windows that may be opened is only limited by the resources of the computer hardware and the ability of the operating system and application to utilize these resources; the usefulness of having more than a few document windows open at once is limited by the inability to organize or view them in a useful fashion. In fact, because overlapping windows obscure each other, users typically see and work with just one document window at a time. This window state is described as "maximized." To view another document window, users may select the chosen window from a list, and then view this one in the maximized state. An alternative for users is to use a "tile" command that proportional spaces the windows so that each one occupies an equal amount of the application's work space (or some other space allocation as determined by an algorithm). Although the user exposes all the windows by tiling, the visible area of each document is inevitably reduced so that, in effect, each document is partially hidden in the same way as it would be if the windows were partially overlapping.

Neither maximizing nor tiling is entirely satisfactory when users are working with many document windows. The inadequacy of each method increases in proportion to the number of windows that users have open. In the case of five, 10 or 15 document windows, users can continue to switch from one maximized window to another by means of a list, but it becomes increasingly difficult to identify the document that occupies each window from this list. If users choose to tile the windows, then the amount of space occupied by each window is generally insufficient to work in the document, as most of the text (even on a single line) will be hidden from view without users' having constantly to scroll the window vertically or horizontally.

There are ergonomic considerations concerning the multiple document interface that until now appear to have been overlooked or neglected by word processing applications that are widely used for desktop publishing. These relate to the "preferred" way in which users work with a document. The first consideration deals with the limitations on the utility of a "WYSIWYG" interface and second with the "natural way" to work with multiple documents.

A key feature of sophisticated word processors is a "WYSIWYG" ("what you see is what you get") interface. This means that users see a representation of the document on the computer screen that broadly corresponds in many details (though not all) with the document as it will appear when printed out. This WYSIWYG, or page layout, view of a document window is not necessarily the only view provided by the word processor or even the preferred view in which users work. For example, greater computer system resources are required in this view, and this can reduce the speed of the computer's response to user input as when scrolling and typing, etc.

It is for this reason that word processors typically offer alternative views in which users can work with a document. Among these are a draft, or text mode, and an outline mode. (The draft mode displays text in a monospaced font with virtually no details of the page layout. The outline mode displays the heading levels of a document with or without the text that constitutes the body of the document.) In addition, there is generally a "normal" view in which the text is displayed in the user-selected font(s) and some limited layout information is represented. The normal view represents a trade-off between optimizing use of computer system resources and the accurate representation of the document on the computer screen. This is, generally speaking, the preferred way in which users perform most word processing tasks.

There is a further limitation of the page layout view that is hard to overlook: the vast majority of computer monitors have a physical screen with a horizontal (or "landscape") orientation, whereas the vast majority of documents composed by users in word processing applications have a vertical (or "portrait") orientation, corresponding with the standard page sizes (book, letter, or legal, etc.) This anomaly means that the users with normal eyesight using normally sized computer monitors are unable to see a whole document page in a document window while continuing to compose the document. This is because the magnification of the document in the window has to be reduced to a percentage of frequently less than 50% for users to see a complete page. Since the normal size of a readable typeface is from 10 to 12 points (the range typically used in newspapers and magazines), at 50% magnification the effective point size is reduced to 5 or 6 points at the most. This is the kind of "small print" that is commonly associated with eyestrain in paper documents. On modern computer monitors of up to 17 inches with a Super VGA resolution of 1024 by 768 pixels a significantly better than average screen display type of this size is typically considered difficult or impossible to read. The result is even more exacerbated when the display is rendered on one of the many personal computer monitors of 14 inches many with only a VGA resolution of 640 by 480 pixels.

The WYSIWYG capabilities of sophisticated word processors are, therefore, often underutilized because of the impracticality of working with text of this size. A common and somewhat inconvenient method employed by users is to alternate between the normal and page layout view in the same document window. The utility of this solution decreases as the need to switch views increases. When users are performing detailed page layout work, the need to see the WYSIWYG view of the document on a constant basis becomes almost a necessity.

The second consideration is that work with multiple documents be performed in the "natural way". A general theme of the graphical user interface (and a particular implication of the term "desktop publishing") is the concept that, to a lesser or greater degree, personal computers enable users to work with applications that symbolically duplicate their real desktop environment in the virtual environment of the computer. In fact, it is a fundamental yardstick of a well-designed application that it should present users with a highly intuitive interface, meaning one that can be understood and used with the minimum requirement to learn to think in new and, at first, "unnatural" ways. The success of the Macintosh and of Windows is based on the simplicity of this "virtual desktop" metaphor.

In light of this, it can be inferred that the natural way to work with an application is one that most closely corresponds with the users' familiar environment of the "real desktop." This has very real applicability for word processing applications where almost the complete set of terms and concepts used by these programs has been acquired from the "real world" activities of preparing copy and art for layout and of performing typesetting and printing functions.

There is a particular aspect of the real desktop that appears to be overlooked or neglected by the virtual desktop of word processing applications. Users handling paper documents are likely to store them in a file cabinet; this in analogous with the file management system of the computer. The documents that users are currently working with are likely to be on their desktop; this is analogous with the open document windows in a word processor. Users may pile the current documents on top of each other or strew them across the desktop; this is analogous with the current document window being maximized and the remaining windows being hidden beneath it or with tiling all the document windows. However, users are likely to arrange the documents in some way that makes it fairly quick and easy for them to pick up the documents they need. This is where the analogy with word processing applications breaks down. In addition, when working with related documents, users may often want to place documents next to each other, and, in the case of making detailed comparisons between them, it is most likely users will want to place the documents side by side.

There may be a reason why it may be more natural to place documents side by side, rather than in another configuration, such as above and below or partially overlapping each other. The reason is that when documents are placed side by side, readers require less eye movement to scan between lines of text, which can be kept in parallel, and it also makes it far easier to keep their place in both documents. These factors have long been recognized by professional proofreaders, who invariably prefer to work with narrow columns of typeset material and will generally place the typeset material to one side of the original manuscript if a comparison is required.

The side-by-side placement of windows is an existing capability of some applications using the multiple document interface, such as the File Manager of Windows for Workgroups. The command that produces this result is usually called "Tile Vertically"; its action is to space equally along the horizontal plane of the application work space all document windows that are not minimized (reduced to their minimum size). For example, if there are two windows, each will occupy half the application work space; if there are five, each will occupy one-fifth of the work space. Unlike the present invention, such a command, even if available, is of little value in word processing applications because it gives users no control over which document windows to arrange and does not wrap the text in each window.

SUMMARY OF THE INVENTION

It is the principle objective of the present invention to enhance the utility of the multiple document interface system for word processing applications. This objective is accomplished by providing a convenient method for users to select and work with two document windows at the same time. These two windows can be for any two of as many documents as users have opened at one time or they may be of the same document. In fact, in accordance with the present invention, a virtually unlimited number of windows can be organized in the side-by-side (or above-and-below) configurations. Each window maintains its size and position until it is actively changed, so that users can expect to find the same window in the same position even when switching windows in the normal fashion.

Moreover, the present invention provides for an application whose functionality provides the user with an interface which exhibits more consistent behavior than some of the windowing-related functions of current word processing software applications.

In order to address the problems associated with prior art methods and apparatus, the present invention provides several capabilities.

The capability to switch selectively from one document to another without the list of open windows automatically closing after each selection. According to Microsoft interface standards available to the inventor, the list of windows is displayed beneath the Window menu on the menu bar of an MDI application. The present invention does not replace this, but supplies its own list of windows accessible from a single "dialog box" interface that is opened by its own command in the Window menu and remains open when switching windows.

The capability to select any two windows to display side by side (or above and below) each other quickly and intuitively. Users can select any open document window to display side by side (or above and below) the "active" document, which is defined as the window that is currently accepting user input, by making only one selection from the list. This capability also means that users only have to decide about the position of one of the two documents windows for the system to position and size both windows correctly. This capability also means that users can use the system to arrange any number of windows to one side (or above or below) the active document and can switch between them normally, leaving the active document in the same position.

In the side-by-side state, an additional capability of a preferred embodiment of the present invention is that the text is automatically wrapped in each window so that users do not have to scroll the document windows horizontally. Combined with this feature is the corresponding capability to unwrap the text automatically when the windows are maximized or displayed above and below each other.

Another capability is the ability to view two windows of the same document side by side (or above and below) each other, so that users can work in different parts or different views of either window at the same time. For example, the active window can be in the normal view (referred to above), while the second window can be in the page layout or outline view. This enables users to work with the document text at any magnification in the normal view window, while continuing to see a complete dynamically changing representation of the page layout in the other window. Of particular benefit is the fact that, when a word processing application is maximized in the horizontal rectangle of the physical screen and two windows are displayed side by side within it, each window is a vertical rectangle approximating the shape of a typical paper document. The system automatically selects the normal view and a magnification of 100% for both document windows.

In another preferred embodiment of the present invention, there is the capability to see a representation of a document window before switching to this window.

In this embodiment, there also exists the capability to display individual quarter- and half-sized windows if required.

In this preferred embodiment, there also exists the capability to display the application window of the word processor side by side (or above or below) a different application window. The active document window is shown maximized (with the text wrapped within it in the side-by-side configuration) in the application window of the word processor. This capability makes it more easy for users to perform word processing tasks that require the use of other applications, such as when linking and/or embedding objects from spreadsheet or image management programs.

BRIEF DESCRIPTION OF THE DRAWINGS

The file of this patent contains at least one drawing executed in color.

FIG. 11 shows the effect on the Word 6.0 application after the user chooses "OK" when the first embodiment's interface resembles FIG. 7 (when "Left" is selected).

FIG. 18 shows the effect on the Word 6.0 application and the interface of the second embodiment after choosing "Activate".

DETAILED DESCRIPTION OF PREFERRED EMBODIMENTS

Two preferred embodiments of the invention are presented in detail with reference to the drawings. These embodiments are programmed for and function as extensions of Microsoft Word for Windows. The present invention, however, is not limited to any particular word processing application or any particular operating environment. Those skilled in the art will find that the system and methods of the present invention may be advantageously applied to any word processing application in any operating environment and to any other application that requires the ease of selecting and comparing pairs of document windows. Therefore, the description of the preferred embodiments which follows is for purposes of illustration and not limitation.

Figure 1:
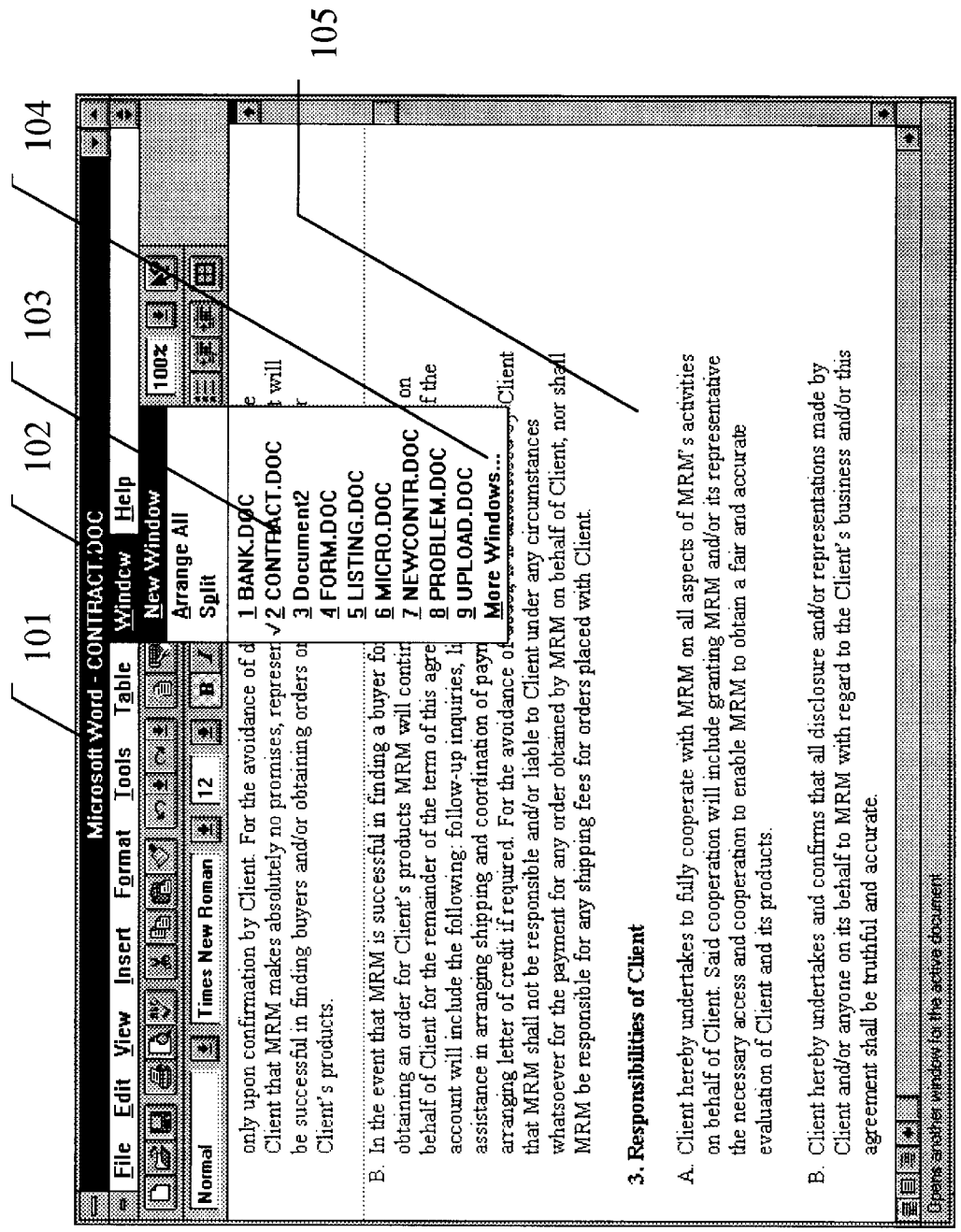
FIG. 1 shows the application window of Microsoft Word 6.0 for Windows with the Window menu displayed and the active document maximized.

FIG. 1 shows the application window of Microsoft Word 6.0 for Windows in its standard configuration with menu bar and the standard and formatting toolbars visible. The Window menu 102 is open and lists in alphabetic order the open windows. The windows are identified by a number and the name of the file they contain.

In this particular example, the open windows number more than nine, which means the user cannot see or select from the complete list without selecting More Windows 104 to open the Activate dialog box. The name of the active window is checked in the window list 103. Because the window is maximized in the application window, its file name is appended to the application title bar 101.

Figure 2:
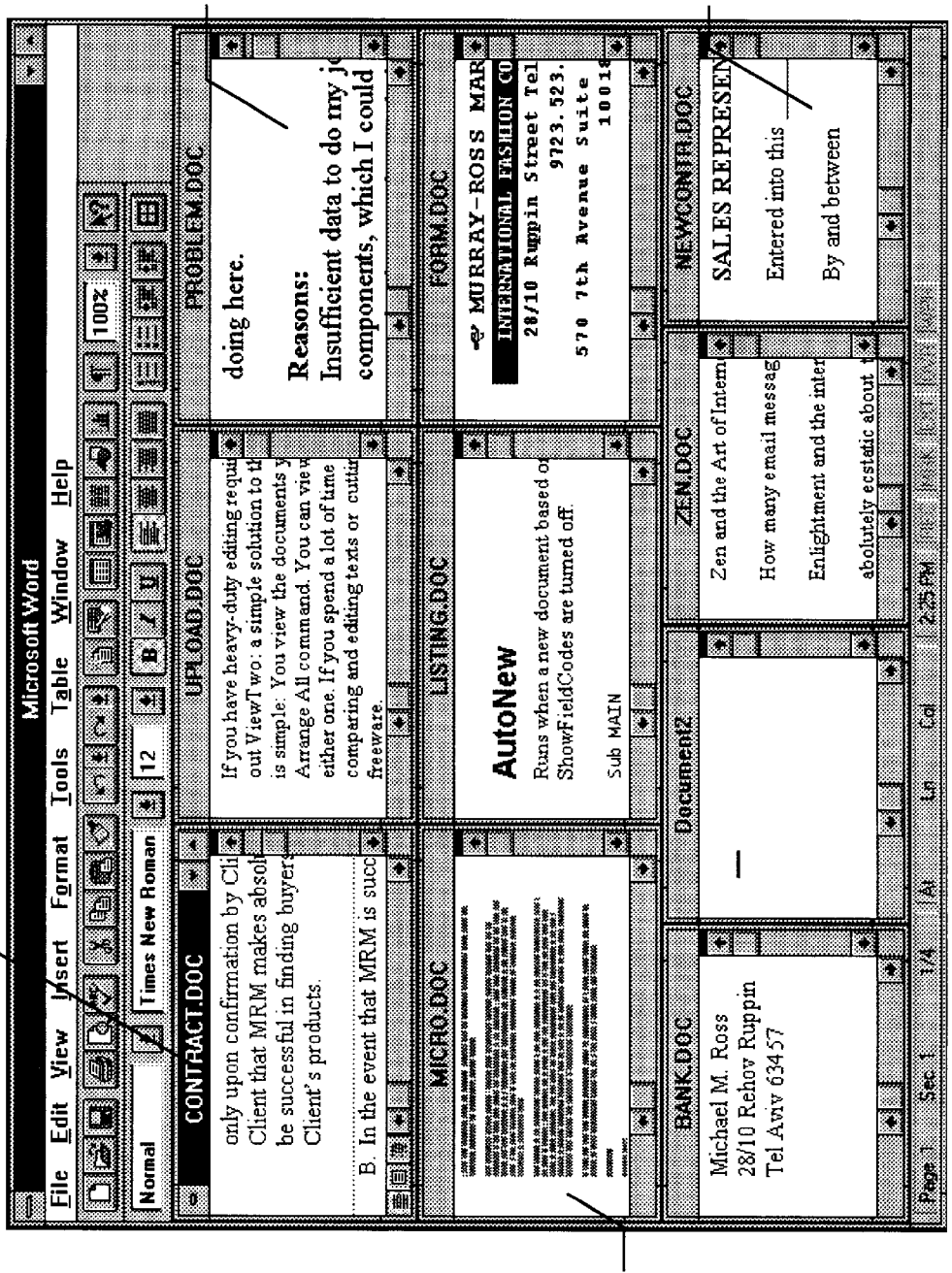
FIG. 2 shows the application window of Word 6.0 after applying the Arrange All command.

FIG. 2 shows the results of choosing the "Arrange All" command in Window menu 102. All open windows are tiled with the active window 201 in the top-left corner. The text is not wrapped in the tiled windows. Singe lines are not visible as in windows 202 and 203 unless the magnification makes the type illegible as in window 204.

Figure 3:
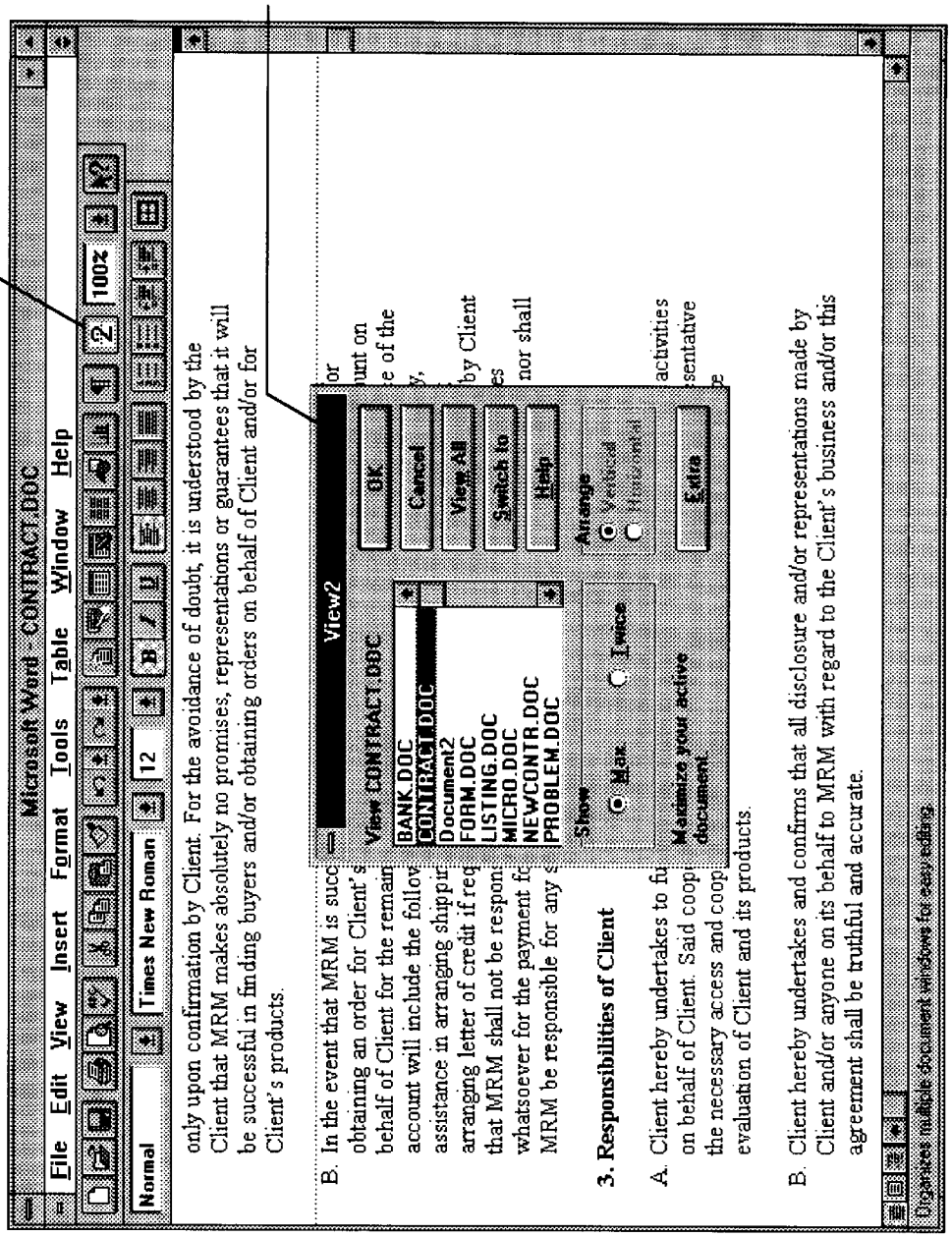
FIG. 3 shows the dialog box interface of the first embodiment after opening it in the application window.

FIG. 3. shows the Word 6.0 application window with the addition of the first embodiment of the invention after opening the dialog box interface 302 by clicking its toolbar button 301. The details of the first embodiment's interface are shown in FIG. 4.

Figure 4:
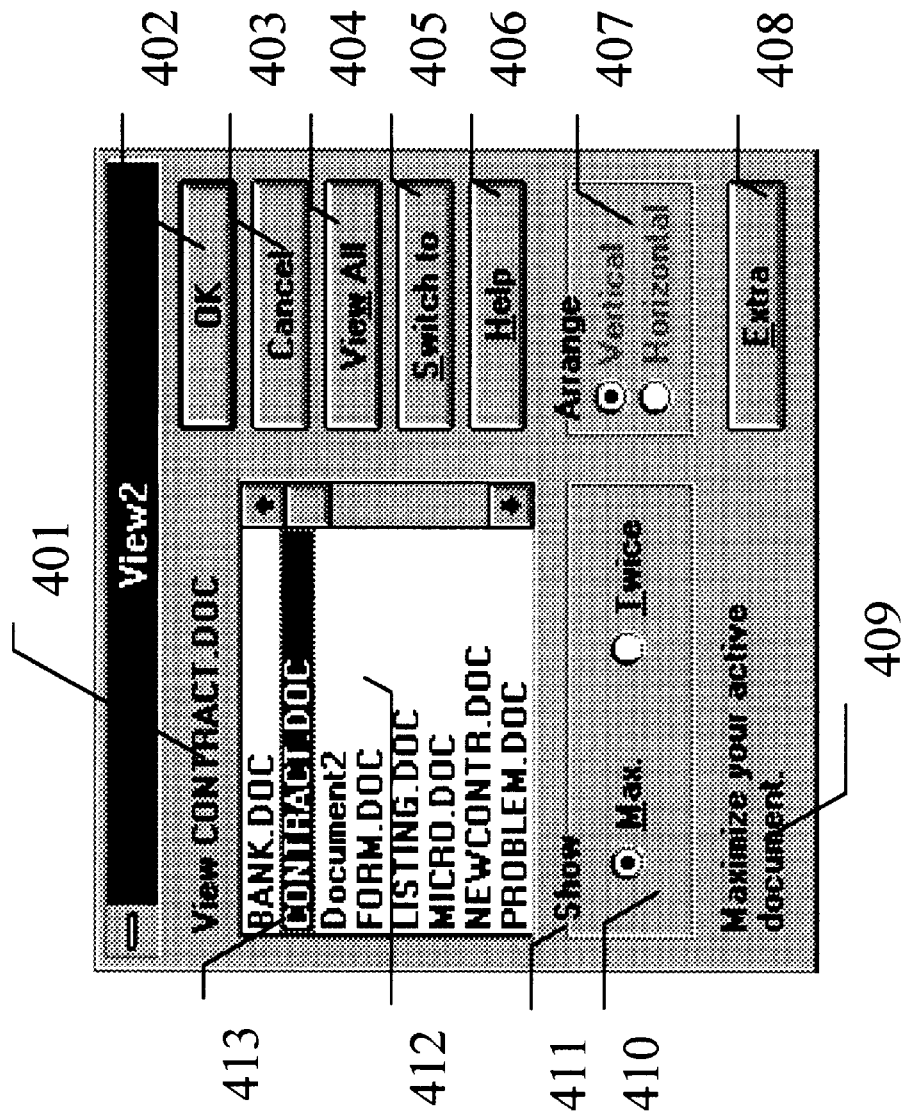
FIG. 4 shows the initial state of the dialog box interface of the first embodiment.

FIG. 4 shows the initial state of the dialog box interface of the first embodiment. The main features of this are dynamic text 401, 409 and 411; list box 412, option button groups 407 and 410; and command buttons 402 through 406 and 408.

Dynamic text 401 initially displays the name of the file occupying the active window. List box 412 displays the names of the files occupying all the open windows in alphabetic order. The name of the active window s file is initially highlighted 413. Dynamic text 411 initially says "Show" only. Option buttons 410 initially say "Max." (meaning Maximize) and "Twice." Option buttons 407, which are initially disabled, say "Vertical" and "Horizontal."

If the user chooses "OK" 402 with the interface in this state, the dialog box closes, the active window is maximized (remaining the active window), and the text in all open documents is unwrapped.

Figure 5:
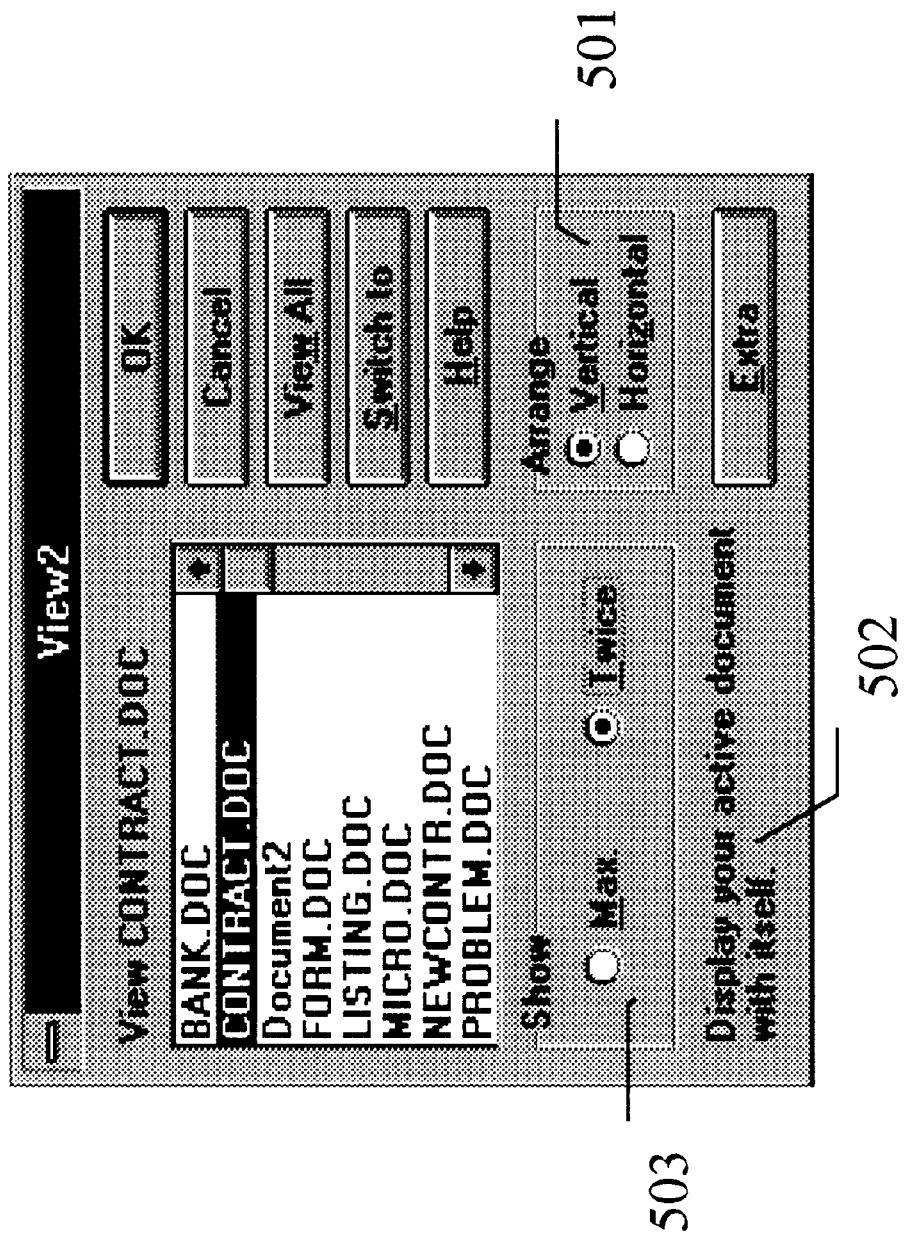
FIG. 5 shows the interface of the first embodiment after the user selects "Twice".
Figure 6:
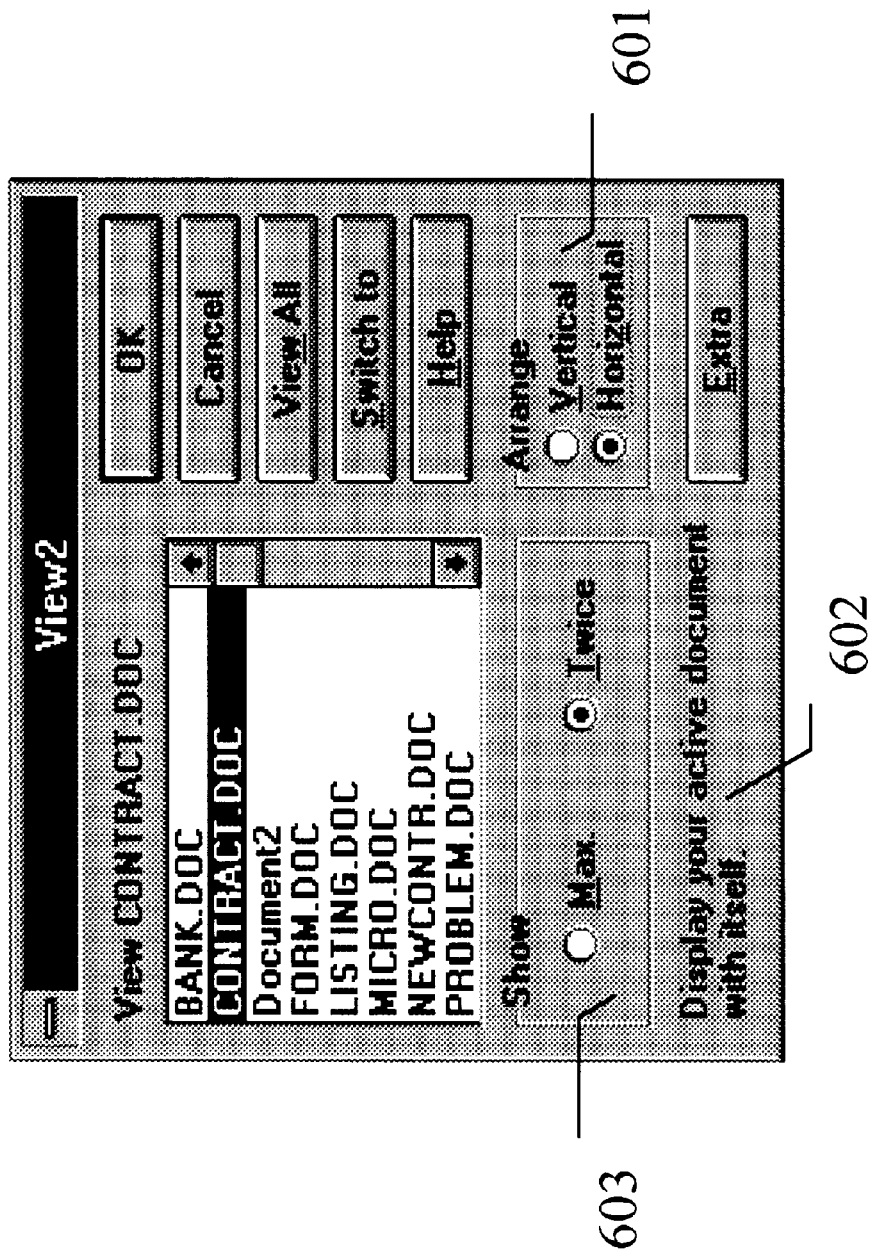
FIG. 6 shows the interface of the first embodiment after the user selects "Twice" and "Horizontal".

If, instead of choosing "OK," the user chooses "Twice" while the active document is selected, the interface shown in FIG. 5 results. Dynamic text 502 says "Display your active document with itself." Option group 501 becomes enabled. In FIG. 6, the user has chosen "Horizontal" option 601 after choosing "Twice."

Figure 10:
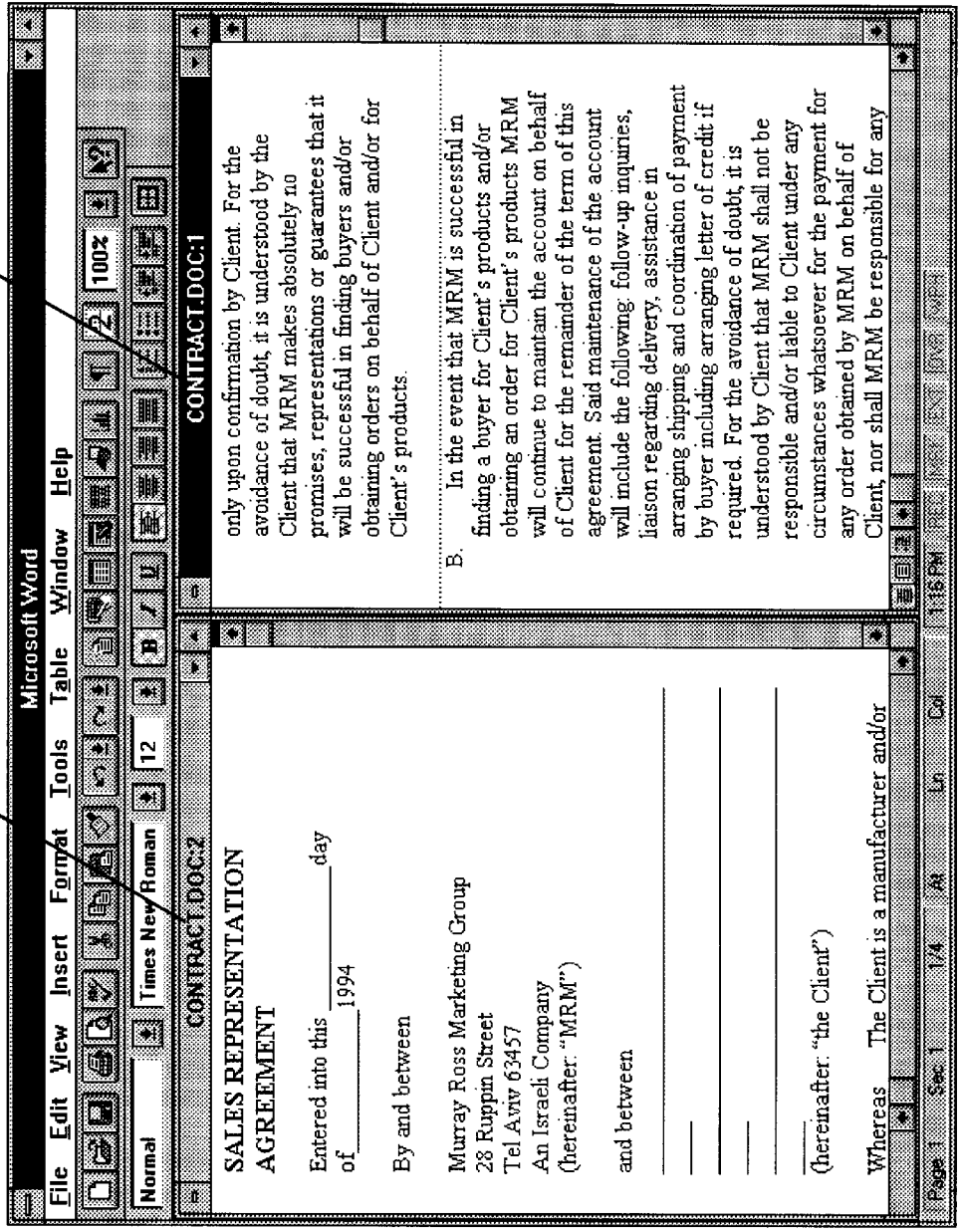
FIG. 10 shows the effect on the Word 6.0 application after the user chooses "OK" when the first embodiment's interface resembles FIG. 5 (when "Twice" is selected).

If the user chooses "OK" when the dialog box interface is in the state shown in FIG. 5 or FIG. 6 (that is, "Twice" is chosen), a new window of the active document is created. If the user chose "Vertical", the new window is displayed to the left of the active window as shown in FIG. 10. The document windows 1001 and 1002 are zoomed to 100% and the text in each window is wrapped. If the user chose "Horizontal", the new window is displayed to the top of the active window. The documents are zoomed to 100% and the text in each window is unwrapped.

Figure 13:
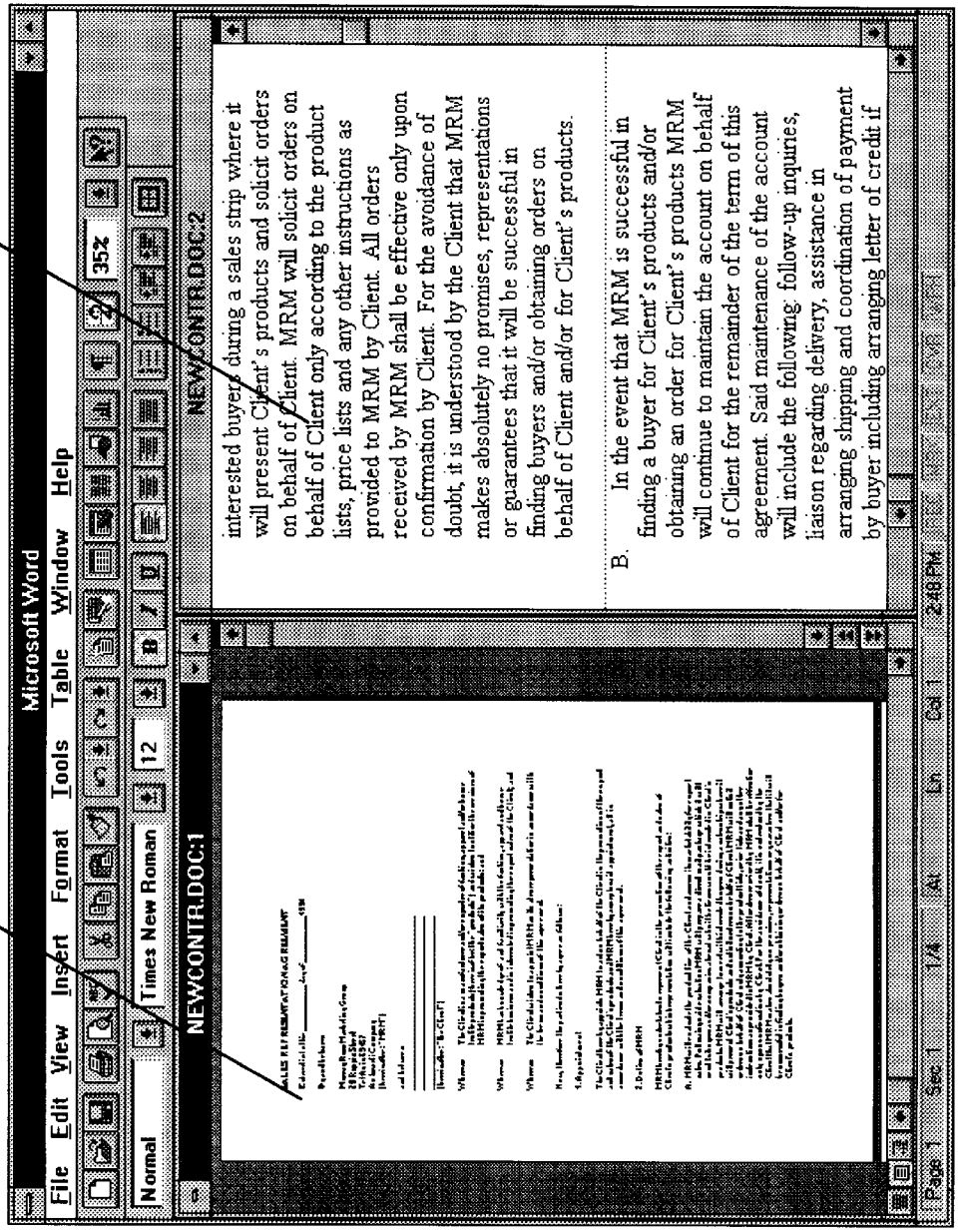
FIG. 13 shows the effect of choosing the layout view in one window after using the invention to view the same document side by side with itself.

FIG. 13 illustrates that, in accordance with the present invention after using the system to display the same document window twice, the user can switch views in the windows to great advantage. In this case, the user has switched the window on the left side to layout view 1301 and reduced the magnification to see a complete page. Note that the proportions of the windows in the side-by-side configuration are close to that of a typical paper document (in portrait orientation). The user can continue to do detailed editing work in the window on the right side in normal view 1302. Any changes the user makes in the normal-view window are reflected in the layout-view window, and vice versa.

Figure 7:
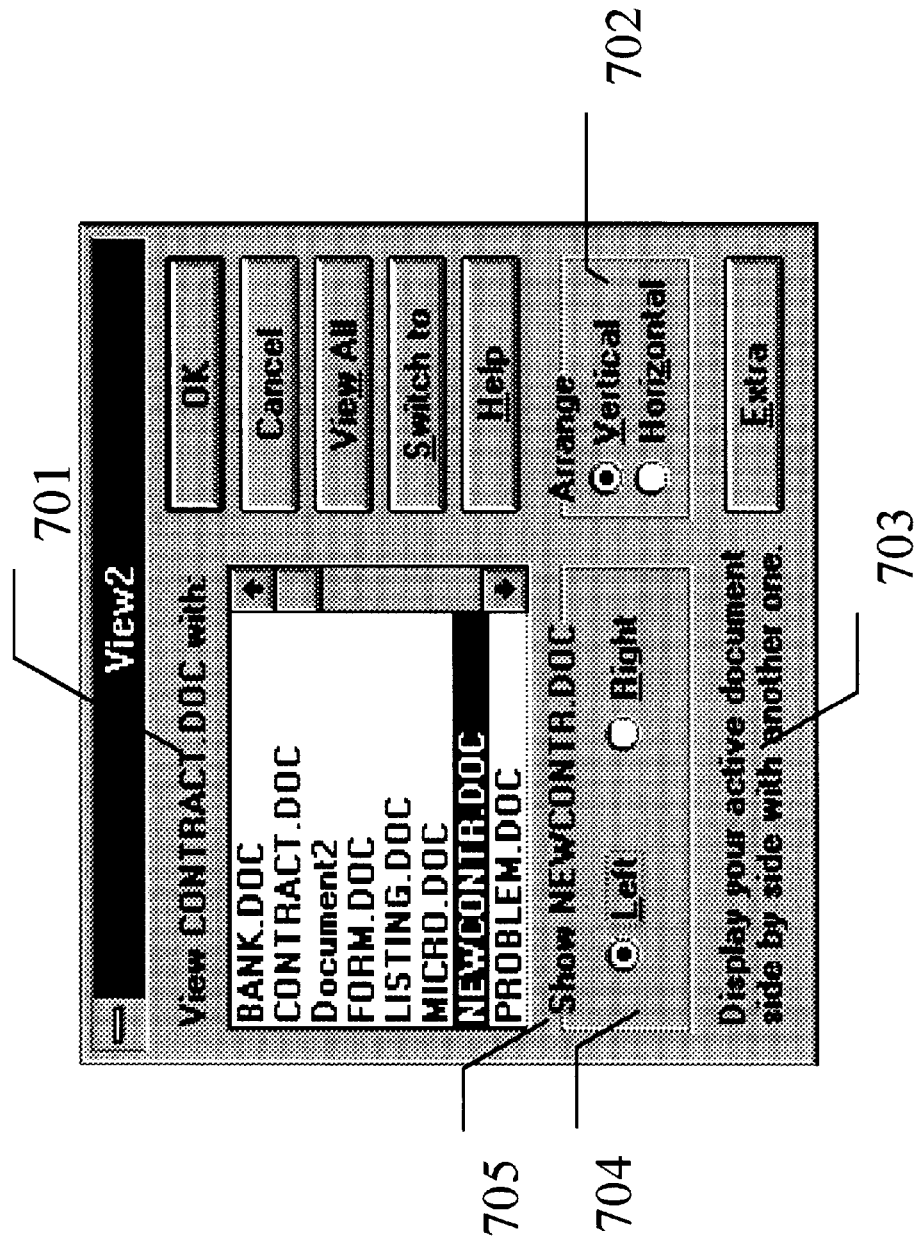
FIG. 7 shows the interface of the first embodiment after the user selects another file from the list box.

If, O before choosing "K", the user chooses another file from the list box, the state of the dialog box interface changes to that shown in FIG. 7. Dynamic text 701 includes the word "with:", indicating that the file name here will be displayed with the one selected in the list box; dynamic text 705 shows the name of this selected file; dynamic text 703 says "Display your active document side by side with another one." Option button group 704 changes to "Left" and "Right". Option button group 702 is enabled. If the user then chooses "Horizontal" from option group 702, the state of the dialog box interface changes to that shown in FIG. 8. Option button group 804 changes to "Top" and "Bottom". Dynamic text 803 says "Display your active document above or below another one."

Figure 8:
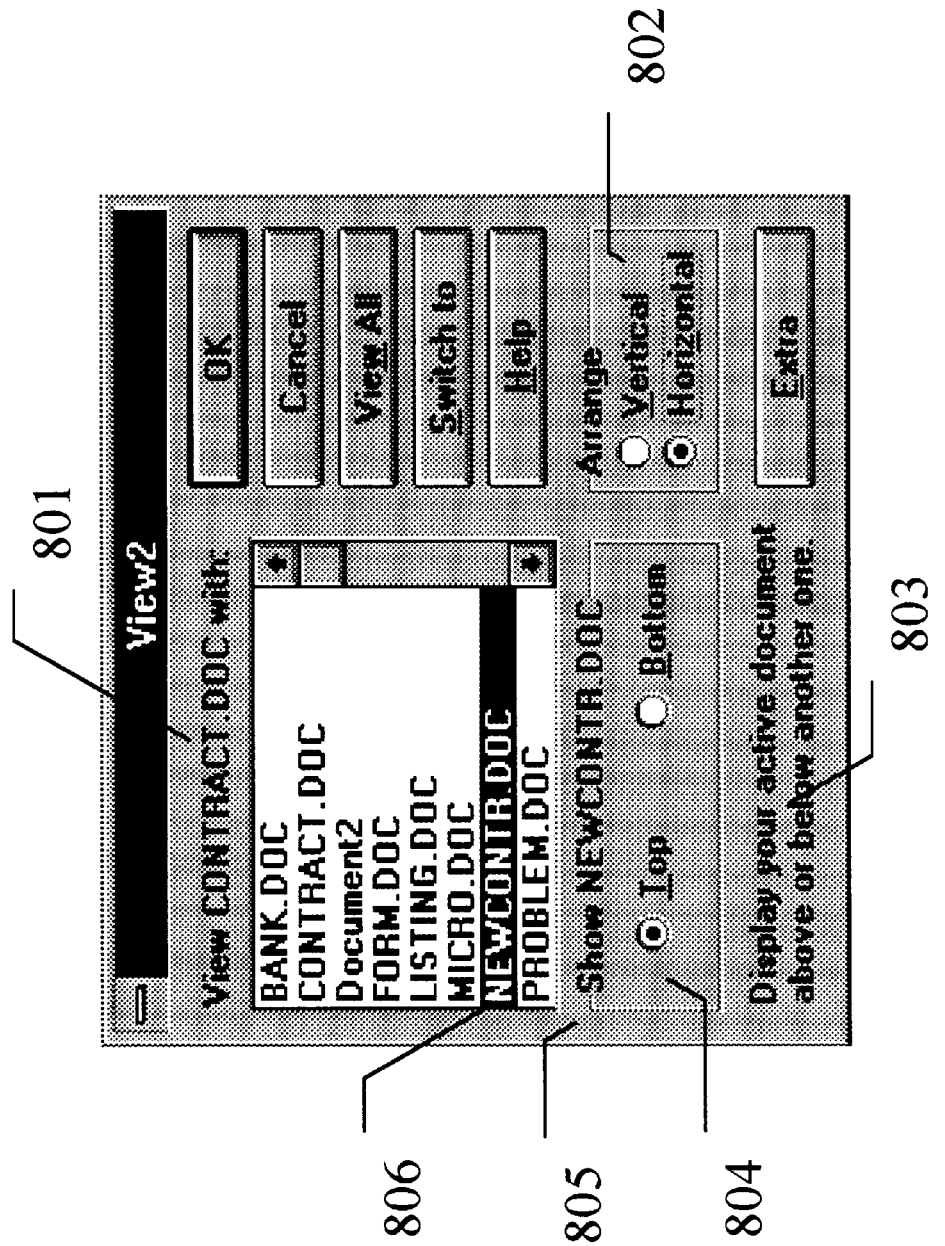
FIG. 8 shows the interface of the first embodiment after the user selects another file from the list box and chooses "Horizontal".

If the user chooses the "OK" command button when the dialog box interface is in the state shown in FIG. 7 or FIG. 8 (that is, after choosing a file other than the file contained in the active window from the list box), the dialog box closes and the active window is displayed with the selected file's window.

Figure 11:
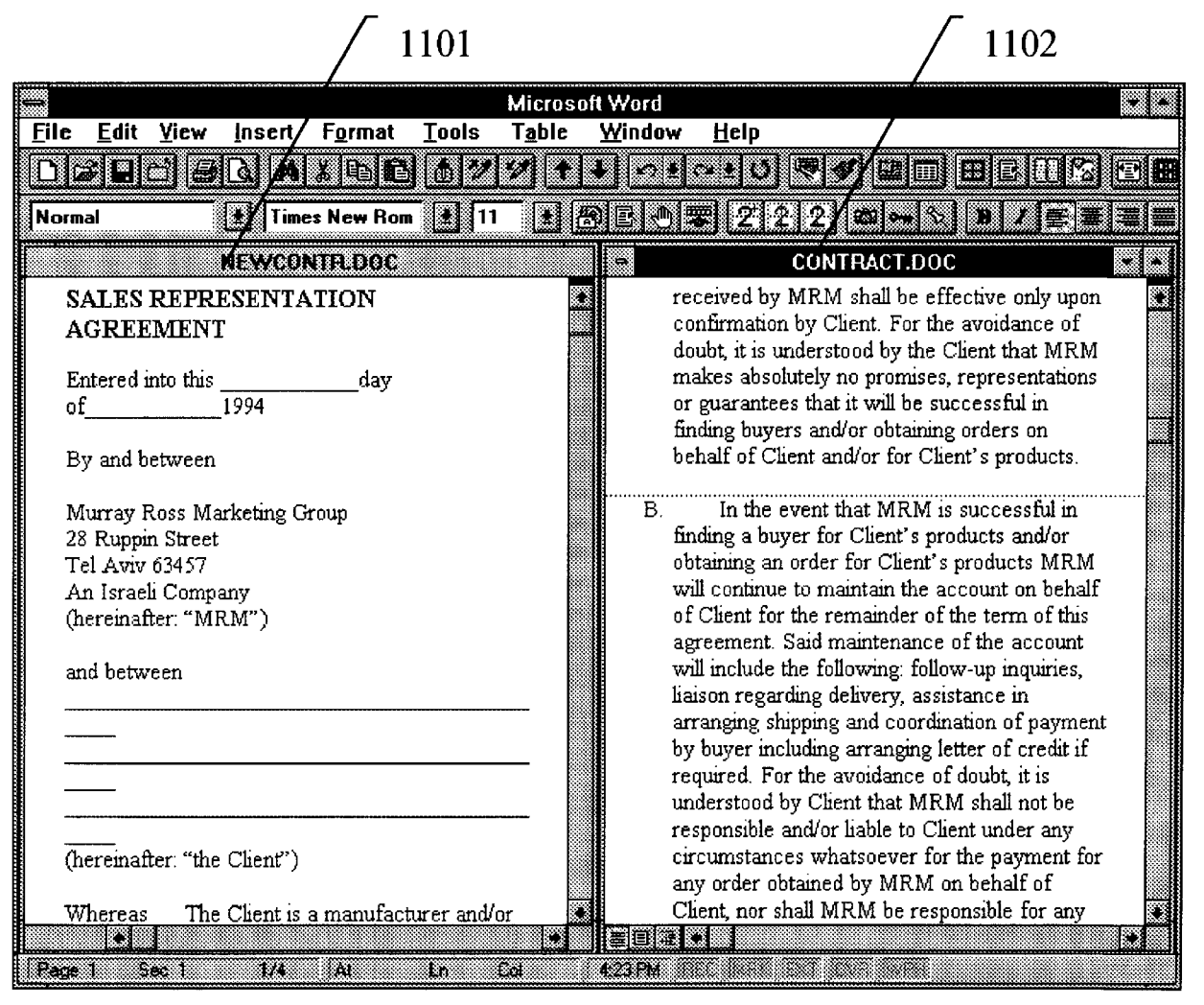

If the user chooses "Left" or "Right", meaning that "Vertical" was also chosen, the selected window is displayed to the left or right of the active window. If the user chooses "Left", the selected window 1101 is displayed to the left of the active window 1102 as shown in FIG. 11. The document windows are zoomed to 100% and the text in each window is wrapped. If the user chooses "Right", the selected window is displayed to the right of the active window. (The document windows are similarly zoomed to 100% and the text in each window is wrapped.)

Figure 12:
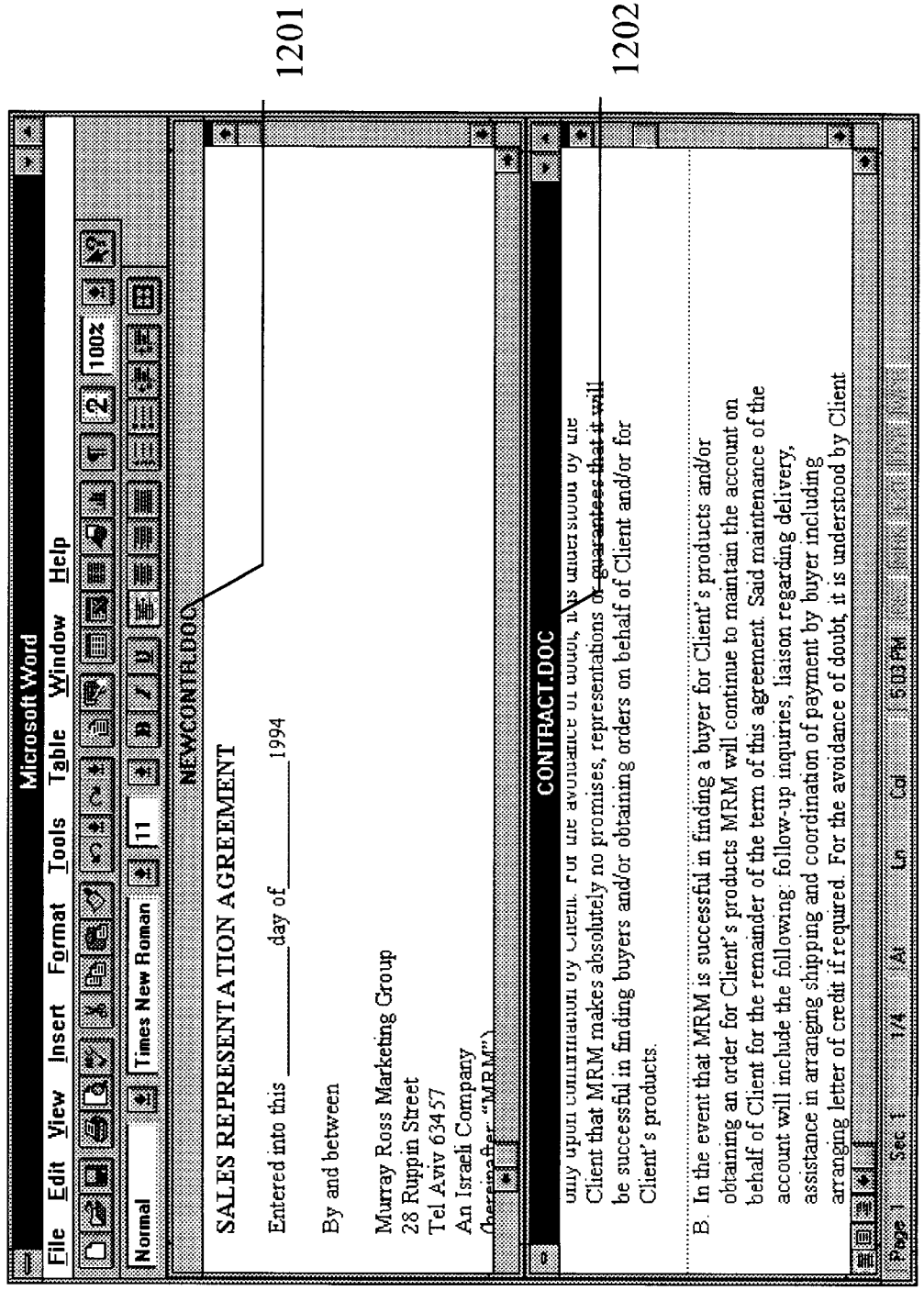
FIG. 12 shows the effect on the Word 6.0 application after the user chooses "OK" when the first embodiment's interface resembles FIG. 8 (when "Top" is selected).

If the user chooses "Top" or "Bottom", meaning that "Horizontal" was also chosen, the selected window is displayed above or below the active window. If the user chose "Top", the selected window 1201 is displayed above the active window 1202 as shown in FIG. 12. The document windows are zoomed to 100% and the text in each window is unwrapped. If the user chose "Bottom", the selected window is displayed below the active window. (The document windows are similarly zoomed to 100% and the text in each window is unwrapped.)

Figure 9:
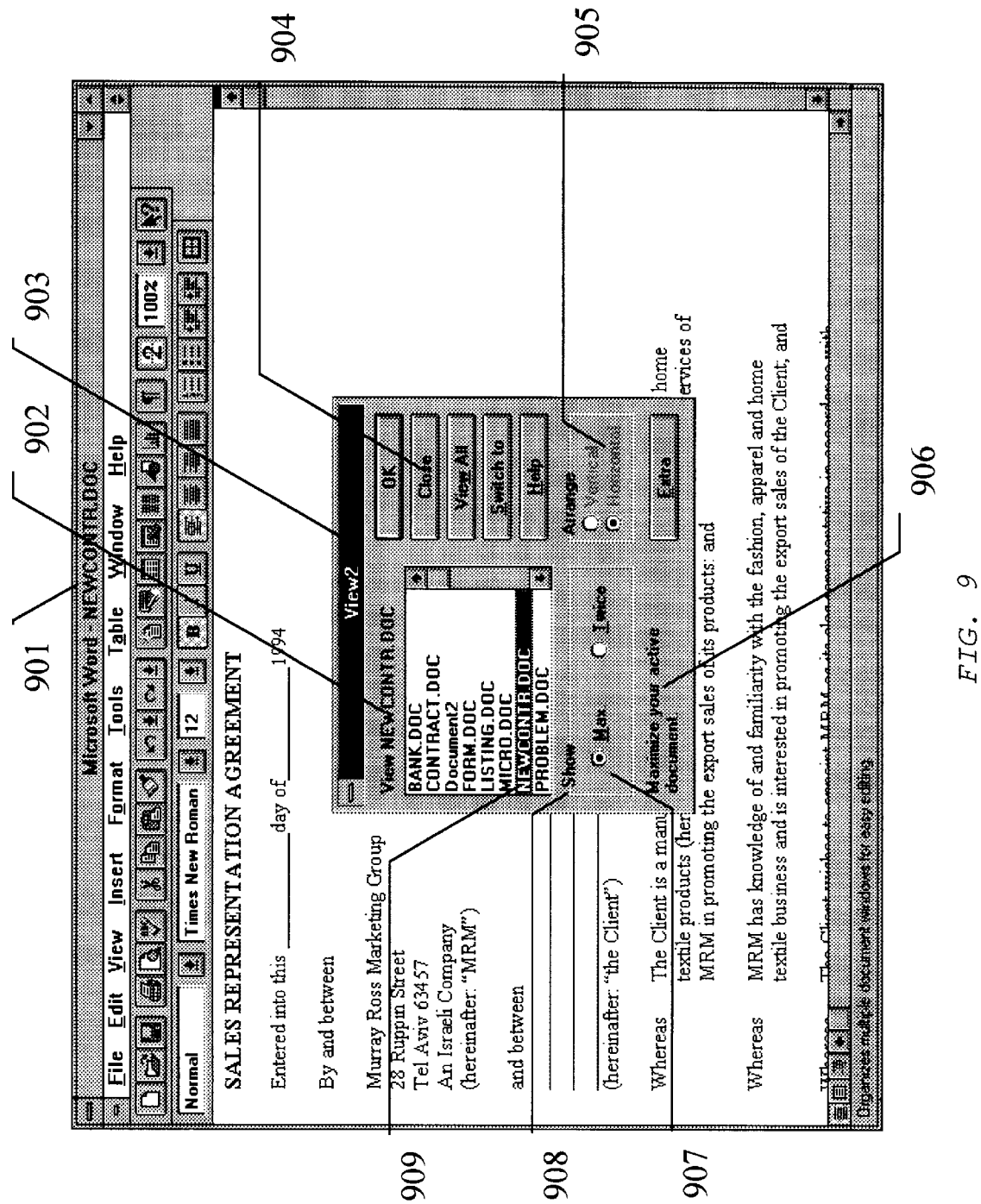
FIG. 9 shows the effect on the Word 6.0 application and the interface of the first embodiment after selecting another file from the list box and choosing "Switch to".

If the user chooses the "Switch to" command button 405 when the dialog box interface is in the state shown in FIG. 7 or FIG. 8 (that is, after choosing a file other than the file contained in the active window from the list box), the window containing the file selected by the user in the list box is activated 901 and appears on top of the other document windows while the dialog box 903 interface remains open, as shown in FIG. 9. The newly activated window can be in the maximized, minimized, or "restored" (an intermediate size) state whichever state it was in before being activated.

The dialog box is updated to show that the document window that has been switched to is now the active document. Dynamic text 902 shows the name of the file; the name 2of the file is highlighted in list box 909. Dynamic text 908 says "Show" only. Option button group 907 says "Max." and "Twice". Option button group 905 is disabled. The "Cancel" button text becomes "Close" 904 to convey to the user that switching the active window is not reversible by canceling or "escaping" (for example, pressing the Esc key) from the dialog box.

The present invention utilizes the dynamic updating of dialog box controls to present the simplest interface for the user and the algorithm for sizing and positioning two of any number of windows.

Figure 29:
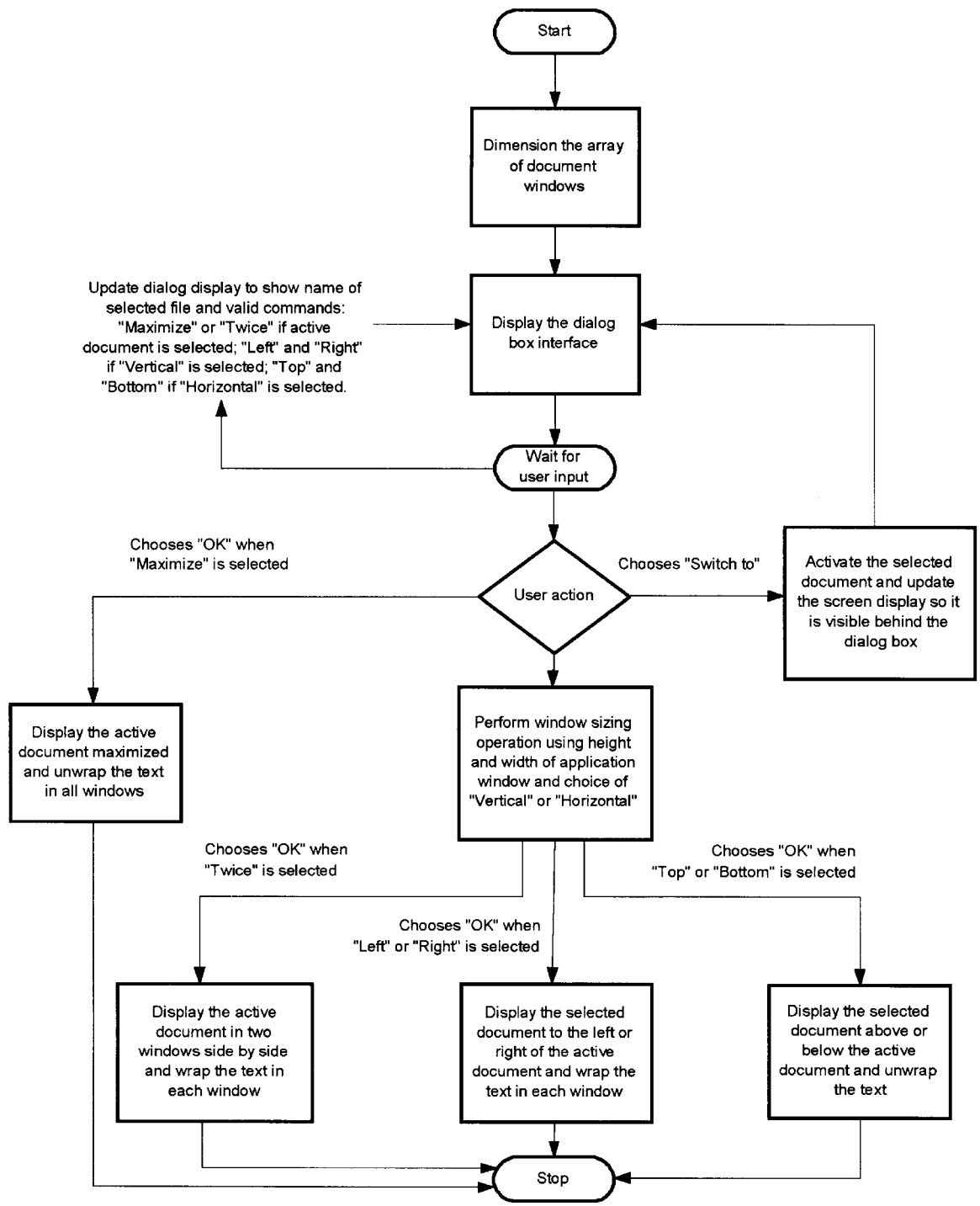
FIG. 29 shows a flow chart of one preferred embodiment of the present invention.

With reference to the flowchart in FIG. 29, the method of the first preferred embodiment involves the following actions. Dimensioning the array of document windows and storing the active and selected windows. Displaying the dialog box interface. Enabling the dynamic updating of the dialog interface. Activating another window while keeping the dialog box open. Performing the window sizing operation. The WordBasic code which implements one preferred version of the first embodiment is set forth in the Source Code Appendix at Section III under the title "A First Preferred Embodiment—View2198 ". This implementation works with both Word 6 and Word 7 as no API calls are used.

The WordBasic code appearing in the Source Code Appendix (at I.A.) under the title "DIMENSIONING THE ARRAY OF DOCUMENT WINDOWS AND STORING THE ACTIVE AND SELECTED WINDOWS" illustrates one method for dimensioning the array of document windows and storing the name and number of the active and selected windows in accordance with the present invention. Note that it is not sufficient to use the names of windows to identify them, since there can be identically named windows open with different paths. Variables are defined both for the window names and their number in the window list.

The WordBasic code appearing in the Source Code Appendix (at I.B.) under the title "DISPLAYING THE DIALOG BOX INTERFACE" illustrates the method for displaying the dialog box interface. Note that some dialog controls are hidden when the dialog box is initialized; other controls have variable names that are specified by statements in a dialog function illustrated in the third code sample.

The WordBasic code appearing in the Source Code Appendix (at I.C.) under the title "ENABLING THE DYNAMIC UPDATING OF THE DIALOG INTERFACE" illustrates the method for enabling the dynamic updating of the dialog interface. Note that this dialog function contains statements that alter the controls in the dialog box definition shown in the previous sample.

The WordBasic code appearing in the Source Code Appendix (at I.D.) under the title "ACTIVATING ANOTHER WINDOW WHILE KEEPING THE DIALOG BOX OPEN" illustrates the method for Activating another window while keeping the dialog box open and updating its controls.

The WordBasic code appearing in the Source Code Appendix (at I.E.) under the title "PERFORMING THE WINDOW SIZING OPERATION" illustrates the method for performing the window sizing operation.

Figure 14:
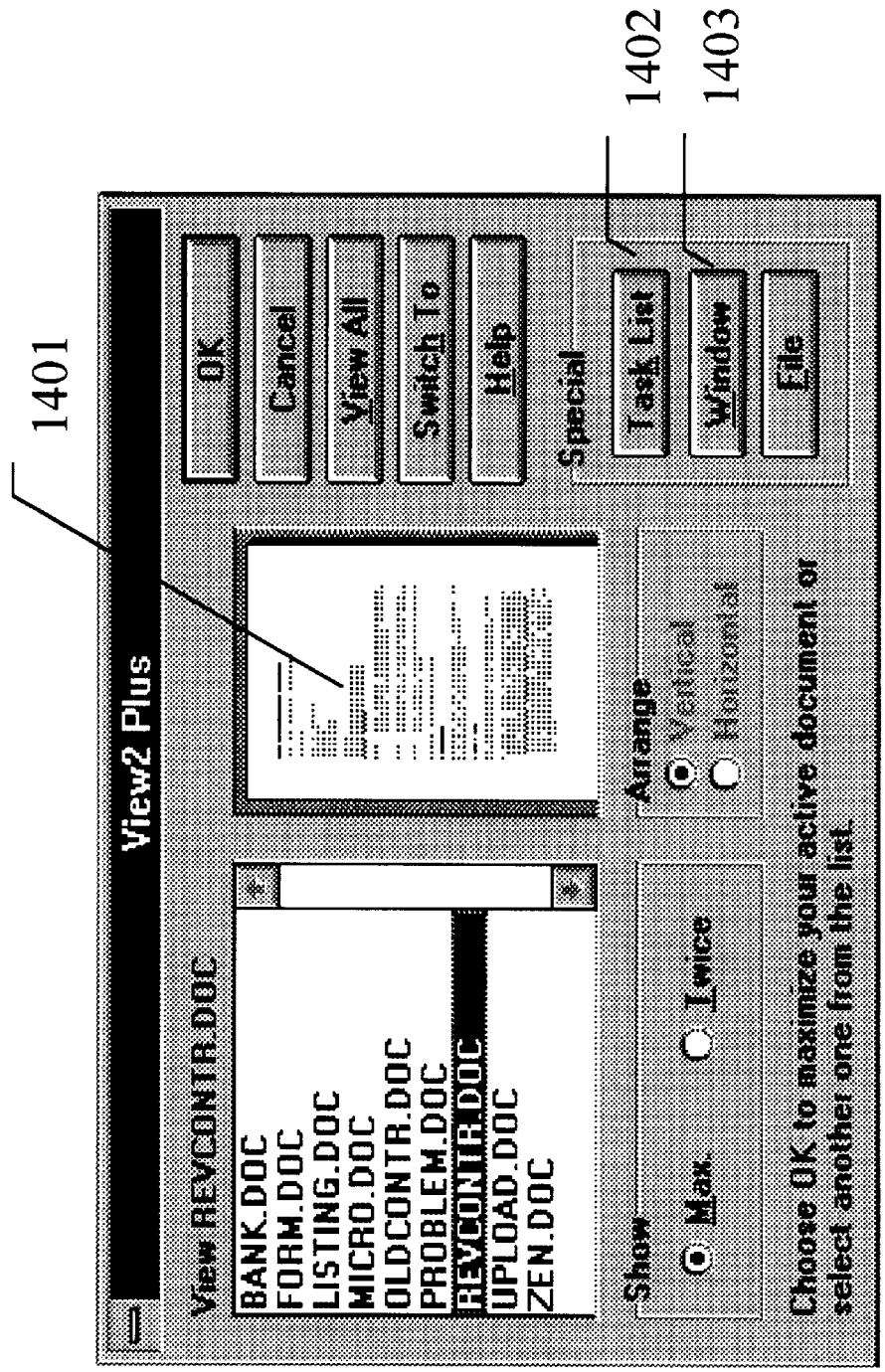
FIG. 14 shows the initial state of the dialog box interface of the second embodiment.

FIG. 14 shows the initial state of the dialog box interface of the second embodiment. The main additional features to the initial state of the interface (as compared with that of the first embodiment already described) are box 1401, which graphically previews a document window, and command buttons "Task List" 1402 and "Window" 1403.

Preview box 1401 initially displays the first page of the active document, which is the file preselected in the list box. This graphical representation provides a very small representation of the layout view of a document. It is meant purely as a visual cue to the content of the document.

Figure 15:
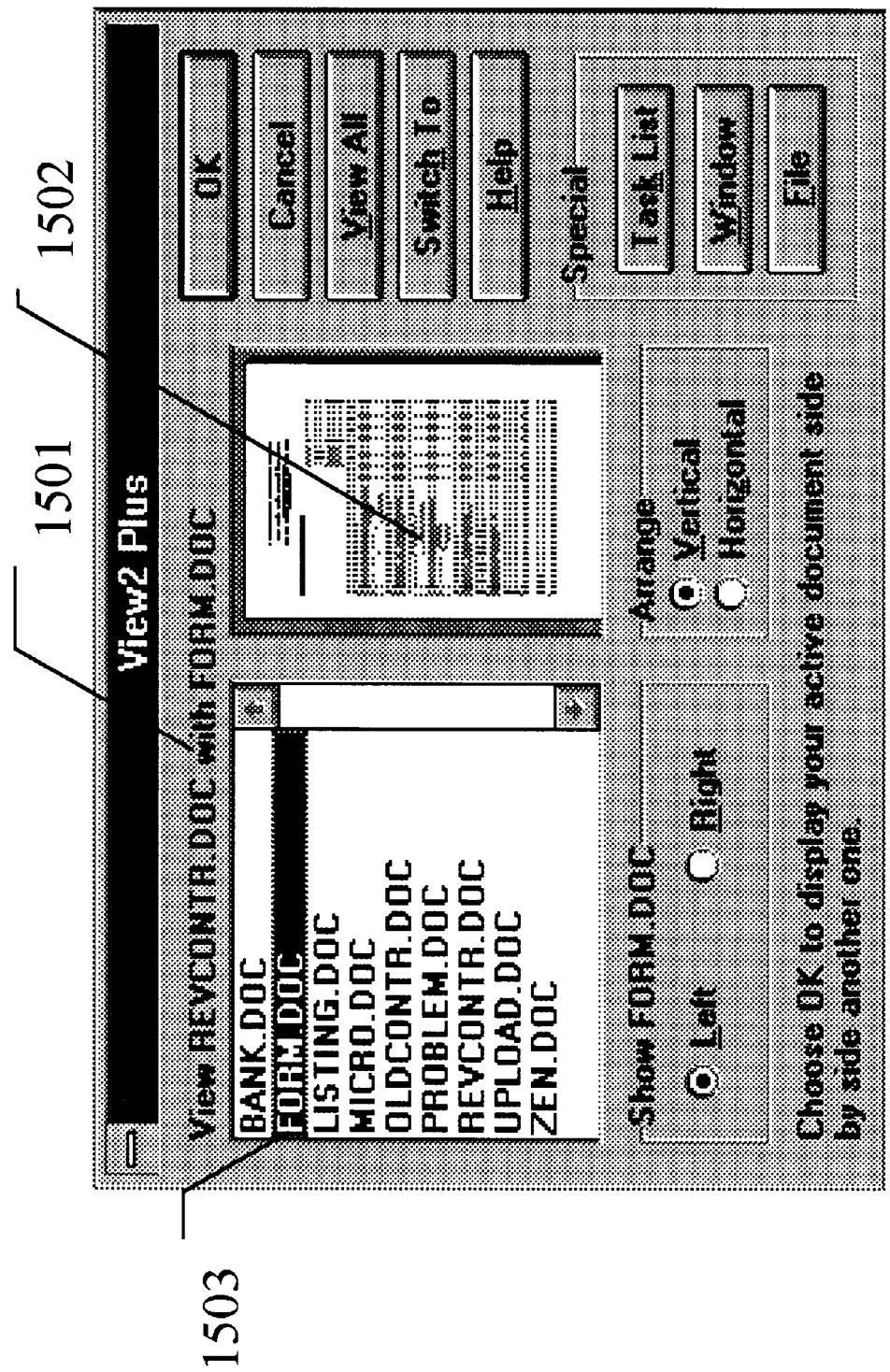
FIG. 15 shows the interface of the second embodiment after the user selects another file from the list box.

When the user selects another file from the list box, the dialog box interface resembles FIG. 15. The preview box displays the first page 1502 of the selected document 1503. Therefore, the user can maintain a visual association between any file name in the list box and the visual content of this file without having to make the selected file the active document by choosing the "Switch To" command button.

An additional feature show in FIG. 15 is the appearance of dynamic text 1501 after selecting another file from the list box. The dynamic text provides the name of the active file with the name of the selected file. This lets the user readily see what document windows will be shown together if the user chooses "OK".

Figure 16:
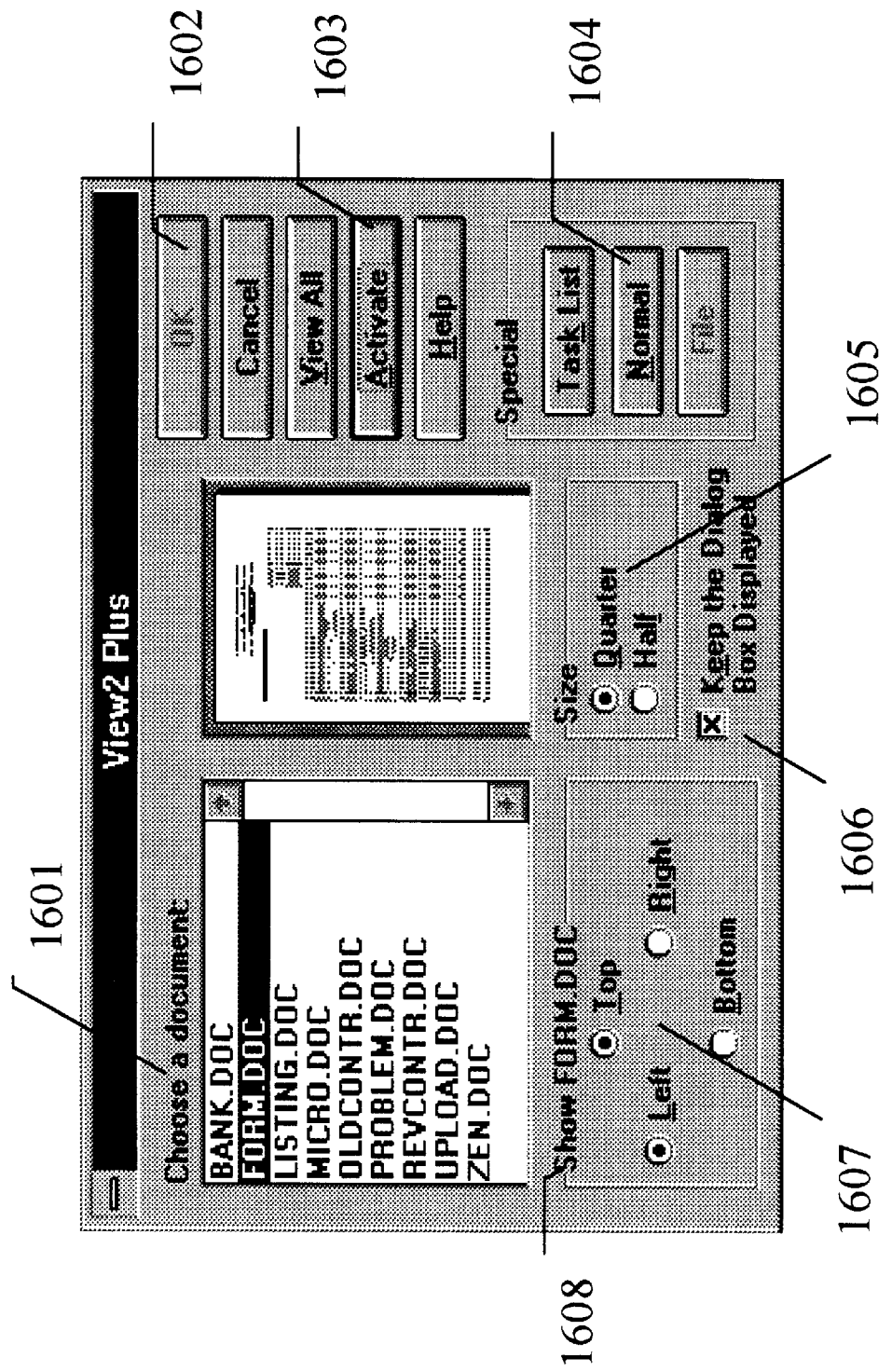
FIG. 16 shows the interface of the second embodiment after the user chooses the "Window" command button.

FIG. 16 shows the state of a second embodiment's interface when the user chooses "Window" 1403. The name of the command button becomes "Normal" 1604, indicating that choosing the button returns the dialog box interface to its normal state. Dynamic text 1601 reads "Choose a document:". Dynamic text 1608 includes the name of any file the user selects in the list box. Option group 1607 displays four options arranged to correspond with the labels (clockwise from top) "Top", "Right", "Bottom", and "Left". Option group 1605 is relabeled the "Size" group and contains two options: "Quarter" and "Half".

In addition, there is a check box 1606 beneath it labeled "Keep the Dialog Box Displayed", and command button 1603, which now is labeled "Activate" (instead of "Switch to") is the default button of the dialog box interface (meaning that it will respond to the user's pressing Enter on the keyboard). "OK" button 1602 is disabled.

Figure 17:
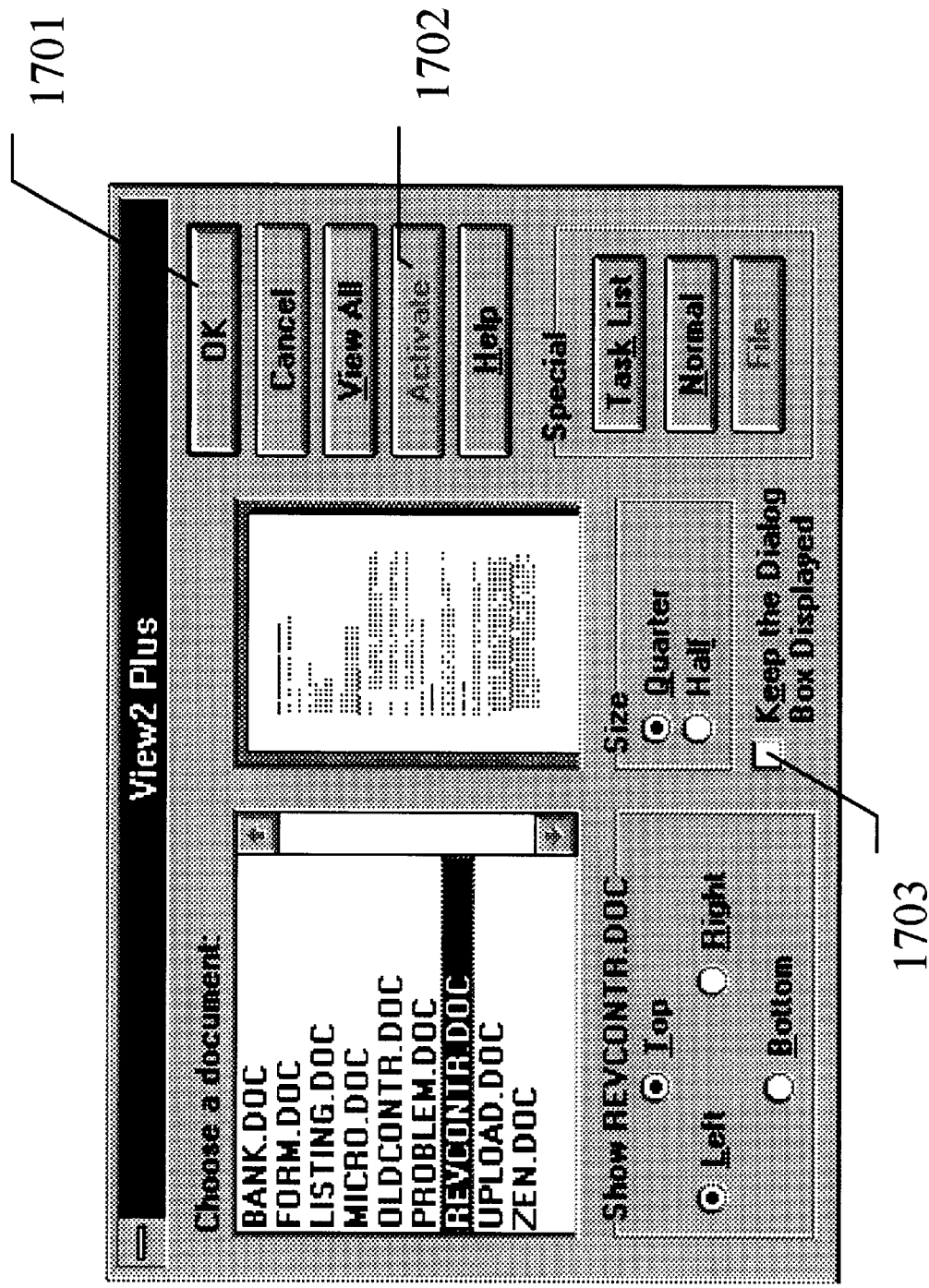
FIG. 17 shows the interface of the second embodiment after the user clears the "Keep the Dialog Box Displayed" check box.

FIG. 17 illustrates that when the user clears the check box 1703, "OK" button 1701 is enabled and becomes the default button again, while the "Activate" button 1702 is disabled.

When the dialog box interface is in the state illustrated in FIG. 16 or FIG. 17 and the user selects "Quarter", which is the default selection, the user can select two options in the Show group in the following combinations: "Left" and "Top", "Top" and "Right", "Right" and "Bottom", or "Left" and "Bottom". If the user selects "Half", the user can select any one option in the Show group.

Figure 18:
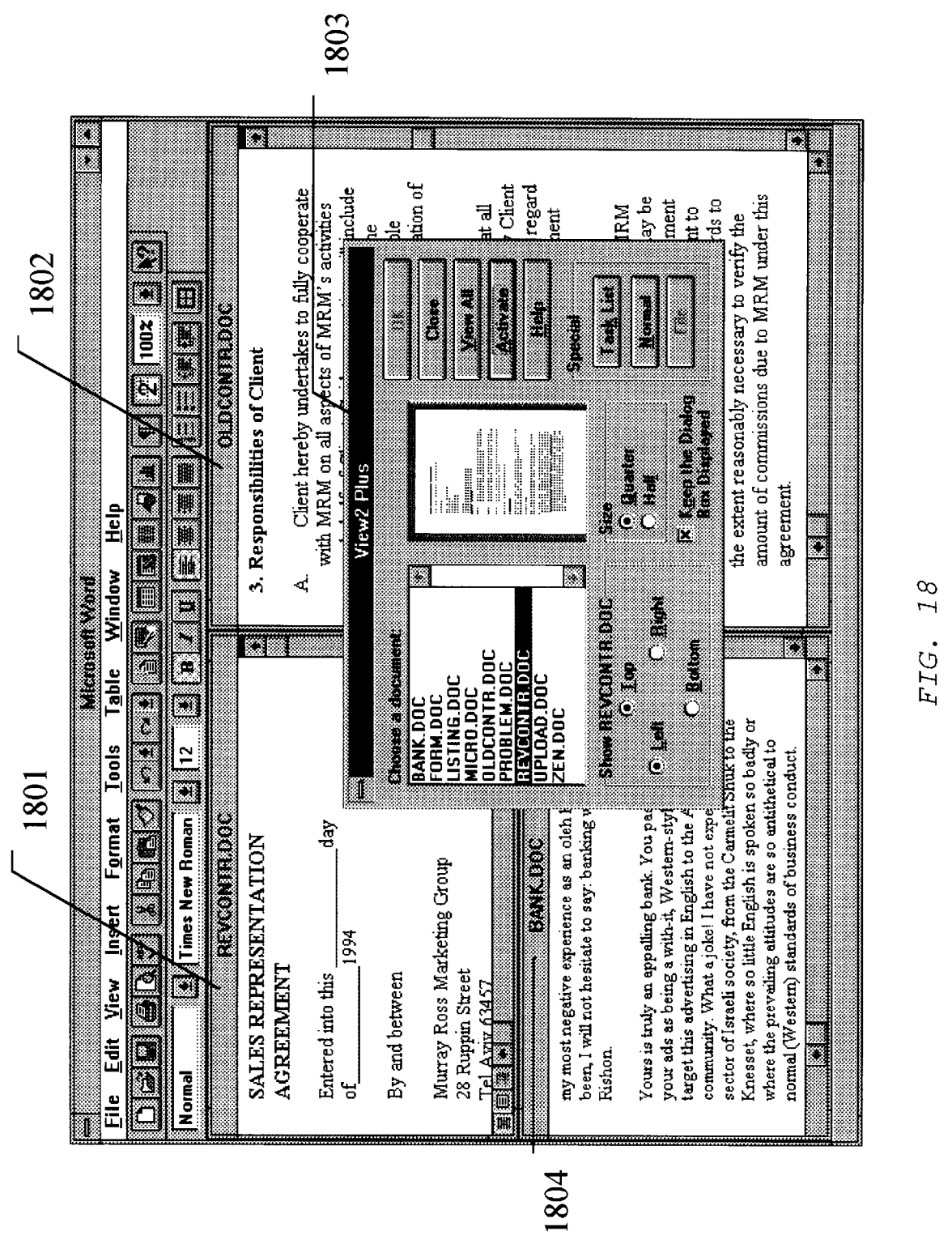

When the interface is in the state that resembles FIG. 16 and the user chooses the "Activate" button, the window containing the file selected by the user in the list box is activated 1801, as shown in FIG. 18. It appears on top of the other document windows and is sized and positioned according to the user's selection in the "Show" group. The dialog box interface 1803 remains open, permitting the user to activate another window or perform another action. In the example illustrated in FIG. 18, the user has also activated a document 1804 in the bottom-left quarter of the workspace and a document 1802 in the right half of the workspace.

If the user's selection is to display a quarter-size window in any position, the text in the activated window is wrapped.

If the user's selection is to display a half-size window left or right, the text in the activated window is wrapped. If the user's selection is to display a half-size window top or bottom, the text in the activated window is unwrapped.

When the interface is in the state that resembles FIG. 17 and the user chooses the "OK" button, the window containing the file selected by the user in the list box is activated in the same way as described above for FIG. 16, but the dialog box interface closes at the same time.

Figure 19:
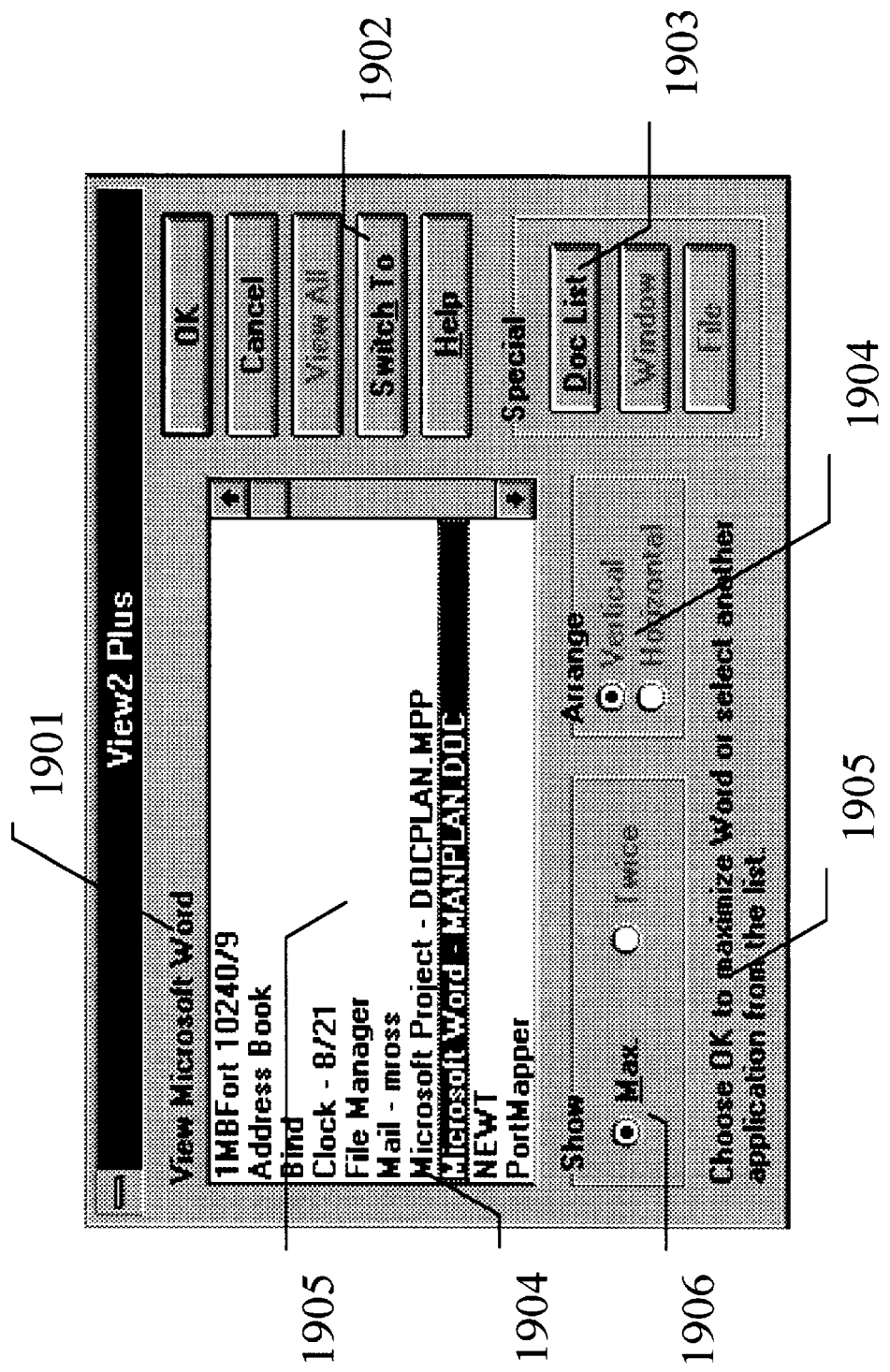
FIG. 19 shows the interface of the second embodiment after the user chooses the "Task List" command button.

FIG. 19 shows the state of the second embodiment's interface when the user chooses "Task List" 1402. The name of the command button becomes "Doc. List" 1903, indicating that choosing this button returns the dialog box interface to its normal state of showing a list of documents. Dynamic text 1901 reads "View Microsoft Word". List box 1908 replaces the normally displayed list box and preview box 1401. This new list box is a task list of all the applications that are running in the Windows environment. Microsoft Word is preselected in the list 1907, indicating that it is the active application. The "Arrange" options 1904 are disabled; only the "Max." option is enabled in the "Show" group 1906. Dynamic text 1905 says "Choose OK to maximize Word or select another application from the list."

If the user chooses "OK" when the dialog box interface is this state, the dialog box interface closes and the Word application window is maximized. In addition, the active document window within Word is maximized and its text is unwrapped.

Figure 20:
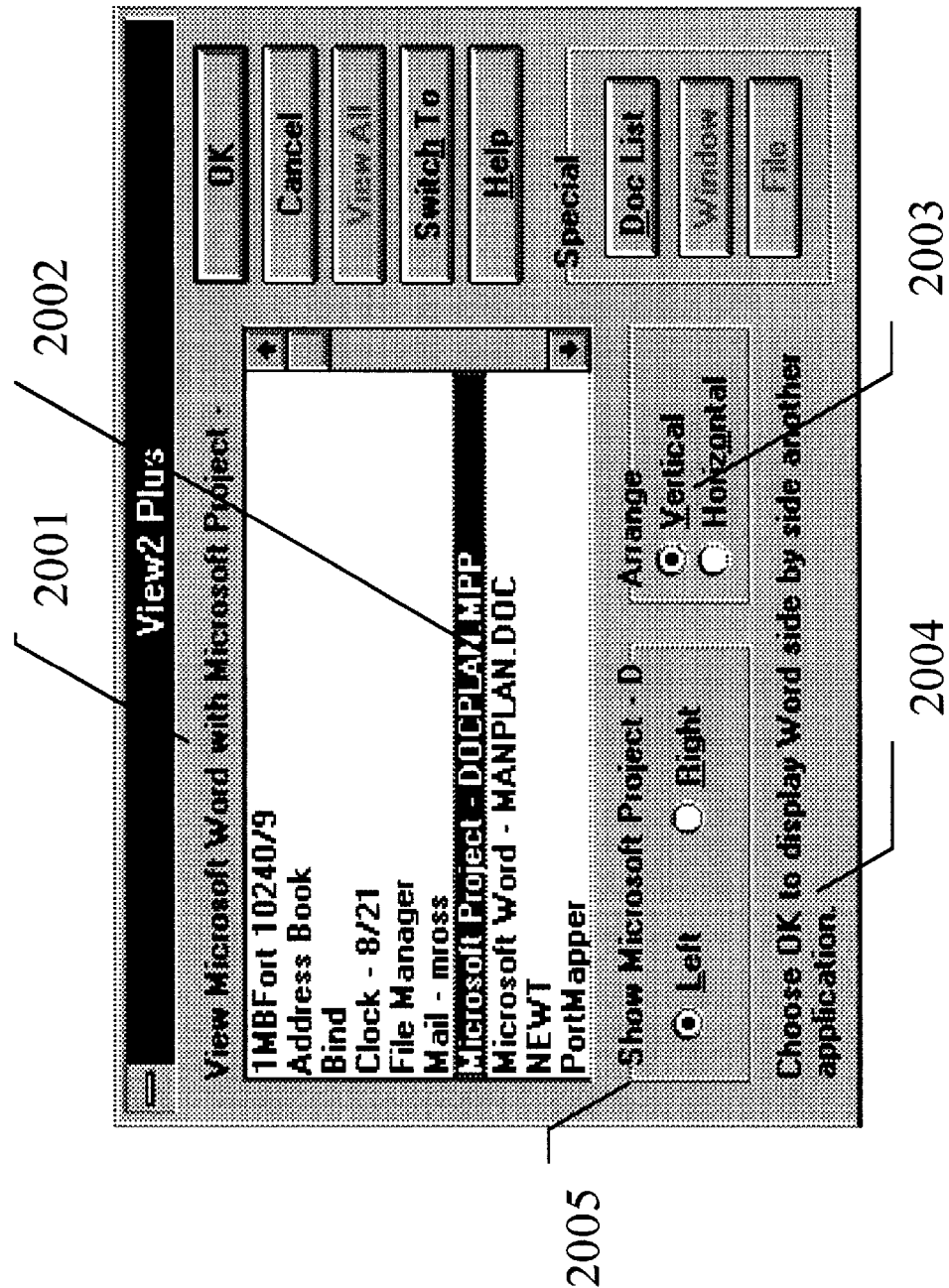
FIG. 20 shows the interface of the second embodiment after the user selects another task from the list box.

If, instead of choosing "OK", the user chooses another application from the list box 2002, the state of the dialog box interface changes to that shown in FIG. 20. Dynamic text 2001 provides the name of the selected application appended to the words "View Microsoft Word with". This indicates that the Word application will be displayed with another application selected in the list box if the user chooses "OK". Dynamic text 2005 shows the name of this selected application; dynamic text 1804 says "Choose OK to display Word side by side another application". Option button group 2005 changes to "Left" and "Right". Option group 2003 is enabled. If the user then chooses "Horizontal" from option group 2003, option button group 2005 changes to "Top" and "Bottom". Dynamic text 2004 says "Choose OK to display Word above or below another application".

If the user chooses the "Switch To" command button 1902 after choosing another application from the list box, as in FIG. 20, the selected application window is activated and appears on top of the Word application while the dialog box interface remains open and unchanged. If the selected application window was already in the maximized or restored state, it appears in this state; if it was minimized, it appears in the restored state.

If the user chooses the "OK" command button when the dialog box interface is the state shown in FIG. 20 (that is, after choosing an application other than Word in the list box), the dialog box closes and the Word application window is displayed with the selected application window.

Figure 21:
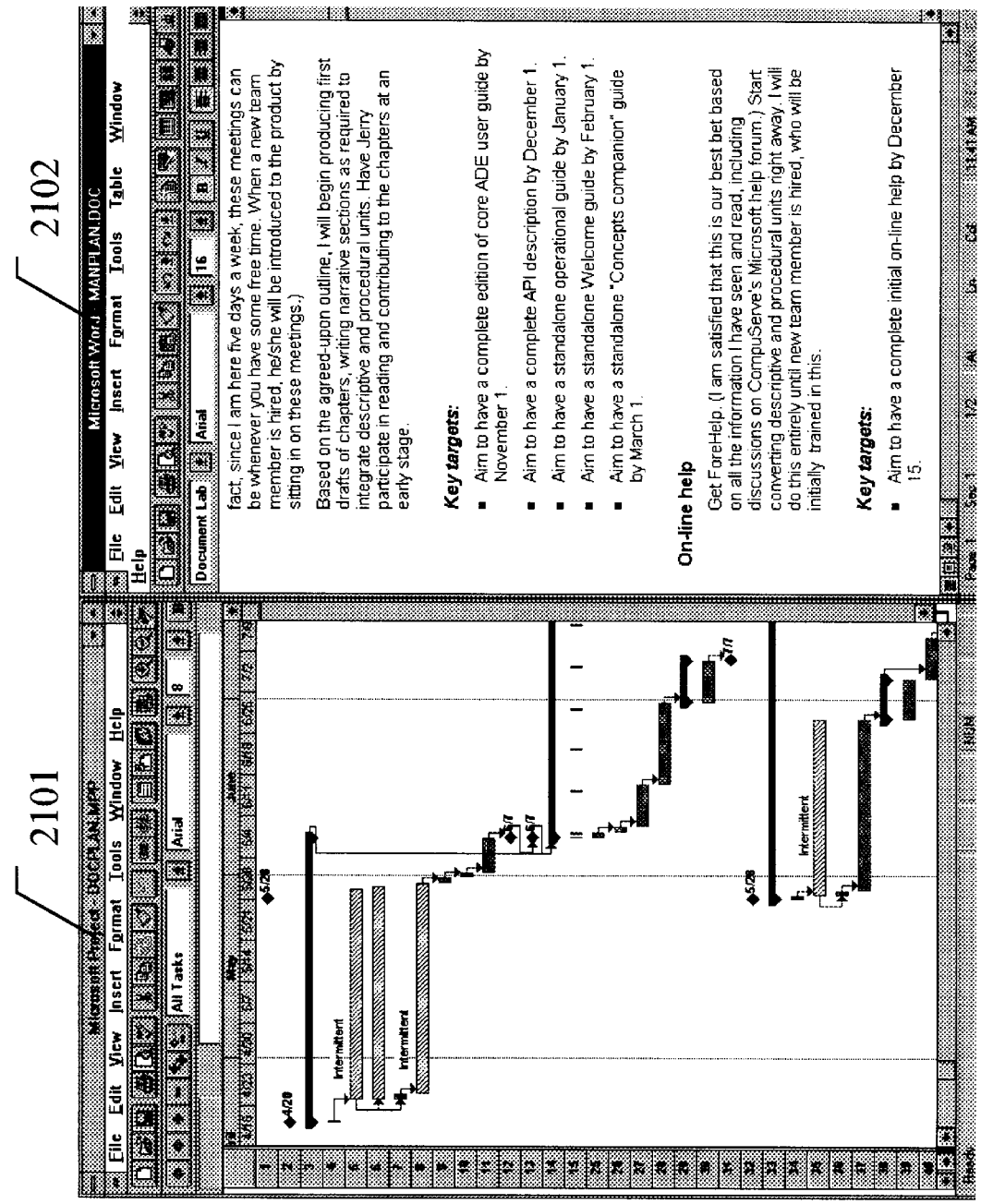
FIG. 21 shows the effect on the Windows 3.1 environment after the user chooses "OK" when the second embodiment's interface resembles FIG. 20 (when "Left" is selected).
Figure 22:
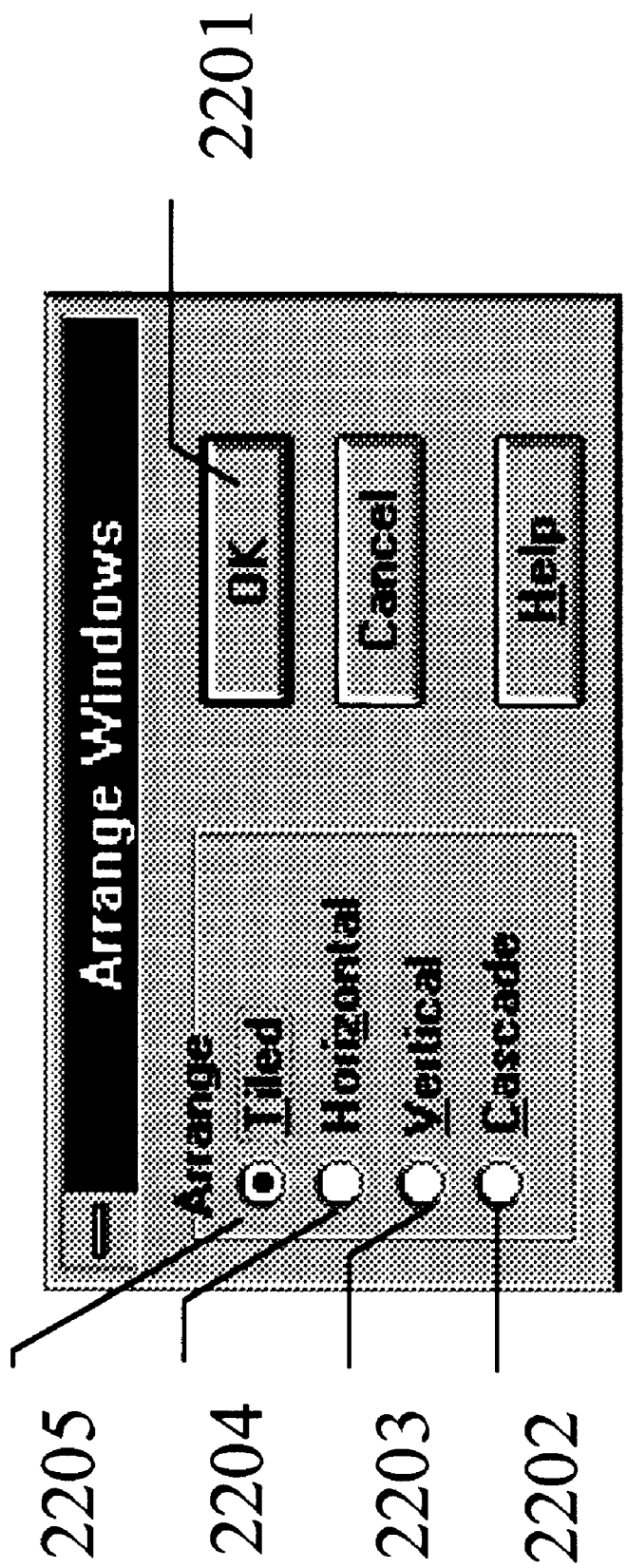
FIG. 22 is a screen bitmap illustrating the dialog box interface opened by the Arrange Windows command.
Figure 23:
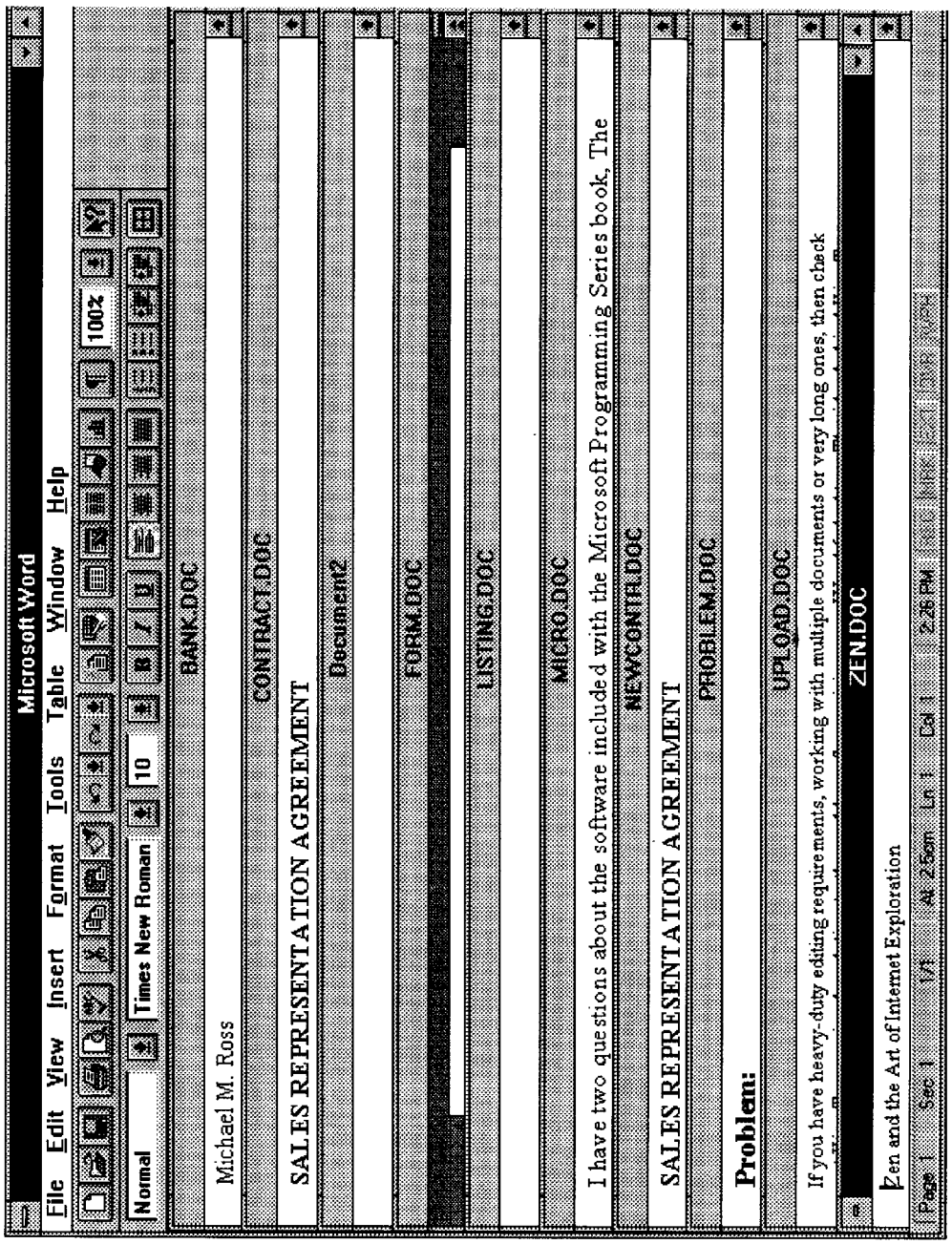
FIG. 23 is a screen bitmap illustrating an arrangement obtained when the horizontal option item 2204 of FIG. 22 is chosen.
Figure 24:
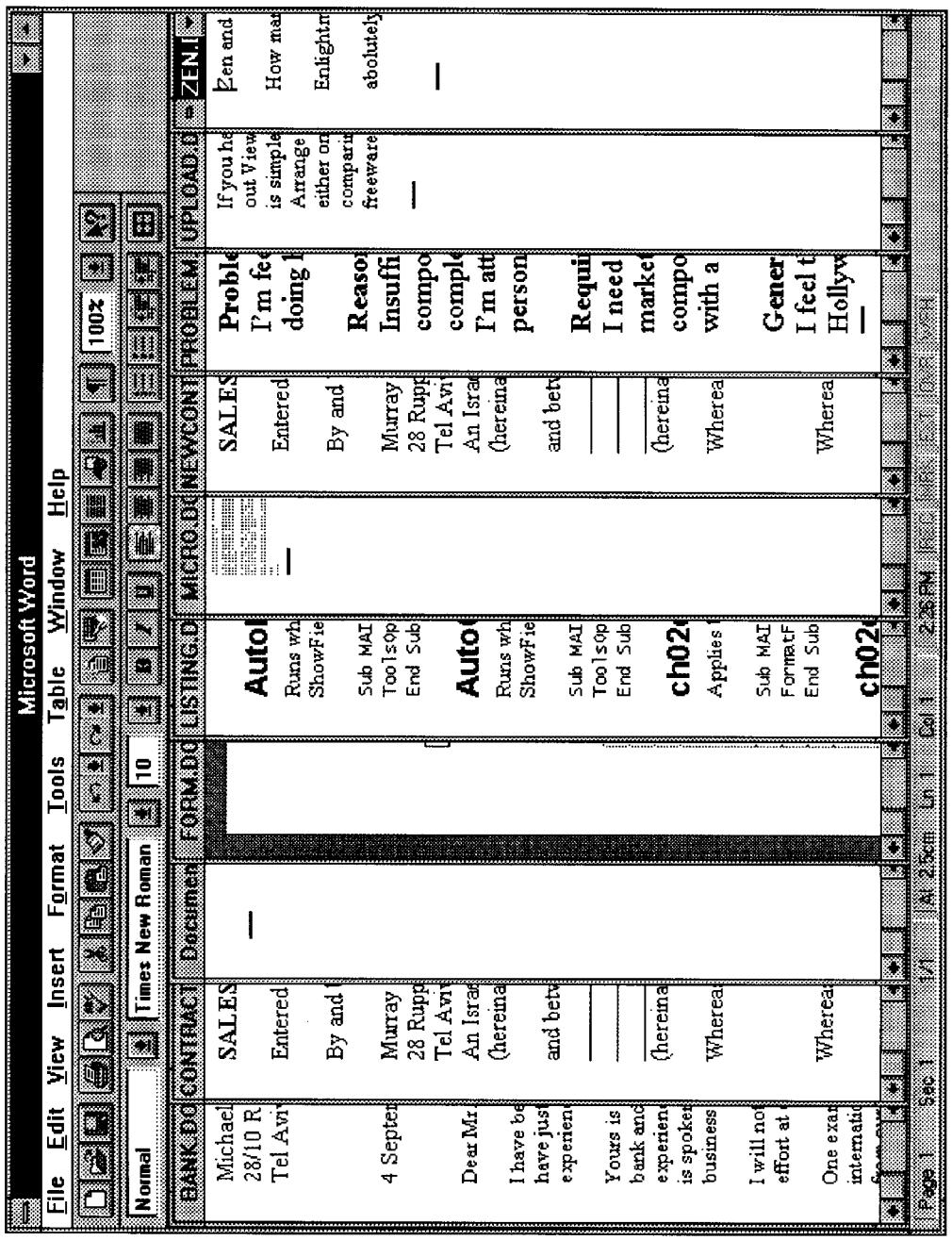
FIG. 24 is a screen bitmap illustrating an arrangement obtained when the vertical option item 2203 of FIG. 22 is chosen.
Figure 25:
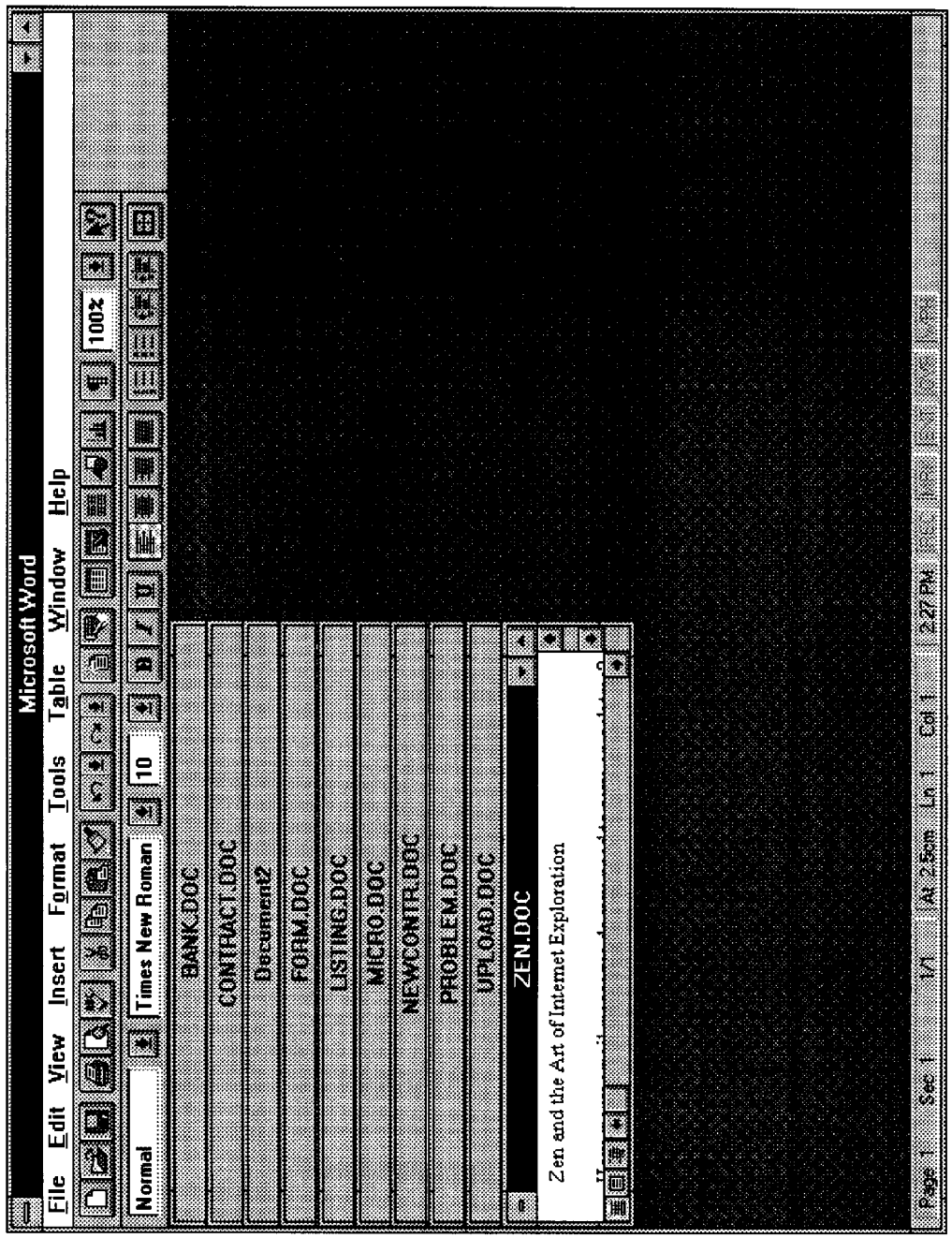
FIG. 25 is a screen bitmap illustrating an arrangement obtained when the originally active document was zoomed to 200%.
Figure 26:
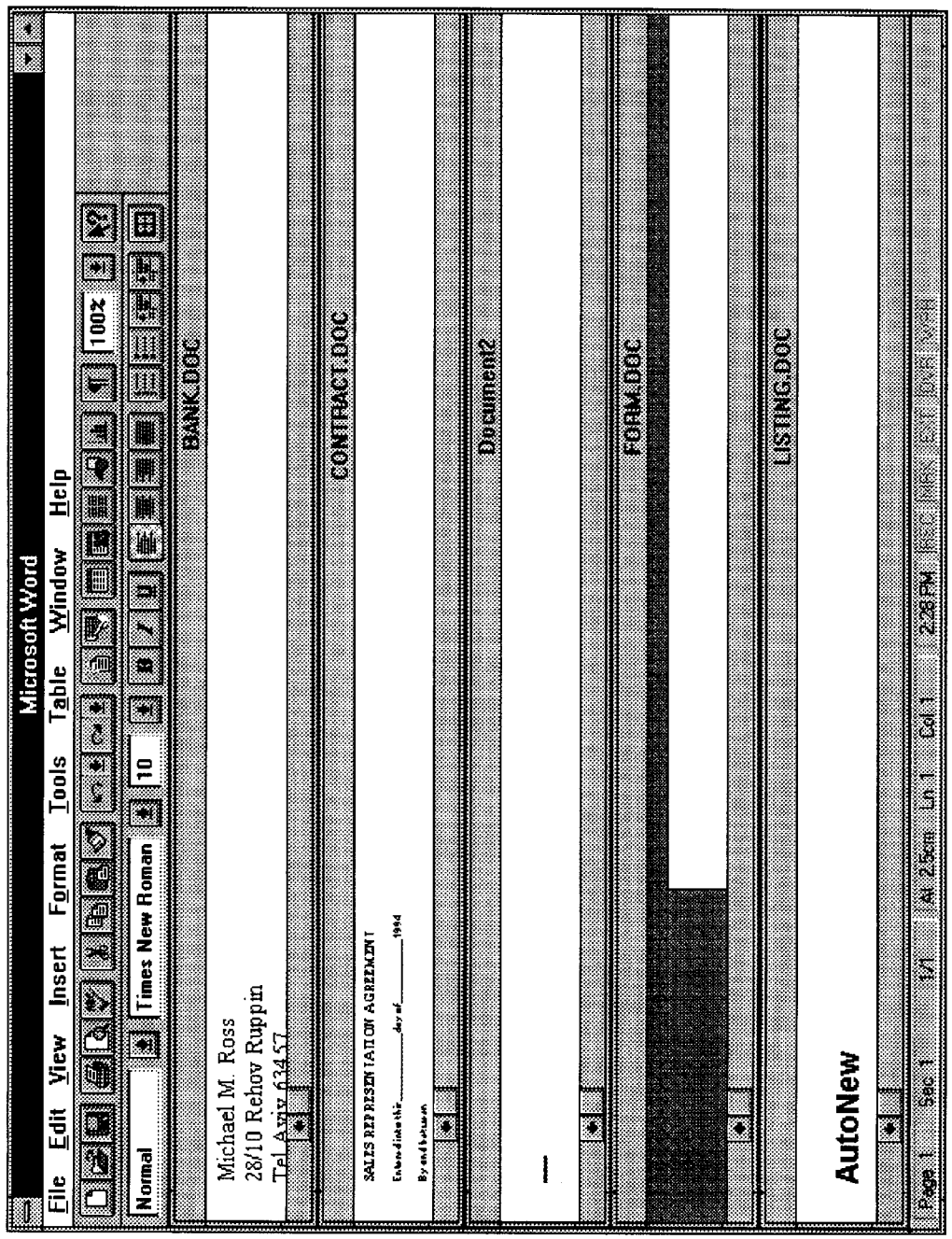
FIG. 26 is a screen bitmap illustrating an arrangement obtained when the originally active document was zoomed to 50%.
Figure 27:
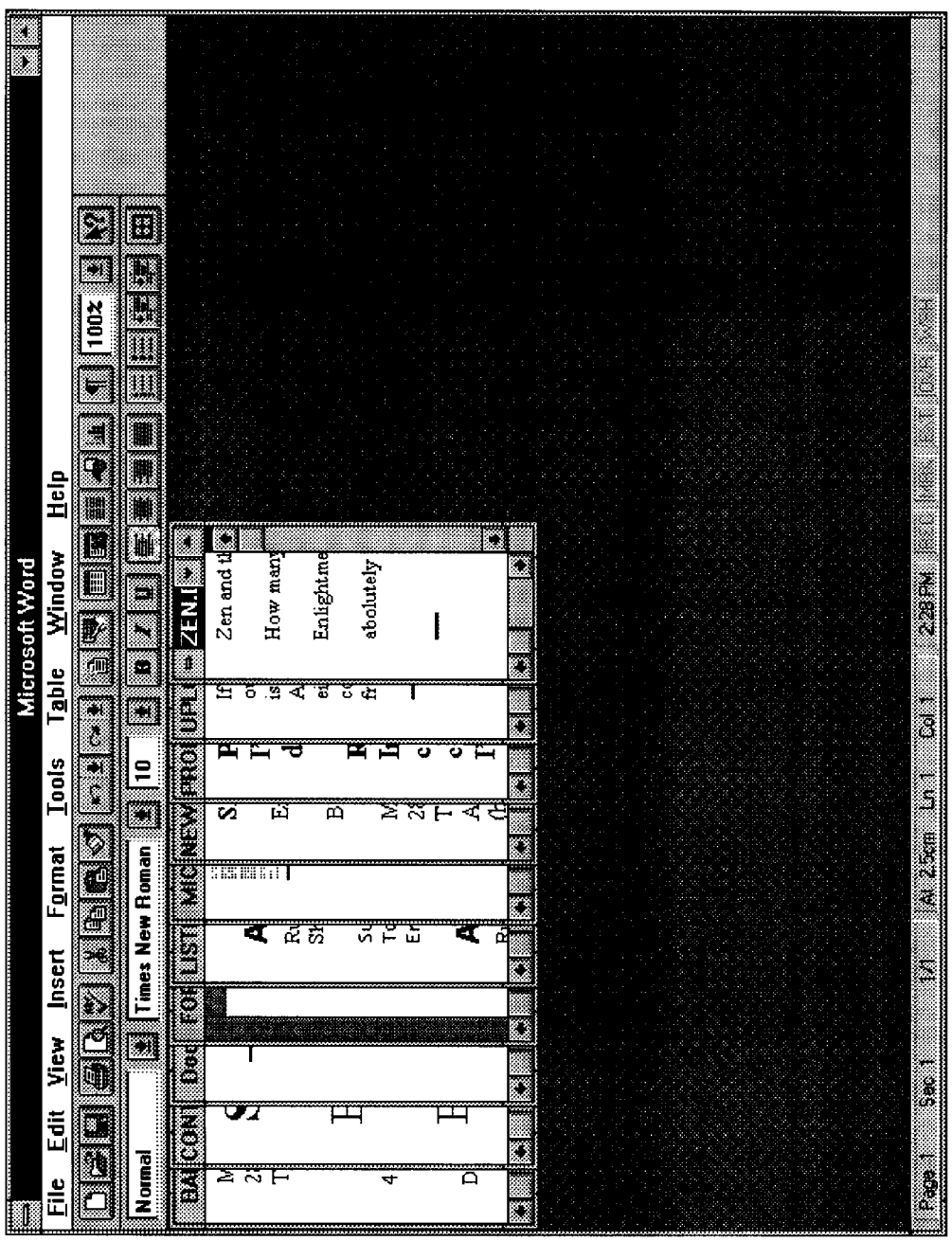
FIG. 27 is another screen bitmap illustrating an arrangement obtained when the originally active document was zoomed to 200%.
Figure 28:
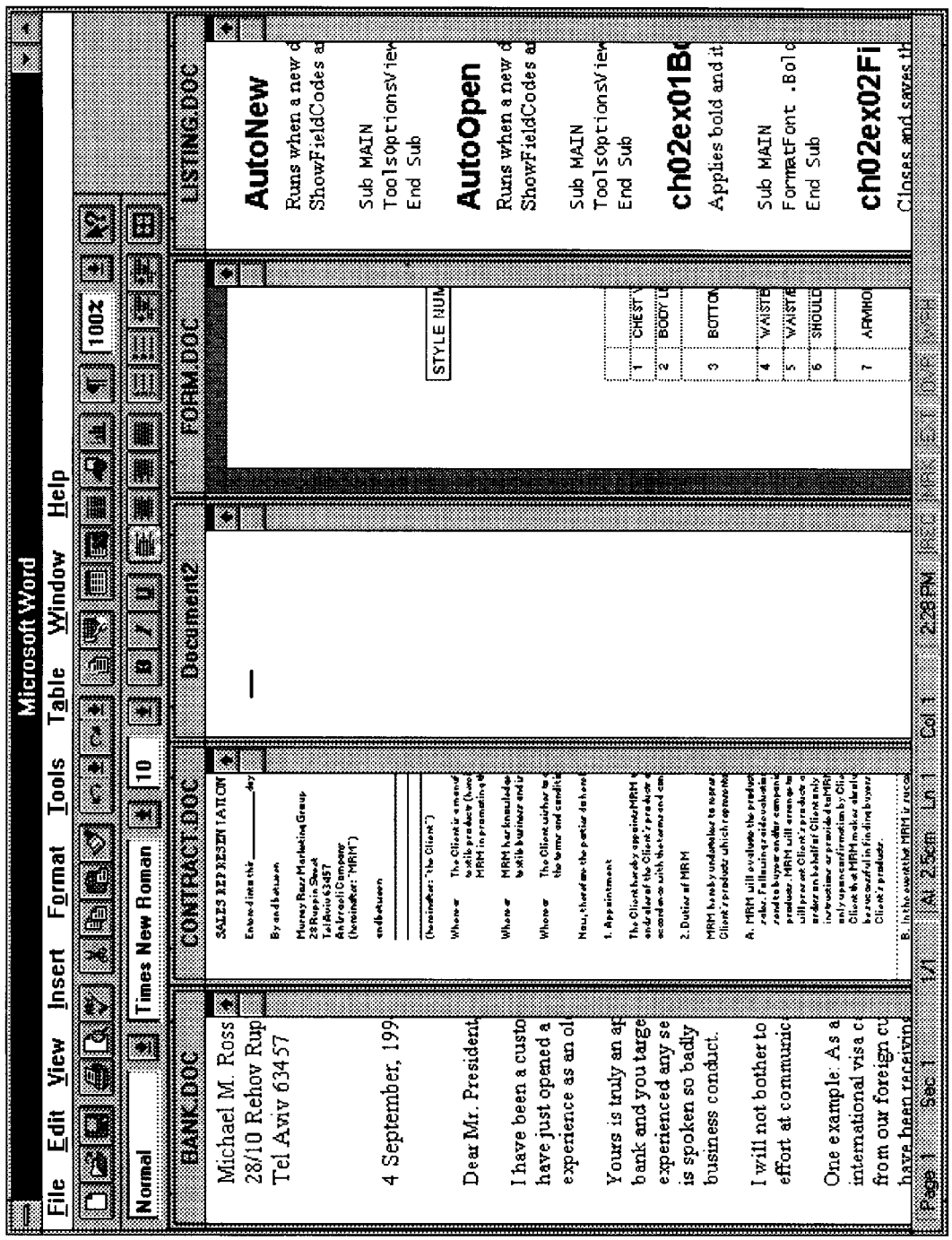
FIG. 28 is another screen bitmap illustrating an arrangement obtained when the originally active document was zoomed to 50%.

If the user chooses "Left" or "Right", meaning that the user also chose "Vertical", the selected application is displayed to the left or right of the Word application. If the user chose "Left", the selected application window 2101 (Microsoft Project in this example) is displayed to the left of the Word application window 2102, as shown in FIG. 21. The active document window in Word is maximized and the text in the window is wrapped. If the user chose "Right", the selected application window is displayed to the right of the Word application window. The active document window in Word is similarly maximized and the text in the window is wrapped.

If the user chooses "Top" or "Bottom", meaning that the user also chose "Horizontal", the selected application is displayed above or below the Word application. If the user chose "Top", the selected application window is displayed above the Word application window. The active document window in Word is maximized and the text in the window is unwrapped. If the user chose "Bottom", the selected application window is displayed to the bottom of the Word application window. The active document window in Word is similarly maximized and the text in the window is unwrapped.

Figure 30:
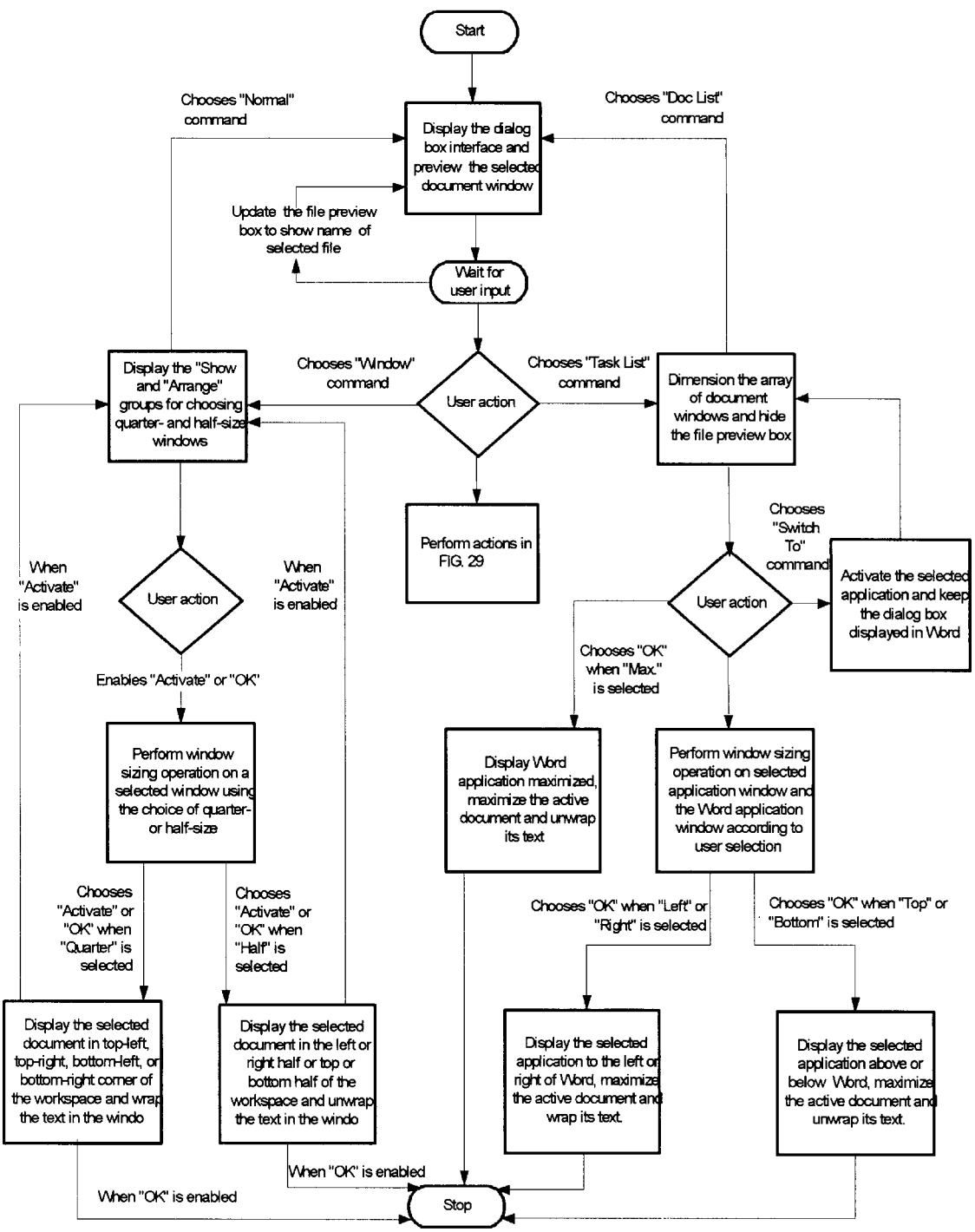
FIG. 30 shows a flow chart of the additional features of a second preferred embodiment of the present invention.

With reference to the flowchart in FIG. 30, the method of the second preferred embodiment involves the following actions. Displaying a preview box of the selected file. Activating another window while resizing and positioning it. Dimensioning the array of open applications. Performing the application window sizing operation. The WordBasic code which implements one preferred version of the second embodiment is set forth in the Source Code Appendix at Section IV under the title "A Second Preferred Embodiment—View2™ Plus". This implementation works with both Word 6 and Word 7.

The WordBasic code appearing in the Source Code Appendix (at II.A.) under the title "DISPLAYING A PREVIEW BOX OF THE SELECTED FILE" illustrates the method for displaying a preview box of the selected file. Note that if the selected file has not been saved, an empty string is returned for the document's path. In this case, it is temporarily made the active window, so that the file preview statement can work.

The WordBasic code appearing in the Source Code Appendix (at II.B.) under the title "ACTIVATING ANOTHER WINDOW WHILE RESIZING AND POSITIONING IT" illustrates the method for activating another document window while resizing and positioning it.

The WordBasic code appearing in the Source Code Appendix (at II.C.) under the title "DIMENSIONING THE ARRAY OF OPEN APPLICATIONS" illustrates the method for dimensioning the array of open applications.

The WordBasic code appearing in the Source Code Appendix (at II.D.) under the title "PERFORMING THE APPLICATION WINDOW SIZING OPERATION" illustrates the method for performing the application window sizing operation.

Although preferred specific embodiments of the present invention have been described herein in detail, it is desired to emphasize that this has been for the purpose of illustrating and describing the invention, and should not be considered as necessarily limitative of the invention, it being understood that many modifications, including, by way of example only, the word processing application used, can be made by those skilled in the art while still practicing the invention claimed herein.

SOURCE CODE APPENDIX[1]

I.  METHODS OF A FIRST PREFERRED EMBODIMENT.

A.  DIMENSIONING THE ARRAY OF DOCUMENT WINDOWS AND <u>STORING THE ACTIVE AND SELECTED WINDOWS</u>

```
"DEFINE SHARED VARIABLES
Dim Shared WinList$, yours, yours$, other, other$

'NOTE NAME OF ACTIVE WINDOW
yours$ = WindowName$()
'NOTE NUMBER OF ACTIVE WINDOW
yours = Window()

'DIMENSION THE WINDOW ARRAY
numwin = CountWindows() - 1
Dim WinList$(numwin)
For count = 0 To numwin
    WinList$(count) = WindowName$(count + 1)
Next Function view2 (id$, action, suppvalue)

Select Case action

Case 2
'NOTE NUMBER OF SELECTED WINDOW
other = DlgValue("winlist") + 1
'NOTE NAME OF SELECTED WINDOW
other$ = DlgText$("winlist")

Case Else
End Select

End Function
```

---

[1] Copyright © Michael Ross, 1995

B. DISPLAYING THE DIALOG BOX INTERFACE

```
'DISPLAY THE DIALOG BOX
Begin Dialog UserDialog 381, 215, "View2", .view2

'MAIN PANEL
       Text 12, 9, 220, 14, "Text", .active         '0
       Text 12, 184, 240, 26, "Text", .banter       '1
       ListBox 10, 25, 220, 99, WinList$(), .winlist '2

'DYNAMIC CONTROLS
       GroupBox 10, 129, 220, 50, "Text", .putit    '3
       OptionGroup .leftright                       '4
       OptionButton 38, 145, 95, 19, "Text", .left  '5
       OptionButton 140, 145, 80, 19, "Text", .right '6
       'MAIN PANEL
       GroupBox 250, 129, 123, 50, "Arrange", .arrange '7
       OptionGroup .split                           '8
       OptionButton 260, 140, 99, 19, "&Vertical", .ver '9
       OptionButton 260, 155, 99, 19, "Hori&zontal", .hoz  '10
       OKButton 252, 6, 120, 20                     '11
       CancelButton 252, 30, 120, 20, .can          '12
'CANCEL/CLOSE BUTTON
       PushButton 252, 54, 120, 20, "Text ", .all   '13
'MAX/VIEW/MIN BUTTON
       PushButton 252, 78, 120, 20, "&Switch to", .activ  '14
       PushButton 252, 102, 120, 20, "&Help", .help '15
       PushButton 252, 187, 120, 20, "&Extra", .more  '16

'MORE PANEL
       PushButton 10, 187, 114, 20, "&Open File...", .open  '17
       PushButton 130, 187, 115, 20, "&Close File", .clos   '18
       PushButton 252, 187, 120, 20, "Hi&de", .hid  '19

End Dialog
Dim dlg As UserDialog          'DEFINE DIALOG RECORD
x = Dialog(dlg)     'DISPLAY THE DIALOG BOX
End Sub Function view2 (id$, action, suppvalue)

'SHOW/HIDE PANELS
Select Case action
'INITIALIZE DIALOG
Case 1
       ShowHideMorePanel 0
       ShowHideHelpPanel 0
       DlgEnable "split", 0
```

```
        'PRESELECT ACTIVE DOCUMENT IN LISTBOX
        DlgValue "winlist", yours - 1

Case 2
 5      'NOTE NUMBER OF SELECTED WINDOW
        other = DlgValue("winlist") + 1

Case Else
        End Select
10
        End Function

'DISPLAY MORE PANEL CONTROLS
        Sub ShowHideMorePanel(ShowOrHide)
15      For count = 17 To 19
        DlgVisible count, ShowOrHide
        Next
        End Sub 20      'DISPLAY HELP PANEL CONTROLS
        Sub ShowHideHelpPanel(ShowOrHide)
        For count = 20 To 25
        DlgVisible count, ShowOrHide
        Next
25      End Sub
```

C. ENABLING THE DYNAMIC UPDATING OF THE DIALOG INTERFACE

```
        'DYNAMIC DIALOG CONTROLS
 5
        Function view2 (id$, action, suppvalue)

'DYNAMIC AND STATIC TEXT CONTROLS
        Select Case action
10      Case 1
        'RETURN NAME OF ACTIVE DOCUMENT
        DlgText$ "active", "View " + yours$ 'RETURN NAME OF SELECTED DOCUMENT
15      other$ = DlgText$("winlist")
        DlgText$ "putit", "Show"

'SET BUTTON NAMES
        DlgText$ "all", "Vie&w All"
20      DlgText$ "can", "Cancel"

'SET DYNAMIC CONTROLS
        DlgText$ "left", "&Max."
        DlgText$ "right", "&Twice"
25
        'SET BANTER TEXT
        DlgText$ "banter", "Maximize your active document."

Case 2
30      'RETURN NAME OF SELECTED DOCUMENT IF DIFFERENT
        If other <> yours Then
                other$ = DlgText$("winlist")
                DlgText$ "putit", "Show " + other$
                DlgText$ "active", "View " + yours$ + " with:"
35      Else
                DlgText$ "putit", "Show"
                DlgText$ "active", "View " + yours$
        End If 40      'SET DYNAMIC CONTROLS
                If yours <> other And DlgValue("split") = 0 Then
                        DlgText "left", "&Left"
                        DlgText "right", "&Right"
                ElseIf yours <> other And DlgValue("split") = 1 Then
45                      DlgText "left", "&Top"
                        DlgText "right", "&Bottom"
                ElseIf yours = other Then
                        DlgText "left", "&Max."
                        DlgText "right", "&Twice"
```

34

```
          End If

'DIM STANDARD CONTROLS IF MAX IS SELECTED
     If yours = other And DlgValue("leftright") = 0 Then
5         DlgEnable "split", 0
          Else
          DlgEnable "split", 1
     End If 10   'CHANGE BANTER TEXT
     If yours = other And DlgValue("leftright") = 0 Then
             DlgText$ "banter", "Maximize your active document."
         ElseIf yours = other And DlgValue("leftright") = 1 Then
             DlgText$ "banter", "Display your active document with
15   itself."
         ElseIf yours <> other And DlgValue("split") = 0 Then
             DlgText$ "banter", "Display your active document side
     by side with another one."
         ElseIf yours <> other And DlgValue("split") = 1 Then
20           DlgText$ "banter", "Display your active document above
     or below another one."
     End If Case Else
25   End Select
     End Function
```

35

D. ACTIVATING ANOTHER WINDOW WHILE KEEPING THE DIALOG BOX OPEN

```
    'ACTIVATE FILE
 5  If id$ = "activ" Then
        WindowList other
        yours = Window()
        yours$ = DlgText$("winlist")
        DlgText$ "active", "View " + yours$ + " with:"
10      DlgText "left", "&Max."
        DlgText "right", "&Twice"
        DlgText$ "can", "Close"
        DlgFocus "winlist"
        ScreenUpdating 1
15      ScreenUpdating 0
    End If
```

E. PERFORMING THE WINDOW SIZING OPERATION

```
'ARRANGE DIFFERENT WINDOWS
Sub ArrangeWindows
'VERTICAL SPLIT
If DlgValue("split") = 0 Then
    If DocMaximize() Or DocMinimize() Then DocRestore
    ViewZoom100            'SWITCH TO NORMAL VIEW
    ToolsOptionsView .WrapToWindow = 1 'WRAP TEXT
    DocSize(Val(AppInfo$(6)) / 2), Val(AppInfo$(7))     'SIZE
WINDOW
    docwidth = DocWindowWidth()'SET VARIABLE FOR DOC WIDTH
    If DlgValue("leftright") = 0 Then DocMove 0, 0     Else
DocMove(docwidth), 0          ' SET LEFT/RIGHT ' ACTIVE DOCUMENT
    WindowList yours
    If DocMaximize() Or DocMinimize() Then DocRestore
    ViewZoom100            'SWITCH TO NORMAL VIEW
    ToolsOptionsView .WrapToWindow = 1 'WRAP TEXT
    DocSize(Val(AppInfo$(6)) / 2), Val(AppInfo$(7))     'SIZE
WINDOW
    If DlgValue("leftright") = 0 Then DocMove(docwidth), 0
    Else DocMove 0, 0    'SET LEFT/RIGHT
End If
'HORIZONTAL SPLIT
If DlgValue("split") = 1 Then
    If DocMaximize() Or DocMinimize() Then DocRestore
    ViewZoom100            'SWITCH TO NORMAL VIEW
    ToolsOptionsView .WrapToWindow = 0 'UNWRAP TEXT
    DocSize(Val(AppInfo$(6)), Val(AppInfo$(7)) / 2)     'SIZE
WINDOW
    docheight = DocWindowHeight()'SET VARIABLE FOR DOC WIDTH
    If DlgValue("leftright") = 0 Then DocMove 0, 0     Else
DocMove 0,(docheight)     ' SET TOP/BOTTOM ' ACTIVE DOCUMENT
    WindowList yours
    If DocMaximize() Or DocMinimize() Then DocRestore
    ViewZoom100            'SWITCH TO NORMAL VIEW
    ToolsOptionsView .WrapToWindow = 0 'UNWRAP TEXT
    DocSize(Val(AppInfo$(6)), Val(AppInfo$(7)) / 2)     'SIZE
WINDOW
    If DlgValue("leftright") = 0 Then DocMove 0,(docheight)
    Else DocMove 0, 0    'SET TOP/BOTTOM
End If
End Sub
```

```
    'ARRANGE SAME WINDOWS
    Sub SameWindows
    'MAXIMIZE WINDOW AND UNWRAP TEXT
    If DlgValue("leftright") = 0 Then
5       For count = 1 To CountWindows()
            WindowList(count)
            ToolsOptionsView .WrapToWindow = 0
            DocMaximize 1
        Next
10      thisone$ = WindowName$(yours)
        Activate thisone$
    End If 'DISPLAY ACTIVE WINDOW WITH NEW WINDOW OF ITSELF
15  'VERTICAL SPLIT
    If DlgValue("leftright") = 1 And DlgValue("split") = 0 Then
        If DocMaximize() Or DocMinimize() Then DocRestore
        ViewZoom100         'SWITCH TO NORMAL VIEW
        ToolsOptionsView .WrapToWindow = 0 'UNWRAP TEXT
20      ToolsOptionsView .WrapToWindow = 1 'WRAP WINDOW
        DocSize(Val(AppInfo$(6)) / 2), Val(AppInfo$(7))    'HALF SIZE
        docwidth = DocWindowWidth()    'SET VARIABLE FOR DOC WIDTH
        DocMove 0, 0    ' SET LEFT 25      'CREATE AND SIZE NEW WINDOW
        old = Window() 'NOTE ORIGINAL WINDOW LIST NUMBER
        WindowNewWindow
        If DocMaximize() Or DocMinimize() Then DocRestore
        ViewZoom100         'SWITCH TO NORMAL VIEW
30      ToolsOptionsView .WrapToWindow = 1 'WRAP TEXT
        DocSize(Val(AppInfo$(6)) / 2), Val(AppInfo$(7))    'SIZE
    WINDOW
        DocMove(docwidth), 0     'SET RIGHT
        WindowList(old)      'ACTIVATE ORIGINAL WINDOW
35  End If 'HORIZONTAL SPLIT
    If DlgValue("leftright") = 1 And DlgValue("split") = 1 Then
        If DocMaximize() Or DocMinimize() Then DocRestore
40      ViewZoom100         'SWITCH TO NORMAL VIEW
        DocSize(Val(AppInfo$(6)), Val(AppInfo$(7)) / 2)    'SIZE
    WINDOW
        DocMove 0, 0     'SET TOP 45      'CREATE AND SIZE NEW WINDOW
        old = Window() 'NOTE ORIGINAL WINDOW LIST NUMBER
        WindowNewWindow
        If DocMaximize() Or DocMinimize() Then DocRestore
        ViewZoom100         'SWITCH TO NORMAL VIEW
```

```
        DocSize(Val(AppInfo$(6)), Val(AppInfo$(7)) / 2)    'SIZE
WINDOW
        docheight = DocWindowHeight()'SET VARIABLE FOR DOC WIDTH
        DocMove 0,(docheight)      ' SET BOTTOM
        WindowList(old)     'ACTIVATE ORIGINAL WINDOW
    End If
End Sub
```

II. METHODS OF A SECOND PREFERRED EMBODIMENT.

A. DISPLAYING A PREVIEW BOX OF THE SELECTED FILE

```
Function view2plus (id$, action, suppvalue)

Select Case action
Case 2
'PREVIEW SELECTED DOCUMENT
other = DlgValue("winlist") + 1
If DlgFocus$() = "winlist" Then
      previewfilename$ = FileNameFromWindow$(other)
      'IF SELECTED WINDOW IS UNSAVED, TEMPORARILY ACTIVATE IT
      If previewfilename$ = "" Then
            WindowList other
            DlgFilePreview$
            WindowList yours
      Else
            DlgFilePreview$ previewfilename$
      End If
End If
Case Else
End Select
End Function
```

B. ACTIVATING ANOTHER WINDOW WHILE RESIZING AND POSITIONING IT

```
                'ACTIVATE COMMAND
 5              If id$ = "act" Then
                        WindowList other
                        yours = Window()
                        yours$ = DlgText$("winlist")
                        yours = Window()
10                      If DlgText$("activ") = "&Normal" Then
                                If DlgValue("split") = 1 Then Call halfcut
                                If DlgValue("split") = 0 Then Call quartercut
                        End If
                        DlgText "left", "&Max."
15                      DlgText "right", "&Twice"
                        DlgText$ "can", "Close"
                        DlgFocus "winlist"
                        ScreenRefresh
                        view2plus = 1
20              End If
                view2plus = 1
                End If Sub halfcut
25              'HORIZONTAL SPLIT
                If DlgValue("splitsplit") = 1 Or DlgValue("splitsplit") = 3 Then
                        If DocMaximize() Or DocMinimize() Then DocRestore
                        ViewZoom100            'SWITCH TO NORMAL VIEW
                        ToolsOptionsView .WrapToWindow = 0 'UNWRAP TEXT
30                      DocSize(Val(AppInfo$(6)), Val(AppInfo$(7)) / 2)     'SIZE
                WINDOW
                        docheight = DocWindowHeight()'SET VARIABLE FOR DOC WIDTH
                        If DlgValue("splitsplit") = 1 Then DocMove 0, 0    Else
                DocMove 0,(docheight)      ' SET TOP/BOTTOM
35              End If 'VERTICAL SPLIT
                If DlgValue("splitsplit") = 0 Or DlgValue("splitsplit") = 2 Then
                        If DocMaximize() Or DocMinimize() Then DocRestore
40                      ViewZoom100            'SWITCH TO NORMAL VIEW
                        ToolsOptionsView .WrapToWindow = 1 'WRAP TEXT
                        DocSize(Val(AppInfo$(6)) / 2, Val(AppInfo$(7)))    'SIZE
                WINDOW
                        docwidth = DocWindowWidth()'SET VARIABLE FOR DOC WIDTH
45                      If DlgValue("splitsplit") = 0 Then DocMove 0, 0    Else
                DocMove(docwidth), 0           ' SET LEFT/RIGHT
                End If
                End Sub
```

41

```
      Sub quartercut
      'TOP SPLIT
      If DlgValue("splitsplit") = 1 Then
          If DocMaximize() Or DocMinimize() Then DocRestore
5         ViewZoom100           'SWITCH TO NORMAL VIEW
          ToolsOptionsView .WrapToWindow = 1 'WRAP TEXT
            .  DocSize(Val(AppInfo$(6)) / 2, Val(AppInfo$(7)) / 2)
               DocMove 0, 0
          docwidth = DocWindowWidth()'SET VARIABLE FOR DOC WIDTH
10        docheight = DocWindowHeight()'SET VARIABLE FOR DOC WIDTH
          If DlgValue("leftrightsplit") = 0 Then DocMove 0, 0      Else
      DocMove(docwidth), 0      'SET LEFT/RIGHT
      End If 15    'BOTTOM SPLIT
      If DlgValue("splitsplit") = 3 Then
          If DocMaximize() Or DocMinimize() Then DocRestore
          ViewZoom100           'SWITCH TO NORMAL VIEW
          ToolsOptionsView .WrapToWindow = 1 'WRAP TEXT
20             DocSize(Val(AppInfo$(6)) / 2, Val(AppInfo$(7)) / 2)
               DocMove 0, 0
          docwidth = DocWindowWidth()'SET VARIABLE FOR DOC WIDTH
          docheight = DocWindowHeight()'SET VARIABLE FOR DOC HEIGHT
          If DlgValue("leftrightsplit") = 0 Then DocMove 0,(docheight)
25    Else DocMove(docwidth),(docheight) 'SET LEFT/RIGHT
      End If
      End Sub
```

C. DIMENSIONING THE ARRAY OF OPEN APPLICATIONS

```
    'API DECLARATIONS FOR TASK LIST
    Declare Function FindWindow Lib "user"(ClassName As Long,
 5  WindowTitle$) As Integer
    Declare Function IsWindowVisible Lib "user"(hWnd As Integer) As
    Integer NumTasks = AppCount()
10    Dim Test$(NumTasks), AppNames$(NumTasks)
      AppGetNames Test$()
      For x = 0 To NumTasks - 1
      hWnd = FindWindow(0, Test$(x))
      If hWnd <> 0 Then
15    If IsWindowVisible(hwnd) Then
      AppNames$(Count) = Test$(x)
      Count = Count + 1
      End If
      End If
20    Next x
      AppNames$(Count) = ""
      SortArray AppNames$(), 0, 0, Count - 1
      DlgListBoxArray "applist", AppNames$()
      x = 0
25
```

D. PERFORMING THE APPLICATION WINDOW SIZING OPERATION

```
'ARRANGE APPLICATION WINDOWS
Declare Function LockWindowUpdate Lib "User"(hwndLock As Integer)
As Integer Sub MAIN
ScreenUpdating 0
'GET DOCUMENT VARIABLES
vert$ = GetDocumentVar$("appos")
hoz$ = GetDocumentVar$("appos")
max$ = GetDocumentVar$("appos")
newapp$ = GetDocumentVar$("appname")
'CLEAR DOCUMENT VARIABLES
SetDocumentVar "appos", ""
SetDocumentVar "appname", ""

If vert$ = "left" Then
    LockWindowUpdate(hwndLock)
    If AppMaximize(newapp$) Or AppMinimize(newapp$) Then
AppRestore newapp$
    AppMaximize 1
    appwidth = AppWindowWidth()
    appheight = AppWindowHeight()
    AppRestore
    AppSize appwidth / 2, appheight
    AppMove 0, 0           ' SET LEFT/RIGHT
    DocMaximize 1
    ToolsOptionsView .WrapToWindow = 1
    AppMinimize newapp$ 'BUG FIX
    AppRestore newapp$
    AppMove newapp$, 0, 0
    AppSize newapp$, appwidth / 2, appheight
    AppMove newapp$,(appwidth / 2), 0     ' SET LEFT/RIGHT
    ScreenRefresh
End If If vert$ = "right" Then
    LockWindowUpdate(hwndLock)
    If AppMaximize(newapp$) Or AppMinimize(newapp$) Then
AppRestore newapp$
    AppMaximize 1
    appwidth = AppWindowWidth()
    appheight = AppWindowHeight()
    AppRestore
    AppSize appwidth / 2, appheight
    AppMove(appwidth / 2), 0       ' SET LEFT/RIGHT
    DocMaximize 1
    ToolsOptionsView .WrapToWindow = 1
```

```
            AppMinimize newapp$ 'BUG FIX
            AppRestore newapp$
            AppMove newapp$, 0, 0
            AppSize newapp$, appwidth / 2, appheight
            AppMove newapp$, 0, 0          ' SET LEFT/RIGHT
            ScreenRefresh
      End If If hoz$ = "bottom" Then
            LockWindowUpdate(hwndLock)
            If AppMaximize(newapp$) Or AppMinimize(newapp$) Then
      AppRestore newapp$
            AppMaximize 1
            appwidth = AppWindowWidth()
            appheight = AppWindowHeight()
            AppRestore
            AppSize appwidth, appheight / 2
            AppMove 0, 0          ' SET TOP
            DocMaximize 1
            ToolsOptionsView .WrapToWindow = 0
            AppMinimize newapp$ 'BUG FIX
            AppRestore newapp$
            AppMove newapp$, 0, 0
            AppSize newapp$, appwidth, appheight / 2
            AppMove newapp$, 0,(appheight / 2)      ' SET BOTTOM
            ScreenRefresh
      End If If hoz$ = "top" Then
            LockWindowUpdate(hwndLock)
            If AppMaximize(newapp$) Or AppMinimize(newapp$) Then
      AppRestore newapp$
            AppMaximize 1
            appwidth = AppWindowWidth()
            appheight = AppWindowHeight()
            AppRestore
            AppSize appwidth, appheight / 2
            AppMove 0,(appheight / 2)          ' SET BOTTOM
            DocMaximize 1
            ToolsOptionsView .WrapToWindow = 0
            AppMinimize newapp$ 'BUG FIX
            AppRestore newapp$
            AppMove newapp$, 0, 0
            AppSize newapp$, appwidth, appheight / 2
            AppMove newapp$, 0, 0          ' SET TOP
            ScreenRefresh
      End If If max$ = "yes" Then
```

```
        AppMaximize 1
        DocMaximize 1
        ToolsOptionsView .WrapToWindow = 0
    End If
    End Sub
```

III.    A FIRST PREFERRED EMBODIMENT - VIEW2™.

```
    Dim Shared WinList$, yours, yours$, other, other$, morepanel,
5   HelpText$(81)

Sub MAIN
    ScreenUpdating  0
    DisableInput 1
10  On Error Goto bye

'OPEN DOCUMENT IF NONE OPEN
    If Window() = 0 Then
        FileNewDefault
15      DocMaximize 1
        morepanel = 1
    End If 'PRINT PREVIEW MESSAGE
20  If MacroNameFromWindow$() = "" Then
        If FilePrintPreview() = - 1 Then
        button =  MsgBox("Would you like to exit print preview and
    use View2?", "View2", 36)
            If button = - 1 Then
25              ClosePreview
            Else
            Goto bye
            End If
        End If
30  End If yours$ = WindowName$()'NOTE NAME OF ACTIVE WINDOW
    yours = Window()          'NOTE NUMBER OF ACTIVE WINDOW 35  'DIMENSION THE WINDOW ARRAY
    numwin = CountWindows() - 1
    Dim WinList$(numwin)
    For count = 0 To numwin
        WinList$(count) = WindowName$(count + 1)
40  Next 'DISPLAY THE DIALOG BOX
    Begin Dialog UserDialog 381, 215, "View2", .view2
45      'MAIN PANEL
        Text 10, 9, 220, 14, "Text", .active        '0
        Text 10, 184, 240, 26, "Text", .banter      '1
        ListBox 10, 25, 220, 99, WinList$(), .winlist    '2
```

```
        'DYNAMIC CONTROLS
        GroupBox 10, 129, 220, 50, "Text", .putit     '3
        OptionGroup  .leftright                    '4
        OptionButton 38, 145, 95, 19, "Text", .left  '5
 5      OptionButton 140, 145, 80, 19, "Text", .right'6

'MAIN PANEL
        GroupBox 250, 129, 123, 50, "Arrange", .arrange  '7
        OptionGroup .split                               '8
10      OptionButton 260, 140, 99, 19, "&Vertical", .ver  '9
        OptionButton 260, 155, 99, 19, "Hori&zontal", .hoz    '10
        OKButton 252, 6, 120, 20                     '11
        CancelButton 252, 30, 120, 20, .can              '12
        'CANCEL/CLOSE BUTTON
15      PushButton 252, 54, 120, 20, "Text ", .all       '13
        'MAX/VIEW/MIN BUTTON
        PushButton 252, 78, 120, 20, "&Switch To", .activ   '14
        PushButton 252, 102, 120, 20, "&Help", .help     '15
        PushButton 252, 187, 120, 20, "&File", .more     '16
20
        'MORE PANEL
        PushButton 10, 187, 114, 20, "&Open File...", .open    '17
        PushButton 130, 187, 115, 20, "&Close File", .clos     '18
        PushButton 252, 187, 120, 20, "Hi&de", .hid            '19
25
        'HELP PANEL
        ListBox 2, 4, 377, 150, HelpText$(), .helplist     '20
        PushButton 252, 162, 120, 20, "&About", .about     '21
        PushButton 252, 187, 120, 20, "&Back", .back '22
30      Text 10, 170, 220, 15, "(c) 1995 by Michael M. Ross."'23
        Text 10, 185, 232, 15, "    All rights reserved."'24
        GroupBox 5, 155, 240, 52, ""  '25

End Dialog
35  Dim dlg As UserDialog           'DEFINE DIALOG RECORD
    x = Dialog(dlg)      'DISPLAY THE DIALOG BOX
    bye:
    If Err = 26 Then
        Beep
40      MsgBox "This command is not available because another dialog
    box is active.", - 2
    End If
    End Sub 45  Function view2(id$, action, suppvalue)
    On Error Goto exit
    'SHOW/HIDE PANELS
    Select Case action
```

```
'INITIALIZE DIALOG
Case 1
ShowHideHelpPanel 0

'SHOW HIDDEN PANEL IF ONLY DEFAULT DOC OPEN
If morepanel = 1 Then
        DlgVisible "hid", 1
        DlgFocus "hid"
        DlgVisible "more", 0
        DlgVisible "banter", 0
        ShowHideMorePanel 1
        DlgEnable "clos", 0
Else
        ShowHideMorePanel 0
End If DlgEnable "split", 0
DlgEnable "activ", 0

'PRESELECT ACTIVE DOCUMENT IN LISTBOX
DlgValue "winlist", yours - 1

Case 2
'NOTE NUMBER OF SELECTED WINDOW
other  = DlgValue("winlist") + 1
'NOTE NAME OF SELECTED WINDOW
other$ = DlgText$("winlist")

'BUTTON CONTROL
If id$ = "can" Then
        thisone$ = WindowName$(yours)
        Activate thisone$
        Goto exit
End If If id$ = "OK" Then
        If yours = other And DlgValue("leftright") = 0 Then Goto
pass 'IF ONLY MAXIMIZING
        thisone$ = WindowName$(yours)
        Activate thisone$
        If MacroNameFromWindow$() <> "" Then    'TEST FOR MACRO
WINDOW
            MsgBox "This command is not available with macro
windows.", "View2", 48
            Goto again
        End If
        thisone$ = WindowName$(other)
        Activate thisone$
        If MacroNameFromWindow$() <> "" Then    'TEST FOR MACRO
```

```
       WINDOW
              MsgBox "This command is not available with macro
       windows.", "View2", 48
              thisone$ = WindowName$(yours)
 5            Activate thisone$
              Goto again
         End If
         If CommandValid("ToolsProtectDocument") = 0 Then   'TEST FOR
       PROTECTED DOC
10            MsgBox "This command is not available with protected
       documents.", "View2", 48
              thisone$ = WindowName$(yours)
              Activate thisone$
              Goto again
15       End If
       pass:
       If yours <> other Then ArrangeWindows    'CALL ARRANGE WINDOWS
       SUBROUTINE
       If yours = other Then SameWindows   'CALL SAME WINDOWS SUBROUTINE
20     Goto exit
       End If
       again:

'PRESS EXTRA FOR MORE PANEL
25     If id$ = "more" Then
              DlgVisible "hid", 1
              DlgFocus "hid"
              DlgVisible "more", 0
              DlgVisible "banter", 0
30            ShowHideMorePanel 1
       End If
       view2 = 1

'OPEN FILE DIALOG
35     If id$ = "open" Then
       view2 = 1
       Dim dlg As FileOpen
       GetCurValues dlg 40     n = Dialog(dlg)
       Return$ = dlg.Name If Return$ = "*.*" Or Return$ = "*.doc" Or Return$ = "*.dot" Or
       Return$ = "*.rtf" Or Return$ = "*.txt" Then Goto exit   'FIND FILE
45     BUGFIX If Return$ = "" Then Goto exit
       Return$ = Return$ + " "
```

50

```
        While Return$ <> ""

If Left$(Return$, 1) = Chr$(34) Then
                FName$ = Left$(Return$, InStr(2, Return$, Chr$(34)))
 5              Return$ = LTrim$(Mid$(Return$, Len(FName$) + 1))
            Else
                FName$ = Left$(Return$, InStr(1, Return$, Chr$(32)))
                Return$ = LTrim$(Mid$(Return$, Len(FName$)))
            End If
10      FileOpen FName$
        Call NewList
        DocMaximize 1
        ScreenRefresh
15      Wend view2 = 1
        End If 20      'CLOSE FILE
        If id$ = "clos" Then
            before = CountWindows()    'RECORD WINDOW COUNT
            WindowList other
            DocClose 0
25          If before > CountWindows() Then
                Call NewList
                ScreenRefresh
            Else
                WindowList yours
30          End If
        End If 'ACTIVATE FILE
        If id$ = "activ" Then
35          thisone$ = WindowName$(other)
            Activate thisone$
            If DocMinimize() Then
                DocMaximize 1
                DlgText$ "all", "&View All"
40          End If
            yours = Window()
            yours$ = DlgText$("winlist")
            DlgText$ "active", "View " + yours$
            DlgText "left", "&Max."
45          DlgText "right", "&Twice"
            DlgText$ "can", "Close"
            DlgFocus "winlist"
            ScreenRefresh
        End If
```

```
      'PRESS BACK TO HIDE MORE PANEL
      If id$ = "hid" Then
          DlgVisible "more", 1
          DlgFocus "more"
 5        DlgFocus "winlist"
          ShowHideMorePanel 0
          DlgVisible "banter", 1
          End If
      view2 = 1
10

'PRESS HELP FOR HELP PANEL
      If id$ = "help" Then
          HelpStringText
15        DlgListBoxArray "helplist", HelpText$()
          DlgVisible "back", 1
          DlgFocus "back"
          ShowHideMorePanel 0
          ShowHideMainPanel 0
20        ShowHideDynamicPanel 0
          ShowHideHelpPanel 1
      End If 'KEEP OFF THE LIST
25    If id$ = "helplist" Then DlgFocus "back"

'PRESS BACK FOR MAIN PANEL
      If id$ = "back" Then
          DlgVisible "OK", 1
30        DlgFocus "OK"
          ShowHideHelpPanel 0
          ShowHideMainPanel 1
          ShowHideDynamicPanel 1
          ShowHideMorePanel 0
35        DlgFocus("winlist")

If yours <> other And DlgValue("split") = 0 Then
          DlgText "left", "&Left"
          DlgText "right", "&Right"
40    ElseIf yours <> other And DlgValue("split") = 1 Then
          DlgText "left", "&Top"
          DlgText "right", "&Bottom"
      ElseIf yours = other Then
          DlgText "left", "&Max."
45        DlgText "right", "&Twice"
      End If
      End If Case Else
```

52

```
      End Select

'DYNAMIC AND STATIC TEXT CONTROLS
      Select Case action
 5    Case 1
      'RETURN NAME OF ACTIVE DOCUMENT
      DlgText$ "active", "View " + yours$ 'RETURN NAME OF SELECTED DOCUMENT
10    DlgText$ "putit", "Show"

'SET BUTTON NAMES
      DlgText$ "all", "Vie&w All"
      DlgText$ "can", "Cancel"
15
      'SET DYNAMIC CONTROLS
      DlgText$ "left", "&Max."
      DlgText$ "right", "&Twice"

20    'SET BANTER TEXT
      DlgText$ "banter", "Maximize your active document or choose
      another one."
      ScreenRefresh 25    Case 2
      'SHOW NAME OF SELECTED DOCUMENT IF DIFFERENT
      If other <> yours Then
          DlgText$ "putit", "Show " + other$
          DlgText$ "active", "View " + yours$ + " with:"
30    Else
          DlgText$ "putit", "Show"
          DlgText$ "active", "View " + yours$
      End If 35    'SET DYNAMIC CONTROLS
      If DlgFocus$() <> "back" And DlgFocus$() <> "helplist" Then
          If yours <> other And DlgValue("split") = 0 Then
              DlgText "left", "&Left"
              DlgText "right", "&Right"
40        ElseIf yours <> other And DlgValue("split") = 1 Then
              DlgText "left", "&Top"
              DlgText "right", "&Bottom"
          ElseIf yours = other Then
              DlgText "left", "&Max."
45            DlgText "right", "&Twice"
          End If
      End If

'DIM STANDARD CONTROLS IF MAX IS SELECTED
```

53

```
        If yours = other And DlgValue("leftright") = 0 Then
            DlgEnable "split", 0
            Else
            DlgEnable "split", 1
 5      End If 'ENABLE/DISABLE SWITCH TO
        If yours = other Then
            DlgEnable "activ", 0
10      Else
            DlgEnable "activ", 1
        End If 'ENABLE/DISABLE CLOSE FILE
15      If DlgListBoxArray("winlist") = 1 Then
            DlgEnable "clos", 0
            Else
            DlgEnable "clos", 1
        End If
20
        'DISPLAY THE ABOUT MESSAGE
        If id$ = "about" Then
            view2 = 1
            number = CountWindows()
25          If number = 1 Then
                MsgBox "You have 1 window open.", "View2 Trivia", 64
                MsgBox "View2 is freeware. If you find it useful, let
        me know and let other Word users know too.", " About View2", 64
                MsgBox "Send comments or suggestions to
30      mross@adpt.co.il or (CompuServe)100274,2520.", "About View2", 64
                DlgFocus "back"
            Else
                MsgBox "You have" + Str$(number) + " windows open.", "
        View2 Trivia ", 64
35              MsgBox "View2 is freeware. If you find it useful, let
        me know and let other Word users know too.", " About View2", 64
                MsgBox "Send comments or suggestions to
        mross@adpt.co.il or (CompuServe)100274,2520.", "About View2", 64
                DlgFocus "back"
40          End If
        End If 'TOGGLE BUTTON(MAXIMIZE/VIEW ALL/MINIMIZE)
45      If id$ = "all" Then
            If DlgText$("all") = "Mi&n. All" Then
                For count = 1 To CountWindows()
                    WindowList(count)
                    DocMinimize
```

```
            Next
            thisone$ = WindowName$(yours)
            Activate thisone$
            view2 = 1
 5          DlgText$ "all", "Ma&x. All"
            ScreenRefresh
        ElseIf DlgText$("all") = "Ma&x. All" Then
            For count = 1 To CountWindows()
                WindowList(count)
10              DocMaximize 1
            Next
            WindowList yours
            view2 = 1
            DlgText$ "all", "Vie&w All"
15          DlgFocus "winlist"
            ScreenRefresh
        Else
            For count = 1 To CountWindows()
                WindowList(count)
20              If DocMaximize() Or DocMinimize() Then DocRestore
            Next
            WindowList yours
            WindowArrangeAll
            DlgText$ "all", "Mi&n. All"
25          DlgText$ "can", "Close"
            ScreenRefresh
        End If
    End If 30  'CHANGE BANTER TEXT
    If yours = other And DlgValue("leftright") = 0 Then
            DlgText$ "banter", "Maximize your active document or
    choose another one."
        ElseIf  yours = other And DlgValue("leftright") = 1 Then
35          DlgText$ "banter", "Display your active document with
    itself."
        ElseIf yours <> other And DlgValue("split") = 0 Then
            DlgText$ "banter", "Display your active document side
    by side with another one."
40      ElseIf yours <> other And DlgValue("split") = 1 Then
            DlgText$ "banter", "Display your active document above
    or below another one."
    End If 45  Case Else
    End Select
    exit:
    End Function
```

```
     'DISPLAY MAIN PANEL CONTROLS
     Sub ShowHideMainPanel(ShoworHide)
     For count = 0 To 2
     DlgVisible count, ShoworHide
  5  Next
     For count = 7 To 16
     DlgVisible count, ShoworHide
     Next
     End Sub
 10
     'DISPLAY DYNAMIC CONTROLS
     Sub ShowHideDynamicPanel(ShowOrHide)
     For count = 3 To 6
     DlgVisible count, ShowOrHide
 15  Next
     End Sub 'DISPLAY MORE PANEL CONTROLS
     Sub ShowHideMorePanel(ShowOrHide)
 20  For count = 17 To 19
     DlgVisible count, ShowOrHide
     Next
     End Sub 25  'DISPLAY HELP PANEL CONTROLS
     Sub ShowHideHelpPanel(ShowOrHide)
     For count = 20 To 25
     DlgVisible count, ShowOrHide
     Next
 30  End Sub 'REFRESH ARRAY AND UPDATE TEXT
     Sub NewList
     On Error Goto zip
 35  before = DlgListBoxArray("winlist")      'RECORD WINDOW COUNT
     numwin = CountWindows() - 1
     Dim WinList$(numwin)
     For count = 0 To numwin
         WinList$(count) = WindowName$(count + 1)
 40  Next
     DlgListBoxArray "winlist", WinList$()

If before <> DlgListBoxArray("winlist") Then 'IF WINDOW COUNT HAS
     'CHANGED THEN A FILE'S BEEN OPENED OR CLOSED, SO UPDATE ALL THIS
 45  STUFF yours = Window()          'NOTE NUMBER OF ACTIVE WINDOW

'PRESELECT ACTIVE DOCUMENT IN LISTBOX
```

56

```
        DlgValue "winlist", yours - 1
        other  = DlgValue("winlist") + 1    'NOTE NUMBER OF SELECTED
        WINDOW 5      'RETURN NAME OF ACTIVE DOCUMENT
        yours$ = WindowName$()'NOTE NAME OF ACTIVE DOC
        DlgText$ "active", "View " + yours$ 'SET DYNAMIC CONTROLS
10      DlgText$ "left", "&Max."
        DlgText$ "right", "&Twice"
        DlgText$ "all", "Vie&w All"

'SET BANTER TEXT
15      DlgText$ "banter", "Maximize your active document or choose
        another one."
        DlgEnable "split", 0
        DlgFocus "winlist"
        DlgText$ "can", "Close"   'CHANGE CANCEL TO CLOSE
20
        'ENABLE/DISABLE CLOSE FILE BUTTON
        If DlgListBoxArray("winlist") = 1 Then
            DlgEnable "clos", 0
            Else
25          DlgEnable "clos", 1
        End If
        End If zip:
30      x = 0
        End Sub 'HELP TEXT SUBROUTINE
        Sub HelpStringText
35      HelpText$(0) = " HELP                              >>Scroll
        down>>"
        HelpText$(1)  = " "
        HelpText$(2)  = " Do side-by-side or up-and-down editing in "
        HelpText$(3)  = " Word. When working with multiple"
40      HelpText$(4)  = " documents, View2 gives you control "
        HelpText$(5)  = " over your desktop, letting you arrange the "
        HelpText$(6)  = " windows you want vertically or horizontally."
        HelpText$(7)  = " "
        HelpText$(8)  = " INSTRUCTIONS:"
45      HelpText$(9)  = " View2 is easy to use. It has dynamic"
        HelpText$(10) = " controls and text to guide you."
        HelpText$(11) = " "
        HelpText$(12) = " 1. When you start View2, the name of your"
        HelpText$(13) = "    active document is above the list box"
```

```
        HelpText$(14) = "    and is also preselected in the list."
        HelpText$(15) = " 2. You can select any open document from"
        HelpText$(16) = "    the list. Its name appears beneath the
                          list"
 5      HelpText$(17) = "    with the actions you can perform on it."
        HelpText$(18) = " 3. When you choose OK, View2 arranges"
        HelpText$(19) = "    the document you select with your"
        HelpText$(20) = "    active document, either side by side or"
        HelpText$(21) = "    up and down, according to your choice."
10      HelpText$(22) = " 4. If you do not select another document,"
        HelpText$(23) = "    View2 maximizes your active one."
        HelpText$(24) = "    Choose this option when you're ready to"
        HelpText$(25) = "    return to full-screen editing because"
        HelpText$(26) = "    it unwraps the text in all open windows."
15      HelpText$(27) = " "
        HelpText$(28) = " To do side-by-side editing:"
        HelpText$(29) = " 1. Select the Vertical option button if you"
        HelpText$(30) = "    want to view the document you select"
        HelpText$(31) = "    to the left or right of your active one."
20      HelpText$(32) = " 2. Choose the Left or Right option buttons"
        HelpText$(33) = "    that appear below the list box."
        HelpText$(34) = " "
        HelpText$(35) = " To do up-and-down editing:"
        HelpText$(36) = " 1. Select the Horizontal option button if"
25      HelpText$(37) = "    you want to view the document you "
        HelpText$(38) = "    select above or below your active one."
        HelpText$(39) = " 2. Choose the Top or Bottom option "
        HelpText$(40) = "    buttons that appear below the list box."
        HelpText$(41) = " "
30      HelpText$(42) = " To do same-document editing:"
        HelpText$(43) = " 1. Leave your active document selected"
        HelpText$(44) = "    in the list if you want to maximize it or"
        HelpText$(45) = "    view it with a new window of itself."
        HelpText$(46) = " 2. Choose the Max. or Twice option"
35      HelpText$(47) = "    buttons that appear below the list box."
        HelpText$(48) = " 3. If you choose Twice, choose the"
        HelpText$(49) = "    Vertical or Horizontal buttons."
        HelpText$(50) = " "
        HelpText$(51) = " To make another document the active one:"
40      HelpText$(52) = " 1. Select the document in the list box."
        HelpText$(53) = " 2. Choose the Active button. The document"
        HelpText$(54) = "    is displayed and its name appears above"
        HelpText$(55) = "    the list box."
        HelpText$(56) = " "
45      HelpText$(57) = " To arrange, minimize, or maximize all your"
        HelpText$(58) = "    windows:"
        HelpText$(59) = " 1. Choose the View All button to arrange"
        HelpText$(60) = "    all your open documents. The button"
        HelpText$(61) = "    toggles to Min. All."
```

```
    HelpText$(62) = " 2. Choose the Min. All button to minimize"
    HelpText$(63) = "    all your open documents. The button"
    HelpText$(64) = "    toggles to Max. All."
    HelpText$(65) = " 3. Choose the Max. All button to maximize"
5   HelpText$(66) = "    all your open documents. The button"
    HelpText$(67) = "    toggles to View All."
    HelpText$(68) = " "
    HelpText$(69) = " To open a new file:"
    HelpText$(70) = " 1. Choose the Extra button to display the"
10  HelpText$(71) = "    hidden panel."
    HelpText$(72) = " 2. Choose the Open File button. The File"
    HelpText$(73) = "    Open dialog box appears."
    HelpText$(74) = " 3. The file you select to open becomes the"
    HelpText$(75) = "    active document."
15  HelpText$(76) = " "
    HelpText$(77) = " To close a file or new window:"
    HelpText$(78) = " 1. Select the file or new window in the"
    HelpText$(79) = "    list box."
    HelpText$(80) = " 2. Choose the Close File button from the"
20  HelpText$(81) = "    hidden panel."
    End Sub 'ARRANGE DIFFERENT WINDOWS
    Sub ArrangeWindows
25  On Error Goto problem
    'VERTICAL SPLIT
    If DlgValue("split") = 0 Then
        If DocMaximize() Or DocMinimize() Then DocRestore
        ViewZoom100         'SWITCH TO NORMAL VIEW
30      ToolsOptionsView .WrapToWindow = 1 'WRAP TEXT
        DocSize(Val(AppInfo$(6)) / 2), Val(AppInfo$(7))    'SIZE
    WINDOW
        docwidth = DocWindowWidth()'SET VARIABLE FOR DOC WIDTH
        If DlgValue("leftright") = 0 Then DocMove 0, 0    Else
35  DocMove(docwidth), 0         ' SET LEFT/RIGHT ' ACTIVE DOCUMENT
        WindowList yours
        If DocMaximize() Or DocMinimize() Then DocRestore
40      ViewZoom100         'SWITCH TO NORMAL VIEW
        ToolsOptionsView .WrapToWindow = 1 'WRAP TEXT
        DocSize(Val(AppInfo$(6)) / 2), Val(AppInfo$(7))    'SIZE
    WINDOW
        If DlgValue("leftright") = 0 Then DocMove(docwidth), 0
45      Else DocMove 0, 0    'SET LEFT/RIGHT
    End If 'HORIZONTAL SPLIT
    If DlgValue("split") = 1 Then
```

```
            If DocMaximize() Or DocMinimize() Then DocRestore
            ViewZoom100          'SWITCH TO NORMAL VIEW
            ToolsOptionsView .WrapToWindow = 0 'UNWRAP TEXT
            DocSize(Val(AppInfo$(6)), Val(AppInfo$(7)) / 2)    'SIZE
 5    WINDOW
            docheight = DocWindowHeight()'SET VARIABLE FOR DOC WIDTH
            If DlgValue("leftright") = 0 Then DocMove 0, 0      Else
      DocMove 0,(docheight)     ' SET TOP/BOTTOM 10    ' ACTIVE DOCUMENT
            WindowList yours
            If DocMaximize() Or DocMinimize() Then DocRestore
            ViewZoom100          'SWITCH TO NORMAL VIEW
            ToolsOptionsView .WrapToWindow = 0 'UNWRAP TEXT
15          DocSize(Val(AppInfo$(6)), Val(AppInfo$(7)) / 2)    'SIZE
      WINDOW
            If DlgValue("leftright") = 0 Then DocMove 0,(docheight)
            Else DocMove 0, 0   'SET TOP/BOTTOM
      End If
20    problem:
      End Sub 'ARRANGE SAME WINDOWS
25    Sub SameWindows
      On Error Goto problem
      'MAXIMIZE WINDOW AND UNWRAP TEXT
      If DlgValue("leftright") = 0 Then
            For count = 1 To CountWindows()
30                WindowList(count)
                  ToolsOptionsView .WrapToWindow = 0
            Next
            WindowList yours
            DocMaximize 1
35    End If 'DISPLAY ACTIVE WINDOW WITH NEW WINDOW OF ITSELF
      'VERTICAL SPLIT
      If DlgValue("leftright") = 1 And DlgValue("split") = 0 Then
40          If DocMaximize() Or DocMinimize() Then DocRestore
            ViewZoom100          'SWITCH TO NORMAL VIEW
            ToolsOptionsView .WrapToWindow = 0 'UNWRAP TEXT
            ToolsOptionsView .WrapToWindow = 1 'WRAP WINDOW
            DocSize(Val(AppInfo$(6)) / 2), Val(AppInfo$(7))    'HALF SIZE
45          docwidth = DocWindowWidth()    'SET VARIABLE FOR DOC WIDTH
            DocMove 0, 0    ' SET LEFT 'CREATE AND SIZE NEW WINDOW
            old = Window() 'NOTE ORIGINAL WINDOW LIST NUMBER
```

```
            WindowNewWindow
            If DocMaximize() Or DocMinimize() Then DocRestore
            ViewZoom100         'SWITCH TO NORMAL VIEW
            ToolsOptionsView .WrapToWindow = 1 'WRAP TEXT
 5          DocSize(Val(AppInfo$(6)) / 2), Val(AppInfo$(7))    'SIZE
       WINDOW
            DocMove(docwidth), 0     'SET RIGHT
            WindowList(old)      'ACTIVATE ORIGINAL WINDOW
       End If
10
       'HORIZONTAL SPLIT
       If DlgValue("leftright") = 1 And DlgValue("split") = 1 Then
            If DocMaximize() Or DocMinimize() Then DocRestore
            ViewZoom100         'SWITCH TO NORMAL VIEW
15          DocSize(Val(AppInfo$(6)), Val(AppInfo$(7)) / 2)    'SIZE
       WINDOW
            DocMove 0, 0    'SET TOP 'CREATE AND SIZE NEW WINDOW
20          old = Window() 'NOTE ORIGINAL WINDOW LIST NUMBER
            WindowNewWindow
            If DocMaximize() Or DocMinimize() Then DocRestore
            ViewZoom100         'SWITCH TO NORMAL VIEW
            DocSize(Val(AppInfo$(6)), Val(AppInfo$(7)) / 2)    'SIZE
25     WINDOW
            docheight = DocWindowHeight()'SET VARIABLE FOR DOC WIDTH
            DocMove 0,(docheight)    ' SET BOTTOM
            WindowList(old)      'ACTIVATE ORIGINAL WINDOW
       End If
30     problem:
       End Sub
```

61

IV. A SECOND PREFERRED EMBODIMENT - VIEW2™ PLUS.

A. THIS IS A SIMPLE PARSER FOR CALLING THE WORD 6 OR WORD 7 VERSIONS OF THE SECOND EMBODIMENT.

[IT IS REQUIRED BECAUSE THE SECOND EMBODIMENT MAKES A FEW API CALLS THAT HAVE TO BE 16-BIT FOR WORD 6 AND 32-BIT FOR WORD 7.]

```
Sub MAIN

'WORD 6
If InStr(AppInfo$(2), "6.0") <> 0 Then
View2Plus16

'WORD 7
ElseIf InStr(AppInfo$(2), "7.0") <> 0 Then
View2Plus32
End If

End Sub
```

B. MAIN MACRO OF THE FIRST EMBODIMENT FOR WORD 6 (WITH 16-BIT API DECLARATIONS).

[IT CONTAINS THE CODE FOR DIMENSIONING THE DOCUMENT AND APPLICATION ARRAY, DISPLAYING THE DIALOG BOX, AND PREVIEWING, SIZING, POSITION, AND ACTIVATING DOCUMENT WINDOWS. IT ALSO CONTAINS A TIMER MECHANISM TO CALL THE SUPPLEMENTAL MACRO BECAUSE WORDBASIC CANNOT CALL OTHER MACROS WITHOUT RETURNING CONTROL TO THE CALLING MACRO.]

```
'DECLARE SHARED VARIABLES
Dim Shared WinList$, firstyours, yours, yours$, other, other$,
oldyours, oldyours$, newyours, newyours$, yourapp$, newapp$,
morepanel 'API DECLARATIONS FOR HELP FILE
Declare Function WinHelp Lib "User"(hWnd As Integer, lpHelpFile
As String, wCommand As Integer, dwData As String) As Integer 'API DECLARATIONS FOR TASK LIST
Declare Function FindWindow Lib "user"(ClassName As Long,
WindowTitle$) As Integer
Declare Function IsWindowVisible Lib "user"(hWnd As Integer) As
Integer 'PREVENT SCREEN REFRESH API DECLARATIONS
Declare Function GetDesktopWindow Lib "user"() As Integer
Declare Sub LockWindowUpdate Lib "user"(hWnd As Integer)

Sub MAIN
ScreenUpdating 0
DisableInput 1
On Error Goto bye

'OPEN DOCUMENT IF NONE OPEN
If Window() = 0 Then
      FileNewDefault
      DocMaximize 1
      morepanel = 1
End If
```

```
     'PRINT PREVIEW MESSAGE
     If MacroNameFromWindow$() = "" Then
         If FilePrintPreview() = - 1 Then
         button =  MsgBox("Would you like to exit print preview and
5    use View2 Plus?", "View2 Plus", 36)
             If button = - 1 Then
                 ClosePreview
             Else
             Goto bye
10           End If
         End If
     End If 'NOTE NAME AND NUMBER OF ACTIVE DOC
15   yours$ = WindowName$()
     yours = Window()
     firstyours = Window()

'DIMENSION THE WINDOW ARRAY
20   numwin = CountWindows() - 1
     Dim WinList$(numwin)
     For count = 0 To numwin
         WinList$(count) = WindowName$(count + 1)
     Next
25
     'DIMENSION THE APPLICATION ARRAY
     If InStr(AppInfo$(1), "95") <> 0 Then
         AppHide "Program Manager"
     End If
30   Dim AppNames$(AppCount()), TempArray$(AppCount())
     AppGetNames TempArray$()
     For x = 0 To AppCount() - 1
         If IsWindowVisible(FindWindow(0, TempArray$(x))) = 1 Then
             AppNames$(num) = TempArray$(x)
35           num = num + 1
         End If
     Next x
     AppNames$(num) = ""
     SortArray AppNames$(), 0, 0, num - 1
40   If InStr(AppInfo$(1), "95") <> 0 Then
         AppShow "Program Manager"
         AppActivate "Microsoft Word", 1
     End If 45   'DISPLAY THE DIALOG BOX
     Begin Dialog UserDialog 550, 235, "View2 Plus", .view2plus 'MAIN PANEL
         Text 17, 7, 395, 14, "Text", .active              '0
```

64

```
           Text 255, 7, 160, 14, "Text", .selected        '1
           ListBox 15, 23, 220, 123, WinList$(), .winlist    '2
           ListBox 15, 23, 379, 123, AppNames$(), .applist   '3

5         'DYNAMIC PANEL
           GroupBox 15, 153, 222, 50, "Text", .putit         '4
           OptionGroup  .leftright                           '5
               OptionButton 38, 169, 95, 19, "Text", .left   '6
               OptionButton 140, 169, 80, 19, "Text", .right    '7
10         Text 17, 208, 370, 26, "Text", .banter            '8

'HIDDEN SPLIT PANEL
           GroupBox 15, 153, 222, 80, "Text", .splitit
           '9
15         OptionGroup  .leftrightsplit         'QUARTER             '10
               OptionButton 28, 185, 95, 19, "&Left", .leftsplit
           '11
               OptionButton 140, 185, 80, 19, "&Right", .rightsplit
           '12
20         OptionGroup  .splitsplit         'HALF/QUARTER            '13
               OptionButton 28, 185, 95, 19, "&Left", .lefthalfsplit
           '14
               OptionButton 85, 164, 105, 19, "&Top", .versplit
           '15
25             OptionButton 140, 185, 80, 19, "&Right",
     .righthalfsplit      '16
               OptionButton 85, 209, 105, 19, "&Bottom", .hozsplit
                   '17

30         'MAIN PANEL
           FilePreview 255, 23, 140, 125, .prev              '18
           GroupBox 255, 153, 142, 50, "Text", .arrange '19
           OptionGroup .split                                '20
               OptionButton 270, 164, 99, 19, "Text", .ver   '21
35             OptionButton 270, 179, 99, 19, "Text", .hoz   '22
           CheckBox 255, 207, 160, 25, "K&eep the Dialog Box
     Displayed", .keep   '23
               OKButton 415, 6, 120, 20                      '24
               CancelButton 415, 30, 120, 20, .can           '25
40         PushButton 415, 54, 120, 20, "Text", .all         '26
           PushButton 415, 78, 120, 20, "Text", .act         '27
           PushButton 415, 102, 120, 20, "&Help", .help '28
           GroupBox 415, 130, 120, 100, "Mode", .file        '29
           PushButton 430, 150, 90, 20, "Text", .app         '30
45         PushButton 430, 175, 90, 20, "Text", .activ       '31
           PushButton 430, 200, 90, 20, "Text", .fil         '32

'HIDDEN FILE PANEL
           PushButton 15, 210, 120, 20, "&Open File...", .open    '33
```

65

```
            PushButton 145, 210, 120, 20, "&Close File", .clos     '34
            PushButton 275, 210, 120, 20, "Co&py File...", .cop    '35

5      End Dialog
        Dim dlg As UserDialog         'DEFINE DIALOG RECORD
        x = Dialog(dlg)     'DISPLAY THE DIALOG BOX
        bye:
        If Err = 26 Then
10          Beep
            MsgBox "This command is not available because another dialog
        box is active.", - 2
        End If
        End Sub
15
        Function view2plus(id$, action, suppvalue)
        On Error Goto exit
        'INITIALIZE DIALOG
        Select Case action
20
        'INITIALIZE DIALOG
        Case 1
        ShowHideSplitPanel 0

25      'SHOW HIDDEN FILE PANEL IF ONLY DEFAULT DOC OPEN
        If morepanel = 1 Then
            DlgText "fil", "Hi&de"
            DlgVisible "banter", 0
            ShowHideHiddenPanel 1
30          DlgEnable "clos", 0
        Else
            DlgText$ "fil", "&File"
            ShowHideHiddenPanel 0
        End If
35
        DlgVisible "applist", 0
        DlgVisible "keep", 0
        DlgEnable "split", 0
        DlgEnable "act", 0
40
        'PRESELECT ACTIVE DOCUMENT IN LISTBOX
        DlgValue "winlist", yours - 1

'RETURN NAME OF ACTIVE DOCUMENT
45      DlgText$ "active", "View " + yours$
        DlgText$ "selected", ""

'RETURN NAME OF SELECTED DOCUMENT
        other$ = DlgText$("winlist")
```

```
        DlgText$ "putit", "Show"

'SET CONTROL NAMES
        DlgText$ "all", "&View All"
 5      DlgText$ "activ", "&Window"
        DlgText$ "can", "Cancel"
        DlgText$ "ver", "&Vertical"
        DlgText$ "hoz", "Hori&zontal "
        DlgText$ "act", "Switc&h To"
10      DlgText$ "app", "Tas&k List"
        DlgText$ "arrange", "Arrange"
        DlgText$ "left", "&Max."
        DlgText$ "right", "&Twice"

15      Case 2
        'NOTE NAME AND NUMBER OF SELECTED DOC
        other$ = DlgText$("winlist")
        other  = DlgValue("winlist") + 1

20      'NOTE NAME OF SELECTED APPLICATION
        newapp$ = DlgText$("applist")

'BUTTON CONTROL
        If id$ = "can" Then
25           thisone$ = WindowName$(yours)
             Activate thisone$
             Goto exit
        End If 30      If id$ = "OK" Then
        WindowList other
             If DlgText$("app") = "Tas&k List" Then
                If yours = other And DlgValue("leftright") = 0 And
             DlgText$("activ") = "&Window" Then Goto pass 'IF ONLY
35      MAXIMIZING
             If DlgText$("activ") = "&Normal" Then Goto thisbit
             If yours <> other Then ArrangeWindows   'CALL ARRANGE
        WINDOWS SUBROUTINE
             If yours = other Then
40               If MacroNameFromWindow$() <> "" Then    'TEST FOR MACRO
        WINDOW
                 MsgBox "This command is not available with macro
        windows.", "View2 Plus", 48
                 WindowList yours
45               view2plus = 1
                 Goto again
                 End If
             End If
        pass:
```

67

```
        If yours = other Then SameWindows   'CALL SAME WINDOWS SUBROUTINE
        Goto exit
        thisbit:
        If DlgValue("split") = 0 Then Call halfcut
 5      If DlgValue("split") = 1 Then Call quartercut
        Goto exit
        Else
        ArrangeApps
        End If
10      End If
        again:

'OPEN FILE DIALOG
        If id$ = "open" Then
15          view2plus = 1
        Dim dlg As FileOpen
        GetCurValues dlg n = Dialog(dlg)
20      Return$ = dlg.Name If Return$ = "*.doc" Or Return$ = "*.dot" Or Return$ = "*.rtf" Or
        Return$ = "*.txt" Then Goto exit'FIND FILE BUGFIX 25      If Return$ = "" Then Goto exit
        Return$ = Return$ + " "

While Return$ <> ""

30          If Left$(Return$, 1) = Chr$(34) Then
                FName$ = Left$(Return$, InStr(2, Return$, Chr$(34)))
                Return$ = LTrim$(Mid$(Return$, Len(FName$) + 1))
            Else
                FName$ = Left$(Return$, InStr(1, Return$, Chr$(32)))
35              Return$ = LTrim$(Mid$(Return$, Len(FName$)))
            End If FileOpen FName$
        Call NewList
40      DocMaximize 1
        ScreenRefresh
        Wend view2plus = 1
45      End If 'CLOSE FILE
        If id$ = "clos" Then
            before = CountWindows()    'RECORD WINDOW COUNT

68
```

```
            WindowList other
            Dim dlg As FileSummaryInfo
            GetCurValues dlg
            previewfilename$ = dlg.Template
 5          If CommandValid("DlgFilePreview$ previewfilename$") = - 1
       Then
                DlgFilePreview$ previewfilename$
            Else
                FileNewDefault
10              Dim dlg As FileSummaryInfo
                GetCurValues dlg
                previewfilename$ = dlg.Template
                DlgFilePreview$ previewfilename$
                FileClose 2
15          End If
            DocClose 0
            If before > CountWindows() Then
                Call NewList
            ScreenRefresh
20          Else
                WindowList yours
                previewfilename$ = FileNameFromWindow$(other)
                DlgFilePreview$ previewfilename$
            End If
25          view2plus = 1
       End If 'COPY/SAVE FILE
       If id$ = "cop" Then
30          view2plus = 1
            WindowList other 'GET PATH OF SELECTED FILE AND DISPLAY SAVE AS DIALOG BOX
       If FileNameFromWindow$() <> "" Then
35          oldyours$ = FileName$()
            oldyours = Window()
            Dim dlg As FileSaveAs
            Dialog dlg
            FileSaveAs dlg
40          newyours$ = FileName$()
            newyours = Window()
                If oldyours$ <> newyours$ Then
                Call NewList    'REFRESH ARRAY
                DocMaximize 1
45
                'QUICK UPDATE BEHIND MESSAGE BOX
                DlgValue "winlist", yours - 1
                yours$ = WindowName$()
                DlgText$ "active", "View " + yours$
```

69

```
                DlgText$ "selected", ""
                DlgText$ "putit", "Show"
                DlgText$ "left", "&Max."
                DlgText$ "right", "&Twice"
 5              DlgEnable "split", 0
                ScreenRefresh 'GIVE COPY OPTION
        button = MsgBox("Would you like to reopen the document you
10      copied?" + Chr$(10) + oldyours$, "View2 Plus", 36)
                If button = - 1 Then       'YES
                        FileOpen oldyours$
                        Call NewList       'REFRESH ARRAY
                        DocMaximize 1
15                      oldyours = ()      'EMPTY VARIABLES
                        newyours = ()
                        oldyours$ = ""
                        newyours$ = ""
                Else                       'NO
20                      WindowList yours
                        view2plus = 1
                        oldyours = ()      'EMPTY VARIABLES
                        newyours = ()
                        oldyours$ = ""
25                      newyours$ = ""
                End If
            End If
            view2plus = 1
        End If
30
        'IF FILE IS NOT SAVED
        If FileNameFromWindow$() = "" Then
                button = MsgBox("Would you like to save " + other$ + "?",
        "View2 Plus", 36)
35              If button = - 1 Then
                        Dim dlg As FileSaveAs
                        Dialog dlg
                        FileSaveAs dlg
                        Call NewList
40                      WindowList yours
                Else
                        WindowList yours
                End If
        End If
45      End If 'ACTIVATE COMMAND
        If id$ = "act" Then
        If DlgText$("app") = "Tas&k List" Then

70
```

```
            thisone$ = WindowName$(other)
            Activate thisone$
            If DocMinimize() Then
                  DocMaximize 1
 5                DlgText$ "all", "&View All"
            End If
            yours = Window()
            yours$ = DlgText$("winlist")
            If DlgText$("activ") = "&Normal" Then
10                If DlgValue("split") = 0 Then Call halfcut
                  If DlgValue("split") = 1 Then Call quartercut
            End If
            DlgText "left", "&Max."
            DlgText "right", "&Twice"
15          DlgText$ "can", "Close"
            DlgFocus "winlist"
            ScreenRefresh
            view2plus = 1
      ElseIf DlgText$("app") = "&Doc List" Then
20          DlgFocus "applist"
            If AppRestore(newapp$) Then
                  hWnd = GetDesktopWindow
                  LockWindowUpdate(hWnd)
                  AppMinimize newapp$
25                LockWindowUpdate(0)
            End If
            AppRestore newapp$
            ScreenRefresh
      End If
30    view2plus = 1
      End If 'PRESS FILE FOR HIDDEN CONTROLS
      If id$ = "fil" Then
35          view2plus = 1
            If DlgText$("fil") = "&File" Then
            DlgText "fil", "Hi&de"
            DlgVisible "banter", 0
            ShowHideHiddenPanel 1
40          view2plus = 1
      Else
            DlgText "fil", "&File"
            DlgVisible "banter", 1
            ShowHideHiddenPanel 0
45          view2plus = 1
      End If
      End If

'PRESS HELP TO CALL HELP FILE

71
```

```
      If id$ = "help" Then
          progdir$ = GetPrivateProfileString$("Microsoft Word", \
          "ProgramDir", "WINWORD6.INI")

If   DlgText$("app") = "&Doc List" Then
      x = WinHelp(hWnd, "progdir$\vew2plus.hlp", 257, "Task List Mode")
          ElseIf DlgText$("activ") = "&Normal" Then
      x = WinHelp(hWnd, "progdir$\vew2plus.hlp", 257, "Window Mode")
          ElseIf DlgText$("fil") = "Hi&de" Then
      x = WinHelp(hWnd, "progdir$\vew2plus.hlp", 257, "File Mode")
          Else
      x = WinHelp(hWnd, "progdir$\vew2plus.hlp", 257, "Normal Mode")
          End If view2plus = 1
      End If 'TOGGLE BUTTON DOC/TASK LIST
      If id$ = "app" Then
          view2plus = 1
          If  DlgText$("app") = "Tas&k List" Then
              If DlgText$("activ") = "&Normal" Then
                  DlgText$ "activ", "&Window"
                  DlgText$ "act", "Switc&h To"
                  ShowHideSplitPanel 0
                  ShowHideDynamicPanel 1
              End If
              before = DlgValue("winlist") + 1
              Call AppList
              DlgVisible "winlist", 0
              DlgVisible "prev", 0
              DlgVisible "keep", 0
              DlgVisible "applist", 1
              DlgFocus "applist"
              DlgText "app", "&Doc List"
              DlgText "arrange", "Arrange"
              DlgText "active", "View Microsoft Word"
              DlgText$ "selected", ""
              DlgText "ver", "&Vertical"
              DlgText "hoz", "Hori&zontal"
              DlgEnable "OK", 1
              DlgEnable "all", 0
              DlgEnable "activ", 0
              DlgEnable "fil", 0
              DlgText "fil", "&File"
              ShowHideHiddenPanel 0
              DlgVisible "banter", 1
              view2plus = 1
          Else
```

```
                    other = yours
                    Call NewList
                    DlgValue "winlist", yours - 1
                    DlgVisible "applist", 0
 5                  DlgVisible "winlist", 1
                    DlgVisible "prev", 1
                    DlgText "app", "Tas&k List"
                    DlgText "active", "View " + yours$
                    DlgText$ "selected", ""
10                  DlgEnable "active", 1
                    DlgEnable "all", 1
                    DlgEnable "activ", 1
                    DlgEnable "fil", 1
                    DlgEnable "right", 1
15                  DlgFocus "winlist"
                    view2plus = 1
            End If
        End If 20      'TOGGLE BUTTON(SPECIAL/NORMAL SPLIT)
        If id$ = "activ" Then
                If DlgText$("activ") = "&Window" Then
                    DlgText "activ", "&Normal"
                    DlgText "act", "&Activate"
25                  DlgText$ "active", "Choose a document:"
                    DlgText$ "selected", ""
                    DlgText$ "splitit", "Show " + other$
                    DlgText "ver", "Hal&f"
                    DlgText "hoz", "&Quarter"
30                  DlgText$ "arrange", "Size"
                    ShowHideDynamicPanel 0
                    ShowHideSplitPanel 1
                    DlgEnable "split", 1
                    DlgEnable "OK", 0
35                  DlgEnable "fil", 0
                    DlgText "fil", "&File"
                    ShowHideHiddenPanel 0
                    DlgVisible "keep", 1
                    DlgValue "keep", 0
40                  view2plus = 1
                Else
                    DlgText "activ", "&Window"
                    DlgText "act", "Switc&h To"
                    DlgText "active", "View " + yours$
45                  DlgText$ "selected", ""
                    DlgText "ver", "&Vertical"
                    DlgText "hoz", "Hori&zontal"
                    DlgText$ "arrange", "Arrange"
                    ShowHideSplitPanel 0
```

73

```
                DlgVisible "keep", 0
                ShowHideDynamicPanel 1
                DlgEnable "active", 1
                DlgEnable "act", 1
 5              DlgEnable "OK", 1
                DlgEnable "fil", 1
                DlgFocus "winlist"
                view2plus = 1
            End If
10      End If 'TOGGLE BUTTON(MAXIMIZE/VIEW ALL/MINIMIZE)
        If id$ = "all" Then
            If  DlgText$("all") = "Mi&n. All" Then
15              For count = 1 To CountWindows()
                    WindowList(count)
                    DocMinimize
                Next
                thisone$ = WindowName$(yours)
20              Activate thisone$
                view2plus = 1
                DlgText$ "all", "Ma&x. All"
                ScreenRefresh
            ElseIf DlgText$("all") = "Ma&x. All" Then
25              For count = 1 To CountWindows()
                    WindowList(count)
                    DocMaximize 1
                Next
                WindowList yours
30              view2plus = 1
                DlgText$ "all", "&View All"
                DlgFocus "winlist"
                ScreenRefresh
            Else
35              For count = 1 To CountWindows()
                    WindowList(count)
                    If DocMaximize() Or DocMinimize() Then DocRestore
                Next
                WindowList yours
40              WindowArrangeAll
                DlgText$ "all", "Mi&n. All"
                DlgText$ "can", "Close"
                ScreenRefresh
                view2plus = 1
45          End If
        End If Case Else
        exit:
```

74

```
    End Select

'DYNAMIC AND STATIC TEXT CONTROLS
    Select Case action

Case 1

'SET INITIAL BANTER TEXT
    If CountWindows() > 1 Then
        DlgText$ "banter", "Choose OK to maximize your active
    document or select another one from the list."
    Else
        DlgText$ "banter", "Choose OK to maximize your active
    document."
    End If Case 2

'DISPLAY FILE PREVIEW
    If DlgFocus$() = "winlist" Then
        previewfilename$ = FileNameFromWindow$(other)
        'THIS TEMPORARILY MAKES AN UNSAVED DOCUMENT THE ACTIVE ONE
    SO THAT THE FILE PREVIEW STATEMENT CAN WORK
        If previewfilename$ = "" Then
            thisone$ = WindowName$(other)
            Activate thisone$
            DlgFilePreview$
            thisone$ = WindowName$(yours)
            Activate thisone$
        Else
            DlgFilePreview$ previewfilename$
        End If
    End If 'ENABLE/DISABLE SWITCH TO
    If DlgText$("app") = "Tas&k List" Then
    If DlgText$("activ") = "&Window" Then
        If yours = other Then
            DlgEnable "act", 0
        Else
            DlgEnable "act", 1
        End If
    End If
    End If 'ENABLE/DISABLE CLOSE FILE
    If CountWindows() = 1 Then
        DlgEnable "clos", 0
    Else
```

75

```
            DlgEnable "clos", 1
        End If

'VIEW TEXT
 5      If DlgText$("app") = "&Doc List" Then
            If yourapp$ <> newapp$ Then
                other$ = DlgText$("winlist")
                DlgText$ "putit", "Show " + newapp$
                DlgText "active", "View Microsoft Word with " + newapp$
10              DlgText$ "selected", ""
                DlgEnable "act", 1
            ElseIf yourapp$ = newapp$ Then
                DlgText$ "putit", "Show"
                DlgText "active", "View Microsoft Word"
15              DlgText$ "selected", ""
                DlgEnable "act", 0
            End If
        End If 20      If  DlgText$("activ") = "&Window" And DlgText$("app") = "Tas&k
        List" Then
            If other <> yours Then
                DlgText$ "active", "View " + yours$ + " with:"
                DlgText$ "selected", other$
25          ElseIf other = yours Then
                DlgText$ "active", "View " + yours$
                DlgText$ "selected", ""
            End If
        End If
30
        'SHOW TEXT
        If DlgText$("activ") = "&Normal" Then
            If other <> yours Then
                other$ = DlgText$("winlist")
35              DlgText$ "splitit", "Show " + other$
            ElseIf other = yours Then
                DlgText$ "splitit", "Show " + yours$
            End If
        End If
40
        If DlgText$("app") = "Tas&k List" And DlgText$("activ") =
        "&Window" Then
            If other <> yours Then
                other$ = DlgText$("winlist")
45              DlgText$ "putit", "Show " + other$
            ElseIf other = yours Then
                DlgText$ "putit", "Show"
            End If
        End If
```

```
     'SET SPLIT DYNAMIC CONTROLS
     If DlgText$("activ") = "&Normal" And id$ = "activ" Or
     DlgText$("activ") = "&Normal" And id$ = "ver" Or
     DlgText$("activ") = "&Normal" And id$ = "hoz" Then
 5       If DlgValue("split") = 1 Then          'QUARTER
             DlgVisible "lefthalfsplit", 0 'HIDE HALF LEFT
             DlgVisible "righthalfsplit", 0    'HIDE HALF RIGHT
             DlgVisible "leftrightsplit", 1    'SHOW RIGHT
             If DlgValue("splitsplit") = 0 Or DlgValue("splitsplit")
10   = () Then 'LEFT OR NONE SELECTED
                 DlgValue "leftrightsplit", 0  'SELECT LEFT
                 DlgValue "splitsplit", 1 'SELECT TOP
             ElseIf DlgValue("splitsplit") = 1 Then  'TOP SELECTED
                 DlgValue "leftrightsplit", 0  'SELECT LEFT
15               DlgValue "splitsplit", 1 'SELECT TOP
             ElseIf DlgValue("splitsplit") = 2 Then  'RIGHT SELECTED
                 DlgValue "splitsplit", 1 'SELECT TOP
                 DlgValue "leftrightsplit", 1  'SELECT RIGHT
             ElseIf DlgValue("splitsplit") = 3 Then  'BOTTOM
20   SELECTED
                 DlgValue "leftrightsplit", 0  'SELECT LEFT
                 DlgValue "splitsplit", 3 'SELECT BOTTOM
             End If
         Else                                        'HALF
25           DlgVisible "leftrightsplit", 0    'HIDE QUARTER LEFT
             DlgVisible "lefthalfsplit", 1 'SHOW HALF LEFT
             DlgVisible "righthalfsplit", 1   'SHOW HALF RIGHT
             DlgValue "splitsplit", 0         'SELECT LEFT
             If DlgValue("leftrightsplit") = 0 Or
30   DlgValue("leftrightsplit") = () Then     'LEFT OR NONE SELECTED
                 DlgValue("splitsplit"), 0    'SELECT LEFT
             Else
                 DlgValue "splitsplit", 2 'SELECT RIGHT
             End If
35       End If
     End If 'ENABLE/DISABLE OK/ACTIVATE BUTTONS
     If DlgText$("activ") = "&Normal" Then
40       If DlgValue("keep") = 0 Then
             DlgEnable "OK", 1
             DlgEnable "act", 0
             DlgFocus "winlist"
         Else
45           DlgEnable "OK", 0
             DlgEnable "act", 1
         End If
     End If
```

```
'SET DYNAMIC CONTROLS FOR DOCUMENT LIST
If DlgText$("activ") = "&Window" And DlgText$("app") = "Tas&k
List" Then
    If yours <> other And DlgValue("split") = 0 Then
        DlgText "left", "&Left"
        DlgText "right", "&Right"
    ElseIf yours <> other And DlgValue("split") = 1 Then
        DlgText "left", "&Top"
        DlgText "right", "&Bottom"
    ElseIf yours = other Then
        DlgText "left", "&Max."
        DlgText "right", "&Twice"
    End If
End If 'SET DYNAMIC CONTROLS FOR APPLICATION LIST
If DlgText$("app") = "&Doc List " Then
    If yourapp$ <> newapp$ And DlgValue("split") = 0 Then
        DlgText "left", "&Left"
        DlgText "right", "&Right"
    ElseIf yourapp$ <> newapp$ And DlgValue("split") = 1 Then
        DlgText "left", "&Top"
        DlgText "right", "&Bottom"
    ElseIf yourapp$ = newapp$ Then
        DlgText "left", "&Max."
        DlgText "right", "&Twice"
        DlgValue "leftright", 0
        DlgEnable "right", 0
    End If
End If If DlgText$("app") = "&Doc List" Then
If yourapp$ = newapp$ Then
    DlgEnable "split", 0
    DlgEnable "right", 0
ElseIf yourapp$ <> newapp$ Then
    DlgEnable "split", 1
    DlgEnable "right", 1
End If
End If 'HOLD FOCUS ON ACTIVATE IN SPECIAL MODE
If DlgText$("activ") = "&Normal" And DlgValue("keep") = 1 Then
    If DlgFocus$() <> "act" Then DlgFocus "act"
End If 'DIM STANDARD CONTROLS IF MAX IS SELECTED
If DlgText$("activ") = "&Window" And DlgText$("app") = "Tas&k
List" Then
```

```
        If yours = other And DlgValue("leftright") = 0 Then
            DlgEnable "split", 0
            Else
            DlgEnable "split", 1
 5      End If
        End If ' BANTER TEXT FOR DOCUMENT LIST
        If DlgText$("app") = "Tas&k List" Then
10          If yours = other And DlgValue("leftright") = 0 Then
            If CountWindows() > 1 Then
                DlgText$ "banter", "Choose OK to maximize your active
        document or select another one from the list."
            Else
15              DlgText$ "banter", "Choose OK to maximize your active
        document."
            End If
            ElseIf  yours = other And DlgValue("leftright") = 1 Then
        DlgText$ "banter", "Choose OK to display your active document
20      with itself."
            ElseIf yours <> other And DlgValue("split") = 0 Then
                DlgText$ "banter", "Choose OK to display your active
        document side by side another one."
            ElseIf yours <> other And DlgValue("split") = 1 Then
25              DlgText$ "banter", "Choose OK to display your active
        document above or below another one."
            End If
        End If 30      ' BANTER TEXT FOR APPLICATION  LIST
        If DlgText$("app") = "&Doc List" Then
            If yourapp$ = newapp$ Then
                DlgText$ "banter", "Choose OK to maximize Word or
        select another application from the list."
35          ElseIf yourapp$ <> newapp$ And DlgValue("split") = 0 Then
                DlgText$ "banter", "Choose OK to display Word side by
        side another application."
            ElseIf yourapp$ <> newapp$ And DlgValue("split") = 1 Then
                DlgText$ "banter", "Choose OK to display Word above or
40      below another application."
            End If
        End If Case Else
45      End Select
        End Function 'DISPLAY MAIN PANEL CONTROLS
        Sub ShowHideMainPanel(ShoworHide)
```

```
        For count = 0 To 3
        DlgVisible count, ShoworHide
        Next
        For count = 18 To 31
 5      DlgVisible count, ShoworHide
        Next
        End Sub 'DISPLAY DYNAMIC CONTROLS
10      Sub ShowHideDynamicPanel(ShowOrHide)
        For count = 4 To 8
        DlgVisible count, ShowOrHide
        Next
        End Sub
15
        'DISPLAY SPLIT PANEL CONTROLS
        Sub ShowHideSplitPanel(ShowOrHide)
        For count = 9 To 17
        DlgVisible count, ShowOrHide
20      Next
        End Sub 'DISPLAY HIDDEN PANEL CONTROLS
        Sub ShowHideHiddenPanel(ShowOrHide)
25      For count = 33 To 35
        DlgVisible count, ShowOrHide
        Next
        End Sub 30      'REFRESH ARRAY AND UPDATE TEXT
        Sub NewList
        On Error Goto zip
        before = DlgListBoxArray("winlist")      'RECORD WINDOW COUNT
        numwin = CountWindows() - 1
35      Dim WinList$(numwin)
        For count = 0 To numwin
            WinList$(count) = WindowName$(count + 1)
        Next
        DlgListBoxArray "winlist", WinList$()
40
        'UPDATE WINDOW VARIABLES
        yours$ = WindowName$()
        other$ = WindowName$()
        yours = Window()
45      other = Window()
        DlgValue "winlist", yours - 1
        DlgFocus "winlist"
        DlgText$ "can", "Close"
        DlgText$ "all", "&View All"
```

```
        previewfilename$ = FileNameFromWindow$(other)
        'THIS TEMPORARILY MAKES AN UNSAVED DOCUMENT THE ACTIVE ONE SO
        THAT THE FILE PREVIEW STATEMENT CAN WORK
        If previewfilename$ = "" Then
 5          WindowList other
        Stop
            DlgFilePreview$
            WindowList yours
        Else
10          DlgFilePreview$ previewfilename$
        End If zip:
        x = 0
15      End Sub 'APPLICATION ARRAY
        Sub AppList 20      hWnd = GetDesktopWindow
        LockWindowUpdate(hWnd)
        AppHide "View2 Plus"
        If InStr(AppInfo$(1), "95") <> 0 Then AppHide "Program Manager"
        Dim AppNames$(AppCount()), TempArray$(AppCount())
25      AppGetNames TempArray$()
        For x = 0 To AppCount() - 1
            If IsWindowVisible(FindWindow(0, TempArray$(x))) = 1 Then
                AppNames$(num) = TempArray$(x)
                num = num + 1
30          End If
        Next x
        AppNames$(num) = ""
        SortArray AppNames$(), 0, 0, num - 1
        DlgListBoxArray "applist", AppNames$()
35
        If InStr(AppInfo$(1), "95") <> 0 Then
            AppShow "Program Manager"
            AppActivate, 1
        End If
40      AppShow "View2 Plus"
        LockWindowUpdate(0)
        ScreenRefresh DlgText "applist", "Microsoft Word"
45      yourapp$ = DlgText$("applist")
        newapp$ = DlgText$("applist")
        End Sub

'ARRANGE DIFFERENT WINDOWS
```

81

```
    Sub ArrangeWindows
    On Error Goto problem

'GET SIZING VARIABLES FOR PROTECTED DOCUMENTS
5   If CommandValid("ToolsProtectDocument") = 0 Then
        FileNewDefault
        If DocMaximize() Or DocMinimize() Then DocRestore
        DocSize(Val(AppInfo$(6)) / 2), Val(AppInfo$(7))    'SIZE
    WINDOW
10      docwidth = DocWindowWidth()'SET VARIABLE FOR DOC WIDTH
        DocSize(Val(AppInfo$(6)), Val(AppInfo$(7)) / 2)    'SIZE
    WINDOW
        docheight = DocWindowHeight()'SET VARIABLE FOR DOC HEIGHT
        FileClose
15  End If 'VERTICAL SPLIT
    If DlgValue("split") = 0 Then
        If DocMaximize() Or DocMinimize() Then DocRestore
20      If MacroNameFromWindow$() = "" Then ViewZoom100 Else
    ViewZoom .ZoomPercent = "100"
        ToolsOptionsView .WrapToWindow = 1 'WRAP TEXT
        DocSize(Val(AppInfo$(6)) / 2), Val(AppInfo$(7))    'SIZE
    WINDOW
25      If CommandValid("ToolsProtectDocument") Then docwidth =
    DocWindowWidth()
        If DlgValue("leftright") = 0 Then DocMove 0, 0    Else
    DocMove(docwidth), 0           ' SET LEFT/RIGHT 30  ' ACTIVE DOCUMENT
        WindowList yours
        If DocMaximize() Or DocMinimize() Then DocRestore
        If MacroNameFromWindow$() = "" Then ViewZoom100 Else
    ViewZoom .ZoomPercent = "100"
35      ToolsOptionsView .WrapToWindow = 1 'WRAP TEXT
        DocSize(Val(AppInfo$(6)) / 2), Val(AppInfo$(7))    'SIZE
    WINDOW
        If DlgValue("leftright") = 0 Then DocMove(docwidth), 0
        Else DocMove 0, 0   'SET LEFT/RIGHT
40  End If 'HORIZONTAL SPLIT
    If DlgValue("split") = 1 Then
        If DocMaximize() Or DocMinimize() Then DocRestore
45      If MacroNameFromWindow$() = "" Then ViewZoom100 Else
    ViewZoom .ZoomPercent = "100"
        ToolsOptionsView .WrapToWindow = 0 'UNWRAP TEXT
        DocSize(Val(AppInfo$(6)), Val(AppInfo$(7)) / 2)    'SIZE
    WINDOW
```

```
        If CommandValid("ToolsProtectDocument") Then docheight =
DocWindowHeight()
        If DlgValue("leftright") = 0 Then DocMove 0, 0    Else
DocMove 0,(docheight)     ' SET TOP/BOTTOM ' ACTIVE DOCUMENT
        WindowList yours
        If DocMaximize() Or DocMinimize() Then DocRestore
        If MacroNameFromWindow$() = "" Then ViewZoom100 Else
ViewZoom .ZoomPercent = "100"
        ToolsOptionsView .WrapToWindow = 0 'UNWRAP TEXT
        DocSize(Val(AppInfo$(6)), Val(AppInfo$(7)) / 2)    'SIZE
WINDOW
        If DlgValue("leftright") = 0 Then DocMove 0,(docheight)
        Else DocMove 0, 0    'SET TOP/BOTTOM
End If
problem:
End Sub 'ARRANGE SAME WINDOWS
Sub SameWindows
On Error Goto problem 'MAXIMIZE WINDOW AND UNWRAP TEXT
If DlgValue("leftright") = 0 Then
        For count = 1 To CountWindows()
            WindowList(count)
            ToolsOptionsView .WrapToWindow = 0
        Next
        WindowList yours
        DocMaximize 1
Goto problem
End If 'GET SIZING VARIABLES FOR PROTECTED DOCUMENTS
If CommandValid("ToolsProtectDocument") = 0 Then
        FileNewDefault
        If DocMaximize() Or DocMinimize() Then DocRestore
        DocSize(Val(AppInfo$(6)) / 2), Val(AppInfo$(7))    'SIZE
WINDOW
        docwidth = DocWindowWidth()'SET VARIABLE FOR DOC WIDTH
        DocSize(Val(AppInfo$(6)), Val(AppInfo$(7)) / 2)    'SIZE
WINDOW
        If CommandValid("ToolsProtectDocument") Then docheight =
DocWindowHeight()
        FileClose
End If

'DISPLAY ACTIVE WINDOW WITH NEW WINDOW OF ITSELF
```

```
'VERTICAL SPLIT
If DlgValue("leftright") = 1 And DlgValue("split") = 0 Then
    If DocMaximize() Or DocMinimize() Then DocRestore
    If MacroNameFromWindow$() = "" Then ViewZoom100 Else
ViewZoom .ZoomPercent = "100"
    ToolsOptionsView .WrapToWindow = 1 'WRAP WINDOW
    DocSize(Val(AppInfo$(6)) / 2), Val(AppInfo$(7))   'HALF SIZE
    If CommandValid("ToolsProtectDocument") Then docwidth =
DocWindowWidth()
    DocMove(docwidth), 0       'SET RIGHT 'CREATE AND SIZE NEW WINDOW
    old = Window() 'NOTE ORIGINAL WINDOW LIST NUMBER
    WindowNewWindow
    If DocMaximize() Or DocMinimize() Then DocRestore
    If MacroNameFromWindow$() = "" Then ViewZoom100 Else
ViewZoom .ZoomPercent = "100"
    ToolsOptionsView .WrapToWindow = 1 'WRAP TEXT
    DocSize(Val(AppInfo$(6)) / 2), Val(AppInfo$(7))   'SIZE
WINDOW
    DocMove 0, 0   ' SET LEFT
    WindowList(old)     'ACTIVATE ORIGINAL WINDOW
End If 'HORIZONTAL SPLIT
If DlgValue("leftright") = 1 And DlgValue("split") = 1 Then
    If DocMaximize() Or DocMinimize() Then DocRestore
    If MacroNameFromWindow$() = "" Then ViewZoom100 Else
ViewZoom .ZoomPercent = "100"
    ToolsOptionsView .WrapToWindow = 0 'UNWRAP TEXT
    DocSize(Val(AppInfo$(6)), Val(AppInfo$(7)) / 2)   'SIZE
WINDOW
    If CommandValid("ToolsProtectDocument") Then docheight =
DocWindowHeight()
    DocMove 0,(docheight)     ' SET BOTTOM 'CREATE AND SIZE NEW WINDOW
    old = Window() 'NOTE ORIGINAL WINDOW LIST NUMBER
    WindowNewWindow
    If DocMaximize() Or DocMinimize() Then DocRestore
    If MacroNameFromWindow$() = "" Then ViewZoom100 Else
ViewZoom .ZoomPercent = "100"
    DocSize(Val(AppInfo$(6)), Val(AppInfo$(7)) / 2)    'SIZE
WINDOW
    DocMove 0, 0   'SET TOP
    WindowList(old)     'ACTIVATE ORIGINAL WINDOW
End If
problem:
End Sub
```

```
Sub halfcut

'GET SIZING VARIABLES FOR PROTECTED DOCUMENTS
If CommandValid("ToolsProtectDocument") = 0 Then
    FileNewDefault
    If DocMaximize() Or DocMinimize() Then DocRestore
    DocSize(Val(AppInfo$(6)) / 2), Val(AppInfo$(7))    'SIZE WINDOW
    docwidth = DocWindowWidth()'SET VARIABLE FOR DOC WIDTH
    DocSize(Val(AppInfo$(6)), Val(AppInfo$(7)) / 2)    'SIZE WINDOW
    docheight = DocWindowHeight()'SET VARIABLE FOR DOC HEIGHT
    FileClose
End If 'HORIZONTAL SPLIT
If DlgValue("splitsplit") = 1 Or DlgValue("splitsplit") = 3 Then
    If DocMaximize() Or DocMinimize() Then DocRestore
    If MacroNameFromWindow$() = "" Then ViewZoom100 Else ViewZoom .ZoomPercent = "100"
    ToolsOptionsView .WrapToWindow = 0 'UNWRAP TEXT
    DocSize(Val(AppInfo$(6)), Val(AppInfo$(7)) / 2)    'SIZE WINDOW
    If CommandValid("ToolsProtectDocument") Then docheight = DocWindowHeight()
    If DlgValue("splitsplit") = 1 Then DocMove 0, 0   Else DocMove 0,(docheight)     ' SET TOP/BOTTOM
End If 'VERTICAL SPLIT
If DlgValue("splitsplit") = 0 Or DlgValue("splitsplit") = 2 Then
    If DocMaximize() Or DocMinimize() Then DocRestore
    If MacroNameFromWindow$() = "" Then ViewZoom100 Else ViewZoom .ZoomPercent = "100"
    ToolsOptionsView .WrapToWindow = 1 'WRAP TEXT
    DocSize(Val(AppInfo$(6)) / 2), Val(AppInfo$(7))    'SIZE WINDOW
    If CommandValid("ToolsProtectDocument") Then docwidth = DocWindowWidth()
    If DlgValue("splitsplit") = 0 Then DocMove 0, 0   Else DocMove(docwidth), 0             ' SET LEFT/RIGHT
End If
out:
End Sub Sub quartercut 'GET SIZING VARIABLES FOR PROTECTED DOCUMENTS
If CommandValid("ToolsProtectDocument") = 0 Then
```

```
        FileNewDefault
        If DocMaximize() Or DocMinimize() Then DocRestore
        DocSize(Val(AppInfo$(6)) / 2), Val(AppInfo$(7))    'SIZE
WINDOW
5       docwidth = DocWindowWidth()'SET VARIABLE FOR DOC WIDTH
        DocSize(Val(AppInfo$(6)), Val(AppInfo$(7)) / 2)    'SIZE
WINDOW
        docheight = DocWindowHeight()'SET VARIABLE FOR DOC HEIGHT
        FileClose
10 End If 'TOP SPLIT
   If DlgValue("splitsplit") = 1 Then
        If DocMaximize() Or DocMinimize() Then DocRestore
15      If MacroNameFromWindow$() = "" Then ViewZoom100 Else
ViewZoom .ZoomPercent = "100"
        ToolsOptionsView .WrapToWindow = 1 'WRAP TEXT
            DocSize(Val(AppInfo$(6)) / 2, Val(AppInfo$(7)) / 2)
            DocMove 0, 0
20      If CommandValid("ToolsProtectDocument") Then docwidth =
DocWindowWidth()
        If CommandValid("ToolsProtectDocument") Then docheight =
DocWindowHeight()
        If DlgValue("leftrightsplit") = 0 Then DocMove 0, 0    Else
25 DocMove(docwidth), 0        'SET LEFT/RIGHT
   End If 'BOTTOM SPLIT
   If DlgValue("splitsplit") = 3 Then
30      If DocMaximize() Or DocMinimize() Then DocRestore
        If MacroNameFromWindow$() = "" Then ViewZoom100 Else
ViewZoom .ZoomPercent = "100"
        ToolsOptionsView .WrapToWindow = 1 'WRAP TEXT
            DocSize(Val(AppInfo$(6)) / 2, Val(AppInfo$(7)) / 2)
35          DocMove 0, 0
        If CommandValid("ToolsProtectDocument") Then docwidth =
DocWindowWidth()
        If CommandValid("ToolsProtectDocument") Then docheight =
DocWindowHeight()
40      If DlgValue("leftrightsplit") = 0 Then DocMove 0,(docheight)
Else DocMove(docwidth),(docheight)  'SET LEFT/RIGHT
   End If
   off:
   End Sub
45
   'CALL ARRANGE APP WINDOW MACRO
   Sub ArrangeApps If DlgEnable("split") = - 1 Then
```

```
    If DlgValue("split") = 0 Then
        If DlgValue("leftright") = 0 Then
            vert$ = "right"
        ElseIf DlgValue("leftright") = 1 Then
            vert$ = "left"
        End If
        timeout$ = Time$()
        OnTime timeout$, "View2PlusExtra16", 0
        If MacroNameFromWindow$() <> "" Then
            FileNewDefault
            fix$ = "kill"
            SetDocumentVar "macrowin", fix$
        End If
        SetDocumentVar "appos", vert$
        SetDocumentVar "appname", newapp$
    End If If DlgValue("split") = 1 Then
        If DlgValue("leftright") = 0 Then
            hoz$ = "top"
        ElseIf DlgValue("leftright") = 1 Then
            hoz$ = "bottom"
        End If
        timeout$ = Time$()
        OnTime timeout$, "View2PlusExtra16", 0
        If MacroNameFromWindow$() <> "" Then
            FileNewDefault
            fix$ = "kill"
            SetDocumentVar "macrowin", fix$
        End If
        SetDocumentVar "appos", hoz$
        SetDocumentVar "appname", newapp$
    End If
End If If DlgEnable("split") = 0 Then
    max$ = "yes"
    timeout$ = Time$()
    OnTime timeout$, "View2PlusExtra16", 0
    If MacroNameFromWindow$() <> "" Then
        FileNewDefault
        fix$ = "kill"
        SetDocumentVar "macrowin", fix$
    End If
    SetDocumentVar "appos", max$
    yourdoc$ = Str$(yours)    'CONVERT ACTIVE DOC # TO STRING FOR DOC VAR
    SetDocumentVar "actdoc", yourdoc$
End If
```

End Sub

C. THIS IS THE SUPPLEMENTAL MACRO OF THE SECOND
EMBODIMENT FOR WORD 6 (WITH 16-BIT API DECLARATIONS).

[IT CONTAINS THE CODE FOR SIZING AND POSITIONING APPLICATION
WINDOWS. IT IS ACTIVATED FROM THE MAIN MACRO USING A TIMER
MECHANISM BECAUSE THE MODAL DIALOG BOX IN THE MAIN MACRO HAS TO
BE CLOSED BEFORE THE WORD WINDOW CAN BE RESIZED.]

```
'PREVENT SCREEN REFRESH API DECLARATIONS
Declare Function GetDesktopWindow Lib "user"() As Integer
Declare Sub LockWindowUpdate Lib "user"(hWnd As Integer)

Sub MAIN

For x = 1 To 49
Print "View2 Plus:" + Str$(x) + "%"
Next x
Print "View2 Plus: 50%... please wait..."

On Error Goto ErrorRecovery
hWnd = GetDesktopWindow
LockWindowUpdate(hWnd)

'SET VARIABLES
fix$ = GetDocumentVar$("macrowin")
vert$ = GetDocumentVar$("appos")
hoz$ = GetDocumentVar$("appos")
max$ = GetDocumentVar$("appos")
newapp$ = GetDocumentVar$("appname")
yourdoc$ = GetDocumentVar$("actdoc")

'CLEAR DOC VARIABLES
SetDocumentVar "appos", ""
SetDocumentVar "appname", ""
SetDocumentVar "macrowin", ""
SetDocumentVar "docact", ""

If max$ <> "yes" Then
AppMaximize 1
appwidth = AppWindowWidth()         'SET VARIABLE FOR DOC WIDTH
appheight = AppWindowHeight()  'SET VARIABLE FOR DOC WIDTH
AppRestore

'SELECTED APP ON RIGHT
```

```
        If vert$ = "left" Then
            AppRestore newapp$
            AppRestore newapp$   'bug fix
            AppSize newapp$, appwidth / 2, appheight
            AppMove newapp$,(appwidth / 2), 0        ' SET LEFT/RIGHT
            AppSize appwidth / 2, appheight
            AppMove 0, 0           ' SET LEFT/RIGHT
            DocMaximize 1
            If MacroNameFromWindow$() = "" Then ViewNormal
            ToolsOptionsView .WrapToWindow = 1
        End If 'SELECTED APP ON LEFT
        If vert$ = "right" Then
            AppRestore newapp$
            AppRestore newapp$   'bug fix
            AppSize newapp$, appwidth / 2, appheight
            AppMove newapp$, 0, 0           ' SET LEFT/RIGHT
            AppSize appwidth / 2, appheight
            AppMove(appwidth / 2), 0        ' SET LEFT/RIGHT
            DocMaximize 1
            If MacroNameFromWindow$() = "" Then ViewNormal
            ToolsOptionsView .WrapToWindow = 1
        End If 'SELECTED APP ON BOTTOM
        If hoz$ = "bottom" Then
            AppRestore newapp$
            AppRestore newapp$   'bug fix
            AppSize newapp$, appwidth, appheight / 2
            AppMove newapp$, 0,(appheight / 2)       ' SET BOTTOM
            AppSize appwidth, appheight / 2
            AppMove 0, 0           ' SET TOP
            DocMaximize 1
            If MacroNameFromWindow$() = "" Then ViewNormal
            ToolsOptionsView .WrapToWindow = 0
        End If 'SELECTED APP ON TOP
        If hoz$ = "top" Then
            AppRestore newapp$
            AppRestore newapp$   'bug fix
            AppSize newapp$, appwidth, appheight / 2
            AppMove newapp$, 0, 0           ' SET TOP
            AppSize appwidth, appheight / 2
            AppMove 0,(appheight / 2)         ' SET BOTTOM
            DocMaximize 1
            If MacroNameFromWindow$() = "" Then ViewNormal
            ToolsOptionsView .WrapToWindow = 0
```

```
          End If
          End If

'MAXIMIZE WORD
 5        If max$ = "yes" Then
               AppMaximize 1
               For count = 1 To CountWindows()
                    WindowList(count)
                    ToolsOptionsView .WrapToWindow = 0
10             Next
               yours = Val(yourdoc$)'CONVERT ACTIVE DOC STRING TO #
               WindowList yours
               DocMaximize 1
          End If
15
          'CLOSE TEMP DOC FOR MACRO WINDOWS
          If fix$ = "kill" Then FileClose 2

ErrorRecovery:
20        LockWindowUpdate(0)

For x = 51 To 100
          Print "View2 Plus:" + Str$(x) + "%"
          Next x
25        Print "View2 Plus: 100%... complete."

End Sub
```

92

D. THE MAIN MACRO OF THE SECOND EMBODIMENT FOR WORD 7
   (WITH 32-BIT API DECLARATIONS).

[IT CONTAINS THE CODE FOR DIMENSIONING THE DOCUMENT AND
APPLICATION ARRAY, DISPLAYING THE DIALOG BOX, AND PREVIEWING,
SIZING, POSITION, AND ACTIVATING DOCUMENT WINDOWS. IT ALSO
CONTAINS A TIMER MECHANISM TO CALL THE SUPPLEMENTAL MACRO BECAUSE
WORDBASIC CANNOT CALL OTHER MACROS WITHOUT RETURNING CONTROL TO
THE CALLING MACRO.]

```
'DECLARE SHARED VARIABLES
Dim Shared WinList$, yours, yours$, other, other$, oldyours,
oldyours$, newyours, newyours$, yourapp$, newapp$, morepanel 'API DECLARATIONS FOR HELP FILE
Declare Function WinHelpA Lib "User32"(hWnd As Integer,
lpHelpFile As String, wCommand As Integer, dwData As String) As
Integer 'API DECLARATIONS FOR TASK LIST
Declare Function FindWindowA Lib "user32"(ClassName As Long,
WindowTitle$) As Integer
Declare Function IsWindowVisible Lib "user32"(hWnd As Integer) As
Integer 'PREVENT SCREEN REFRESH API DECLARATIONS
Declare Function GetDesktopWindow Lib "user32"() As Integer
Declare Sub LockWindowUpdate Lib "user32"(hWnd As Integer)

Sub MAIN
ScreenUpdating 0
DisableInput 1
On Error Goto bye

'OPEN DOCUMENT IF NONE OPEN
If Window() = 0 Then
    FileNewDefault
    DocMaximize 1
    morepanel = 1
End If

'PRINT PREVIEW MESSAGE
```

```
        If MacroNameFromWindow$() = "" Then
            If FilePrintPreview() = - 1 Then
            button =  MsgBox("Would you like to exit print preview and
        use View2 Plus?", "View2 Plus", 36)
 5              If button = - 1 Then
                    ClosePreview
                Else
                Goto bye
                End If
10          End If
        End If 'NOTE NAME AND NUMBER OF ACTIVE DOC
        yours$ = WindowName$()
15      yours = Window()

'DIMENSION THE WINDOW ARRAY
        numwin = CountWindows() - 1
        Dim WinList$(numwin)
20      For count = 0 To numwin
            WinList$(count) = WindowName$(count + 1)
        Next 'DIMENSION THE APPLICATION ARRAY
25      If InStr(AppInfo$(1), "95") <> 0 Then
            AppHide "Program Manager"
        End If
        Dim AppNames$(AppCount()), TempArray$(AppCount())
        AppGetNames TempArray$()
30      For x = 0 To AppCount() - 1
            If IsWindowVisible(FindWindowA(0, TempArray$(x))) = 1 Then
                AppNames$(num) = TempArray$(x)
                num = num + 1
            End If
35      Next x
        AppNames$(num) = ""
        SortArray AppNames$(), 0, 0, num - 1
        If InStr(AppInfo$(1), "95") <> 0 Then
            AppShow "Program Manager"
40          AppActivate "Microsoft Word", 1
        End If 'DISPLAY THE DIALOG BOX
        Begin Dialog UserDialog 550, 235, "View2 Plus", .view2plus
45
            'MAIN PANEL
            Text 17, 7, 395, 14, "Text", .active              '0
            Text 255, 7, 160, 14, "Text", .selected           '1
            ListBox 15, 23, 220, 123, WinList$(), .winlist    '2
```

94

```
          ListBox 15, 23, 379, 123, AppNames$(), .applist    '3

'DYNAMIC PANEL
          GroupBox 15, 153, 222, 50, "Text", .putit           '4
  5       OptionGroup .leftright                              '5
              OptionButton 38, 169, 95, 19, "Text", .left    '6
              OptionButton 140, 169, 80, 19, "Text", .right        '7
          Text 17, 208, 370, 26, "Text", .banter          '8

10       'HIDDEN SPLIT PANEL
          GroupBox 15, 153, 222, 80, "Text", .splitit
          '9
          OptionGroup .leftrightsplit        'QUARTER            '10
              OptionButton 28, 185, 95, 19, "&Left", .leftsplit
 15       '11
              OptionButton 140, 185, 80, 19, "&Right", .rightsplit
          '12
          OptionGroup .splitsplit            'HALF/QUARTER       '13
              OptionButton 28, 185, 95, 19, "&Left", .lefthalfsplit
 20       '14
              OptionButton 85, 164, 105, 19, "&Top", .versplit
          '15
              OptionButton 140, 185, 80, 19, "&Right",
 .righthalfsplit       '16
 25           OptionButton 85, 209, 105, 19, "&Bottom", .hozsplit
              '17

'MAIN PANEL
          FilePreview 255, 23, 140, 125, .prev                '18
 30       GroupBox 255, 153, 142, 50, "Text", .arrange '19
          OptionGroup .split                                  '20
              OptionButton 270, 164, 99, 19, "Text", .ver    '21
              OptionButton 270, 179, 99, 19, "Text", .hoz    '22
          CheckBox 255, 207, 160, 25, "K&eep the Dialog Box
 35   Displayed", .keep   '23
          OKButton 415, 6, 120, 20                            '24
          CancelButton 415, 30, 120, 20, .can                 '25
          PushButton 415, 54, 120, 20, "Text", .all           '26
          PushButton 415, 78, 120, 20, "Text", .act           '27
 40       PushButton 415, 102, 120, 20, "&Help", .help '28
          GroupBox 415, 130, 120, 100, "Mode", .file          '29
          PushButton 430, 150, 90, 20, "Text", .app           '30
          PushButton 430, 175, 90, 20, "Text", .activ         '31
          PushButton 430, 200, 90, 20, "Text", .fil           '32
 45
          'HIDDEN FILE PANEL
          PushButton 15, 210, 120, 20, "&Open File...", .open     '33
          PushButton 145, 210, 120, 20, "&Close File", .clos      '34
          PushButton 275, 210, 120, 20, "Co&py File...", .cop     '35
```

```
      End Dialog
      Dim dlg As UserDialog         'DEFINE DIALOG RECORD
  5   x = Dialog(dlg)     'DISPLAY THE DIALOG BOX
      bye:
      If Err = 26 Then
            Beep
            MsgBox "This command is not available because another dialog
 10   box is active.", - 2
      End If
      End Sub Function view2plus(id$, action, suppvalue)
 15   On Error Goto exit
      'INITIALIZE DIALOG
      Select Case action 'INITIALIZE DIALOG
 20   Case 1
      ShowHideSplitPanel 0

'SHOW HIDDEN FILE PANEL IF ONLY DEFAULT DOC OPEN
      If morepanel = 1 Then
 25         DlgText "fil", "Hi&de"
            DlgVisible "banter", 0
            ShowHideHiddenPanel 1
            DlgEnable "clos", 0
      Else
 30         DlgText$ "fil", "&File"
            ShowHideHiddenPanel 0
      End If DlgVisible "applist", 0
 35   DlgVisible "keep", 0
      DlgEnable "split", 0
      DlgEnable "act", 0

'PRESELECT ACTIVE DOCUMENT IN LISTBOX
 40   DlgValue "winlist", yours - 1

'RETURN NAME OF ACTIVE DOCUMENT
      DlgText$ "active", "View " + yours$
      DlgText$ "selected", ""
 45
      'RETURN NAME OF SELECTED DOCUMENT
      other$ = DlgText$("winlist")
      DlgText$ "putit", "Show"
```

```
    'SET CONTROL NAMES
    DlgText$ "all", "&View All"
    DlgText$ "activ", "&Window"
    DlgText$ "can", "Cancel"
5   DlgText$ "ver", "&Vertical"
    DlgText$ "hoz", "Hori&zontal "
    DlgText$ "act", "Switc&h To"
    DlgText$ "app", "Tas&k List"
    DlgText$ "arrange", "Arrange"
10  DlgText$ "left", "&Max."
    DlgText$ "right", "&Twice"

Case 2
    'NOTE NAME AND NUMBER OF SELECTED DOC
15  other$ = DlgText$("winlist")
    other  = DlgValue("winlist") + 1

'NOTE NAME OF SELECTED APPLICATION
    newapp$ = DlgText$("applist")
20
    'BUTTON CONTROL
    If id$ = "can" Then
        thisone$ = WindowName$(yours)
        Activate thisone$
25      Goto exit
    End If If id$ = "OK" Then
    WindowList other
30      If DlgText$("app") = "Tas&k List" Then
            If yours = other And DlgValue("leftright") = 0 And
        DlgText$("activ") = "&Window" Then Goto pass 'IF ONLY
    MAXIMIZING
        If DlgText$("activ") = "&Normal" Then Goto thisbit
35      If yours <> other Then ArrangeWindows    'CALL ARRANGE
    WINDOWS SUBROUTINE
        If yours = other Then
            If MacroNameFromWindow$() <> "" Then    'TEST FOR MACRO
    WINDOW
40          MsgBox "This command is not available with macro
    windows.", "View2 Plus", 48
            WindowList yours
            view2plus = 1
            Goto again
45          End If
        End If
    pass:
    If yours = other Then SameWindows   'CALL SAME WINDOWS SUBROUTINE
    Goto exit
```

```
      thisbit:
      If DlgValue("split") = 0 Then Call halfcut
      If DlgValue("split") = 1 Then Call quartercut
      Goto exit
 5    Else
      ArrangeApps
      End If
      End If
      again:
10
      'OPEN FILE DIALOG
      If id$ = "open" Then
          view2plus = 1
      Dim dlg As FileOpen
15    GetCurValues dlg n = Dialog(dlg)
      Return$ = dlg.Name
      If Return$ = "" Then Goto exit
20    Return$ = Return$ + " "
      While Return$ <> ""
          If Left$(Return$, 1) = Chr$(34) Then
              FName$ = Left$(Return$, InStr(2, Return$, Chr$(34)))
              Return$ = LTrim$(Mid$(Return$, Len(FName$) + 1))
25        Else
              FName$ = Left$(Return$, InStr(1, Return$, Chr$(32)))
              Return$ = LTrim$(Mid$(Return$, Len(FName$)))
          End If
      FileOpen FName$
30    Call NewList
      DocMaximize 1
      ScreenRefresh
      Wend 35    view2plus = 1
      End If 'CLOSE FILE
      If id$ = "clos" Then
40        before = CountWindows()   'RECORD WINDOW COUNT
          WindowList other
          Dim dlg As FileSummaryInfo
          GetCurValues dlg
          previewfilename$ = dlg.Template
45        If CommandValid("DlgFilePreview$ previewfilename$") = - 1
      Then
              DlgFilePreview$ previewfilename$
          Else
              FileNewDefault
```

```
                Dim dlg As FileSummaryInfo
                GetCurValues dlg
                previewfilename$ = dlg.Template
                DlgFilePreview$ previewfilename$
 5              FileClose 2
            End If
            DocClose 0
            If before > CountWindows() Then
                Call NewList
10          ScreenRefresh
            Else
                WindowList yours
                previewfilename$ = FileNameFromWindow$(other)
                DlgFilePreview$ previewfilename$
15          End If
            view2plus = 1
        End If 'COPY/SAVE FILE
20      If id$ = "cop" Then
            view2plus = 1
            WindowList other 'GET PATH OF SELECTED FILE AND DISPLAY SAVE AS DIALOG BOX
25          If FileNameFromWindow$() <> "" Then
                oldyours$ = FileName$()
                oldyours = Window()
                Dim dlg As FileSaveAs
                Dialog dlg
30              FileSaveAs dlg
                newyours$ = FileName$()
                newyours = Window()
                    If oldyours$ <> newyours$ Then
                    Call NewList    'REFRESH ARRAY
35              DocMaximize 1

'QUICK UPDATE BEHIND MESSAGE BOX
                DlgValue "winlist", yours - 1
                yours$ = WindowName$()
40              DlgText$ "active", "View " + yours$
                DlgText$ "selected", ""
                DlgText$ "putit", "Show"
                DlgText$ "left", "&Max."
                DlgText$ "right", "&Twice"
45              DlgEnable "split", 0
                ScreenRefresh 'GIVE COPY OPTION
        button = MsgBox("Would you like to reopen the document you
```

```
              copied?" + Chr$(10) + oldyours$, "View2 Plus", 36)
                  If button = - 1 Then        'YES
                          FileOpen oldyours$
                          Call NewList         'REFRESH ARRAY
 5                        DocMaximize 1
                          oldyours = ()        'EMPTY VARIABLES
                          newyours = ()
                          oldyours$ = ""
                          newyours$ = ""
10                Else                         'NO
                          WindowList yours
                          view2plus = 1
                          oldyours = ()        'EMPTY VARIABLES
                          newyours = ()
15                        oldyours$ = ""
                          newyours$ = ""
                  End If
            End If
            view2plus = 1
20     End If 'IF FILE IS NOT SAVED
       If FileNameFromWindow$() = "" Then
            button = MsgBox("Would you like to save " + other$ + "?",
25     "View2 Plus", 36)
            If button = - 1 Then
                  Dim dlg As FileSaveAs
                  Dialog dlg
                  FileSaveAs dlg
30                Call NewList
                  WindowList yours
            Else
                  WindowList yours
            End If
35     End If
       End If 'ACTIVATE COMMAND
       If id$ = "act" Then
40     If DlgText$("app") = "Tas&k List" Then
            thisone$ = WindowName$(other)
            Activate thisone$
            If DocMinimize() Then
                  DocMaximize 1
45                DlgText$ "all", "&View All"
            End If
            yours = Window()
            yours$ = DlgText$("winlist")
            If DlgText$("activ") = "&Normal" Then

100
```

```
            If DlgValue("split") = 0 Then Call halfcut
            If DlgValue("split") = 1 Then Call quartercut
            End If
            DlgText "left", "&Max."
5           DlgText "right", "&Twice"
            DlgText$ "can", "Close"
            DlgFocus "winlist"
            ScreenRefresh
            view2plus = 1
10     ElseIf DlgText$("app") = "&Doc List" Then
            DlgFocus "applist"
            If AppRestore(newapp$) Then
                 hWnd = GetDesktopWindow
                 LockWindowUpdate(hWnd)
15               AppMinimize newapp$
                 LockWindowUpdate(0)
            End If
            AppRestore newapp$
            ScreenRefresh
20     End If
       view2plus = 1
       End If 'PRESS FILE FOR HIDDEN CONTROLS
25     If id$ = "fil" Then
            view2plus = 1
            If DlgText$("fil") = "&File" Then
            DlgText "fil", "Hi&de"
            DlgVisible "banter", 0
30          ShowHideHiddenPanel 1
            view2plus = 1
       Else
            DlgText "fil", "&File"
            DlgVisible "banter", 1
35          ShowHideHiddenPanel 0
            view2plus = 1
       End If
       End If 40     'PRESS HELP TO CALL HELP FILE
       If id$ = "help" Then
       progdir$ =
       GetPrivateProfileString$("HKEY_CURRENT_USER\software\Microsoft\Wo
       rd\7.0\Options", "ProgramDir", "")
45
            If  DlgText$("app") = "&Doc List" Then
       x = WinHelp(hWnd, "progdir$\vew2plus.hlp", 257, "Task List Mode")
            ElseIf DlgText$("activ") = "&Normal" Then
       x = WinHelp(hWnd, "progdir$\vew2plus.hlp", 257, "Window Mode")
```

101

```
              ElseIf DlgText$("fil") = "Hi&de" Then
     x = WinHelp(hWnd, "progdir$\vew2plus.hlp", 257, "File Mode")
              Else
     x = WinHelp(hWnd, "progdir$\vew2plus.hlp", 257, "Normal Mode")
 5            End If view2plus = 1
      End If 10    'TOGGLE BUTTON DOC/TASK LIST
      If id$ = "app" Then
              view2plus = 1
          If  DlgText$("app") = "Tas&k List" Then
                  If DlgText$("activ") = "&Normal" Then
15                    DlgText$ "activ", "&Window"
                      DlgText$ "act", "Switc&h To"
                      ShowHideSplitPanel 0
                      ShowHideDynamicPanel 1
                  End If
20                before = DlgValue("winlist") + 1
                  Call AppList
                  DlgVisible "winlist", 0
                  DlgVisible "prev", 0
                  DlgVisible "keep", 0
25                DlgVisible "applist", 1
                  DlgFocus "applist"
                  DlgText "app", "&Doc List"
                  DlgText "arrange", "Arrange"
                  DlgText "active", "View Microsoft Word"
30                DlgText$ "selected", ""
                  DlgText "ver", "&Vertical"
                  DlgText "hoz", "Hori&zontal"
                  DlgEnable "OK", 1
                  DlgEnable "all", 0
35                DlgEnable "activ", 0
                  DlgEnable "fil", 0
                  DlgText "fil", "&File"
                  ShowHideHiddenPanel 0
                  DlgVisible "banter", 1
40                view2plus = 1
              Else
                  other = yours
                  Call NewList
                  DlgValue "winlist", yours - 1
45                DlgVisible "applist", 0
                  DlgVisible "winlist", 1
                  DlgVisible "prev", 1
                  DlgText "app", "Tas&k List"
                  DlgText "active", "View " + yours$
```

```
                    DlgText$ "selected", ""
                    DlgEnable "active", 1
                    DlgEnable "all", 1
                    DlgEnable "activ", 1
 5                  DlgEnable "fil", 1
                    DlgEnable "right", 1
                    DlgFocus "winlist"
                    view2plus = 1
            End If
10      End If 'TOGGLE BUTTON(SPECIAL/NORMAL SPLIT)
        If id$ = "activ" Then
            If  DlgText$("activ") = "&Window" Then
15              DlgText "activ", "&Normal"
                DlgText "act", "&Activate"
                DlgText$ "active", "Choose a document:"
                DlgText$ "selected", ""
                DlgText$ "splitit", "Show " + other$
20              DlgText "ver", "Hal&f"
                DlgText "hoz", "&Quarter"
                DlgText$ "arrange", "Size"
                ShowHideDynamicPanel 0
                ShowHideSplitPanel 1
25              DlgEnable "split", 1
                DlgEnable "OK", 0
                DlgEnable "fil", 0
                DlgText "fil", "&File"
                ShowHideHiddenPanel 0
30              DlgVisible "keep", 1
                DlgValue "keep", 0
                view2plus = 1
            Else
                DlgText "activ", "&Window"
35              DlgText "act", "Switc&h To"
                DlgText "active", "View " + yours$
                DlgText$ "selected", ""
                DlgText "ver", "&Vertical"
                DlgText "hoz", "Hori&zontal"
40              DlgText$ "arrange", "Arrange"
                ShowHideSplitPanel 0
                DlgVisible "keep", 0
                ShowHideDynamicPanel 1
                DlgEnable "active", 1
45              DlgEnable "act", 1
                DlgEnable "OK", 1
                DlgEnable "fil", 1
                DlgFocus "winlist"
                view2plus = 1
```

```
            End If
    End If

'TOGGLE BUTTON(MAXIMIZE/VIEW ALL/MINIMIZE)
5   If id$ =  "all" Then
        If  DlgText$("all") = "Mi&n. All" Then
            For count = 1 To CountWindows()
                WindowList(count)
                DocMinimize
10          Next
            thisone$ = WindowName$(yours)
            Activate thisone$
            view2plus = 1
            DlgText$ "all", "Ma&x. All"
15          ScreenRefresh
        ElseIf DlgText$("all") = "Ma&x. All" Then
            For count = 1 To CountWindows()
                WindowList(count)
                DocMaximize 1
20          Next
            WindowList yours
            view2plus = 1
            DlgText$ "all", "&View All"
            DlgFocus "winlist"
25          ScreenRefresh
        Else
            For count = 1 To CountWindows()
                WindowList(count)
                If DocMaximize() Or DocMinimize() Then DocRestore
30          Next
            WindowList yours
            WindowArrangeAll
            DlgText$ "all", "Mi&n. All"
            DlgText$ "can", "Close"
35          ScreenRefresh
            view2plus = 1
        End If
    End If 40  Case Else
    exit:
    End Select 'DYNAMIC AND STATIC TEXT CONTROLS
45  Select Case action Case 1

'SET INITIAL BANTER TEXT
```

```
        If CountWindows() > 1 Then
            DlgText$ "banter", "Choose OK to maximize your active
        document or select another one from the list."
        Else
5           DlgText$ "banter", "Choose OK to maximize your active
        document."
        End If Case 2
10
        'DISPLAY FILE PREVIEW
        If DlgFocus$() = "winlist" Then
            previewfilename$ = FileNameFromWindow$(other)
            'THIS TEMPORARILY MAKES AN UNSAVED DOCUMENT THE ACTIVE ONE
15      SO THAT THE FILE PREVIEW STATEMENT CAN WORK
            If previewfilename$ = "" Then
                thisone$ = WindowName$(other)
                Activate thisone$
                DlgFilePreview$
20              thisone$ = WindowName$(yours)
                Activate thisone$
            Else
                DlgFilePreview$ previewfilename$
            End If
25      End If 'ENABLE/DISABLE SWITCH TO
        If DlgText$("app") = "Tas&k List" Then
        If DlgText$("activ") = "&Window" Then
30          If yours = other Then
                DlgEnable "act", 0
            Else
                DlgEnable "act", 1
            End If
35      End If
        End If 'ENABLE/DISABLE CLOSE FILE
        If CountWindows() = 1 Then
40          DlgEnable "clos", 0
        Else
            DlgEnable "clos", 1
        End If 45      'VIEW TEXT
        If DlgText$("app") = "&Doc List" Then
            If yourapp$ <> newapp$ Then
                other$ = DlgText$("winlist")
                DlgText$ "putit", "Show " + newapp$
```

```
                DlgText "active", "View Microsoft Word with " + newapp$
                DlgText$ "selected", ""
                DlgEnable "act", 1
          ElseIf yourapp$ = newapp$ Then
5               DlgText$ "putit", "Show"
                DlgText "active", "View Microsoft Word"
                DlgText$ "selected", ""
                DlgEnable "act", 0
          End If
10    End If If  DlgText$("activ") = "&Window" And DlgText$("app") = "Tas&k
      List" Then
          If other <> yours Then
15              DlgText$ "active", "View " + yours$ + " with:"
                DlgText$ "selected", other$
          ElseIf other = yours Then
                DlgText$ "active", "View " + yours$
                DlgText$ "selected", ""
20        End If
      End If 'SHOW TEXT
      If DlgText$("activ") = "&Normal" Then
25        If other <> yours Then
                other$ = DlgText$("winlist")
                DlgText$ "splitit", "Show " + other$
          ElseIf other = yours Then
                DlgText$ "splitit", "Show " + yours$
30        End If
      End If If DlgText$("app") = "Tas&k List" And DlgText$("activ") =
      "&Window" Then
35        If other <> yours Then
                other$ = DlgText$("winlist")
                DlgText$ "putit", "Show " + other$
          ElseIf other = yours Then
                DlgText$ "putit", "Show"
40        End If
      End If 'SET SPLIT DYNAMIC CONTROLS
      If DlgText$("activ") = "&Normal" And id$ = "activ" Or
45    DlgText$("activ") = "&Normal" And id$ = "ver" Or
      DlgText$("activ") = "&Normal" And id$ = "hoz" Then
          If DlgValue("split") = 1 Then          'QUARTER
                DlgVisible "lefthalfsplit", 0 'HIDE HALF LEFT
                DlgVisible "righthalfsplit", 0      'HIDE HALF RIGHT
```

```
            DlgVisible "leftrightsplit", 1     'SHOW RIGHT
            If DlgValue("splitsplit") = 0 Or DlgValue("splitsplit")
    = () Then 'LEFT OR NONE SELECTED
                DlgValue "leftrightsplit", 0   'SELECT LEFT
5               DlgValue "splitsplit", 1 'SELECT TOP
        ElseIf DlgValue("splitsplit") = 1 Then   'TOP SELECTED
                DlgValue "leftrightsplit", 0   'SELECT LEFT
                DlgValue "splitsplit", 1 'SELECT TOP
        ElseIf DlgValue("splitsplit") = 2 Then   'RIGHT SELECTED
10              DlgValue "splitsplit", 1 'SELECT TOP
                DlgValue "leftrightsplit", 1   'SELECT RIGHT
        ElseIf DlgValue("splitsplit") = 3 Then   'BOTTOM
    SELECTED
                DlgValue "leftrightsplit", 0   'SELECT LEFT
15              DlgValue "splitsplit", 3 'SELECT BOTTOM
            End If
        Else                                          'HALF
            DlgVisible "leftrightsplit", 0      'HIDE QUARTER LEFT
            DlgVisible "lefthalfsplit", 1 'SHOW HALF LEFT
20          DlgVisible "righthalfsplit", 1      'SHOW HALF RIGHT
            DlgValue "splitsplit", 0        'SELECT LEFT
            If DlgValue("leftrightsplit") = 0 Or
    DlgValue("leftrightsplit") = () Then   'LEFT OR NONE SELECTED
                DlgValue("splitsplit"), 0     'SELECT LEFT
25          Else
                DlgValue "splitsplit", 2 'SELECT RIGHT
            End If
        End If
    End If
30
    'ENABLE/DISABLE OK/ACTIVATE BUTTONS
    If DlgText$("activ") = "&Normal" Then
        If DlgValue("keep") = 0 Then
            DlgEnable "OK", 1
35          DlgEnable "act", 0
            DlgFocus "winlist"
        Else
            DlgEnable "OK", 0
            DlgEnable "act", 1
40      End If
    End If 'SET DYNAMIC CONTROLS FOR DOCUMENT LIST
    If DlgText$("activ") = "&Window" And DlgText$("app") = "Tas&k
45  List" Then
        If yours <> other And DlgValue("split") = 0 Then
            DlgText "left", "&Left"
            DlgText "right", "&Right"
        ElseIf yours <> other And DlgValue("split") = 1 Then
```

107

```
            DlgText "left", "&Top"
            DlgText "right", "&Bottom"
        ElseIf yours = other Then
            DlgText "left", "&Max."
 5          DlgText "right", "&Twice"
        End If
    End If 'SET DYNAMIC CONTROLS FOR APPLICATION LIST
10  If DlgText$("app") = "&Doc List" Then
        If yourapp$ <> newapp$ And DlgValue("split") = 0 Then
            DlgText "left", "&Left"
            DlgText "right", "&Right"
        ElseIf yourapp$ <> newapp$ And DlgValue("split") = 1 Then
15          DlgText "left", "&Top"
            DlgText "right", "&Bottom"
        ElseIf yourapp$ = newapp$ Then
            DlgText "left", "&Max."
            DlgText "right", "&Twice"
20          DlgValue "leftright", 0
            DlgEnable "right", 0
        End If
    End If 25  If DlgText$("app") = "&Doc List" Then
    If yourapp$ = newapp$ Then
        DlgEnable "split", 0
        DlgEnable "right", 0
    ElseIf yourapp$ <> newapp$ Then
30      DlgEnable "split", 1
        DlgEnable "right", 1
    End If
    End If 35  'HOLD FOCUS ON ACTIVATE IN SPECIAL MODE
    If DlgText$("activ") = "&Normal" And DlgValue("keep") = 1 Then
        If DlgFocus$() <> "act" Then DlgFocus "act"
    End If 40  'DIM STANDARD CONTROLS IF MAX IS SELECTED
    If DlgText$("activ") = "&Window" And DlgText$("app") = "Tas&k
    List" Then
    If yours = other And DlgValue("leftright") = 0 Then
        DlgEnable "split", 0
45      Else
        DlgEnable "split", 1
    End If
    End If
```

108

```
' BANTER TEXT FOR DOCUMENT LIST
If DlgText$("app") = "Tas&k List" Then
    If yours = other And DlgValue("leftright") = 0 Then
    If CountWindows() > 1 Then
        DlgText$ "banter", "Choose OK to maximize your active
document or select another one from the list."
    Else
        DlgText$ "banter", "Choose OK to maximize your active
document."
    End If
    ElseIf  yours = other And DlgValue("leftright") = 1 Then
DlgText$ "banter", "Choose OK to display your active document
with itself."
    ElseIf yours <> other And DlgValue("split") = 0 Then
        DlgText$ "banter", "Choose OK to display your active
document side by side another one."
    ElseIf yours <> other And DlgValue("split") = 1 Then
        DlgText$ "banter", "Choose OK to display your active
document above or below another one."
    End If
End If ' BANTER TEXT FOR APPLICATION  LIST
If DlgText$("app") = "&Doc List" Then
    If yourapp$ = newapp$ Then
        DlgText$ "banter", "Choose OK to maximize Word or
select another application from the list."
    ElseIf yourapp$ <> newapp$ And DlgValue("split") = 0 Then
        DlgText$ "banter", "Choose OK to display Word side by
side another application."
    ElseIf yourapp$ <> newapp$ And DlgValue("split") = 1 Then
        DlgText$ "banter", "Choose OK to display Word above or
below another application."
    End If
End If Case Else
End Select
End Function 'DISPLAY MAIN PANEL CONTROLS
Sub ShowHideMainPanel(ShoworHide)
For count = 0 To 3
DlgVisible count, ShoworHide
Next
For count = 18 To 31
DlgVisible count, ShoworHide
Next
End Sub
```

```
'DISPLAY DYNAMIC CONTROLS
Sub ShowHideDynamicPanel(ShowOrHide)
For count = 4 To 8
DlgVisible count, ShowOrHide
Next
End Sub 'DISPLAY SPLIT PANEL CONTROLS
Sub ShowHideSplitPanel(ShowOrHide)
For count = 9 To 17
DlgVisible count, ShowOrHide
Next
End Sub 'DISPLAY HIDDEN PANEL CONTROLS
Sub ShowHideHiddenPanel(ShowOrHide)
For count = 33 To 35
DlgVisible count, ShowOrHide
Next
End Sub 'REFRESH ARRAY AND UPDATE TEXT
Sub NewList
On Error Goto zip
before = DlgListBoxArray("winlist")      'RECORD WINDOW COUNT
numwin = CountWindows() - 1
Dim WinList$(numwin)
For count = 0 To numwin
    WinList$(count) = WindowName$(count + 1)
Next
DlgListBoxArray "winlist", WinList$()

'UPDATE WINDOW VARIABLES
yours$ = WindowName$()
other$ = WindowName$()
yours = Window()
other = Window()
DlgValue "winlist", yours - 1
DlgFocus "winlist"
DlgText$ "can", "Close"
DlgText$ "all", "&View All"

previewfilename$ = FileNameFromWindow$(other)
'THIS TEMPORARILY MAKES AN UNSAVED DOCUMENT THE ACTIVE ONE SO
THAT THE FILE PREVIEW STATEMENT CAN WORK
If previewfilename$ = "" Then
    WindowList other
Stop
    DlgFilePreview$
```

110

```
            WindowList yours
    Else
            DlgFilePreview$ previewfilename$
    End If zip:
    x = 0
    End Sub 'APPLICATION ARRAY
    Sub AppList hWnd = GetDesktopWindow
    LockWindowUpdate(hWnd)
    AppHide "View2 Plus"
    If InStr(AppInfo$(1), "95") <> 0 Then AppHide "Program Manager"
    Dim AppNames$(AppCount()), TempArray$(AppCount())
    AppGetNames TempArray$()
    For x = 0 To AppCount() - 1
            If IsWindowVisible(FindWindowA(0, TempArray$(x))) = 1 Then
                    AppNames$(num) = TempArray$(x)
                    num = num + 1
            End If
    Next x
    AppNames$(num) = ""
    SortArray AppNames$(), 0, 0, num - 1
    DlgListBoxArray "applist", AppNames$()

If InStr(AppInfo$(1), "95") <> 0 Then
            AppShow "Program Manager"
    End If AppShow "View2 Plus"
    LockWindowUpdate(0)
    ScreenRefresh DlgText "applist", "Microsoft Word"
    yourapp$ = DlgText$("applist")
    newapp$ = DlgText$("applist")
    End Sub 'ARRANGE DIFFERENT WINDOWS
    Sub ArrangeWindows
    On Error Goto problem 'GET SIZING VARIABLES FOR PROTECTED DOCUMENTS
    If CommandValid("ToolsProtectDocument") = 0 Then
            FileNewDefault
            If DocMaximize() Or DocMinimize() Then DocRestore
```

111

```
            DocSize(Val(AppInfo$(6)) / 2), Val(AppInfo$(7))    'SIZE
    WINDOW
            docwidth = DocWindowWidth()'SET VARIABLE FOR DOC WIDTH
            DocSize(Val(AppInfo$(6)), Val(AppInfo$(7)) / 2)    'SIZE
 5  WINDOW
            docheight = DocWindowHeight()'SET VARIABLE FOR DOC HEIGHT
            FileClose
    End If 10  'VERTICAL SPLIT
    If DlgValue("split") = 0 Then
            If DocMaximize() Or DocMinimize() Then DocRestore
            If MacroNameFromWindow$() = "" Then ViewZoom100 Else
    ViewZoom .ZoomPercent = "100"
15          ToolsOptionsView .WrapToWindow = 1 'WRAP TEXT
            DocSize(Val(AppInfo$(6)) / 2), Val(AppInfo$(7))    'SIZE
    WINDOW
            If CommandValid("ToolsProtectDocument") Then docwidth =
    DocWindowWidth()
20          If DlgValue("leftright") = 0 Then DocMove 0, 0    Else
    DocMove(docwidth), 0          ' SET LEFT/RIGHT ' ACTIVE DOCUMENT
            WindowList yours
25          If DocMaximize() Or DocMinimize() Then DocRestore
            If MacroNameFromWindow$() = "" Then ViewZoom100 Else
    ViewZoom .ZoomPercent = "100"
            ToolsOptionsView .WrapToWindow = 1 'WRAP TEXT
            DocSize(Val(AppInfo$(6)) / 2), Val(AppInfo$(7))    'SIZE
30  WINDOW
            If DlgValue("leftright") = 0 Then DocMove(docwidth), 0
            Else DocMove 0, 0    'SET LEFT/RIGHT
    End If 35  'HORIZONTAL SPLIT
    If DlgValue("split") = 1 Then
            If DocMaximize() Or DocMinimize() Then DocRestore
            If MacroNameFromWindow$() = "" Then ViewZoom100 Else
    ViewZoom .ZoomPercent = "100"
40          ToolsOptionsView .WrapToWindow = 0 'UNWRAP TEXT
            DocSize(Val(AppInfo$(6)), Val(AppInfo$(7)) / 2)    'SIZE
    WINDOW
            If CommandValid("ToolsProtectDocument") Then docheight =
    DocWindowHeight()
45          If DlgValue("leftright") = 0 Then DocMove 0, 0    Else
    DocMove 0,(docheight)      ' SET TOP/BOTTOM ' ACTIVE DOCUMENT
            WindowList yours
```

112

```
            If DocMaximize() Or DocMinimize() Then DocRestore
            If MacroNameFromWindow$() = "" Then ViewZoom100 Else
    ViewZoom .ZoomPercent = "100"
            ToolsOptionsView .WrapToWindow = 0 'UNWRAP TEXT
5           DocSize(Val(AppInfo$(6)), Val(AppInfo$(7)) / 2)    'SIZE
    WINDOW
            If DlgValue("leftright") = 0 Then DocMove 0,(docheight)
            Else DocMove 0, 0    'SET TOP/BOTTOM
        End If
10  problem:
    End Sub 'ARRANGE SAME WINDOWS
    Sub SameWindows
15  On Error Goto problem 'MAXIMIZE WINDOW AND UNWRAP TEXT
    If DlgValue("leftright") = 0 Then
            For count = 1 To CountWindows()
20                  WindowList(count)
                    ToolsOptionsView .WrapToWindow = 0
            Next
            WindowList yours
            DocMaximize 1
25  Goto problem
    End If 'GET SIZING VARIABLES FOR PROTECTED DOCUMENTS
    If CommandValid("ToolsProtectDocument") = 0 Then
30          FileNewDefault
            If DocMaximize() Or DocMinimize() Then DocRestore
            DocSize(Val(AppInfo$(6)) / 2), Val(AppInfo$(7))    'SIZE
    WINDOW
            docwidth = DocWindowWidth()'SET VARIABLE FOR DOC WIDTH
35          DocSize(Val(AppInfo$(6)), Val(AppInfo$(7)) / 2)    'SIZE
    WINDOW
            If CommandValid("ToolsProtectDocument") Then docheight =
    DocWindowHeight()
            FileClose
40  End If 'DISPLAY ACTIVE WINDOW WITH NEW WINDOW OF ITSELF
    'VERTICAL SPLIT
    If DlgValue("leftright") = 1 And DlgValue("split") = 0 Then
45          If DocMaximize() Or DocMinimize() Then DocRestore
            If MacroNameFromWindow$() = "" Then ViewZoom100 Else
    ViewZoom .ZoomPercent = "100"
            ToolsOptionsView .WrapToWindow = 1 'WRAP WINDOW
            DocSize(Val(AppInfo$(6)) / 2), Val(AppInfo$(7))    'HALF SIZE
```

113

```
            If CommandValid("ToolsProtectDocument") Then docwidth =
    DocWindowWidth()
            DocMove(docwidth), 0      'SET RIGHT 5      'CREATE AND SIZE NEW WINDOW
            old = Window() 'NOTE ORIGINAL WINDOW LIST NUMBER
            WindowNewWindow
            If DocMaximize() Or DocMinimize() Then DocRestore
            If MacroNameFromWindow$() = "" Then ViewZoom100 Else
10  ViewZoom .ZoomPercent = "100"
            ToolsOptionsView .WrapToWindow = 1 'WRAP TEXT
            DocSize(Val(AppInfo$(6)) / 2), Val(AppInfo$(7))    'SIZE
    WINDOW
            DocMove 0, 0    ' SET LEFT
15          WindowList(old)        'ACTIVATE ORIGINAL WINDOW
    End If 'HORIZONTAL SPLIT
    If DlgValue("leftright") = 1 And DlgValue("split") = 1 Then
20          If DocMaximize() Or DocMinimize() Then DocRestore
            If MacroNameFromWindow$() = "" Then ViewZoom100 Else
    ViewZoom .ZoomPercent = "100"
            ToolsOptionsView .WrapToWindow = 0 'UNWRAP TEXT
            DocSize(Val(AppInfo$(6)), Val(AppInfo$(7)) / 2)    'SIZE
25  WINDOW
            If CommandValid("ToolsProtectDocument") Then docheight =
    DocWindowHeight()
            DocMove 0,(docheight)    ' SET BOTTOM 30      'CREATE AND SIZE NEW WINDOW
            old = Window() 'NOTE ORIGINAL WINDOW LIST NUMBER
            WindowNewWindow
            If DocMaximize() Or DocMinimize() Then DocRestore
            If MacroNameFromWindow$() = "" Then ViewZoom100 Else
35  ViewZoom .ZoomPercent = "100"
            DocSize(Val(AppInfo$(6)), Val(AppInfo$(7)) / 2)    'SIZE
    WINDOW
            DocMove 0, 0    'SET TOP
            WindowList(old)        'ACTIVATE ORIGINAL WINDOW
40  End If
    problem:
    End Sub Sub halfcut
45
    'GET SIZING VARIABLES FOR PROTECTED DOCUMENTS
    If CommandValid("ToolsProtectDocument") = 0 Then
            FileNewDefault
            If DocMaximize() Or DocMinimize() Then DocRestore
```

```
            DocSize(Val(AppInfo$(6)) / 2), Val(AppInfo$(7))    'SIZE
      WINDOW
            docwidth = DocWindowWidth()'SET VARIABLE FOR DOC WIDTH
            DocSize(Val(AppInfo$(6)), Val(AppInfo$(7)) / 2)    'SIZE
 5    WINDOW
            docheight = DocWindowHeight()'SET VARIABLE FOR DOC HEIGHT
            FileClose
      End If 10    'HORIZONTAL SPLIT
      If DlgValue("splitsplit") = 1 Or DlgValue("splitsplit") = 3 Then
            If DocMaximize() Or DocMinimize() Then DocRestore
            If MacroNameFromWindow$() = "" Then ViewZoom100 Else
      ViewZoom .ZoomPercent = "100"
15          ToolsOptionsView .WrapToWindow = 0 'UNWRAP TEXT
            DocSize(Val(AppInfo$(6)), Val(AppInfo$(7)) / 2)    'SIZE
      WINDOW
            If CommandValid("ToolsProtectDocument") Then docheight =
      DocWindowHeight()
20          If DlgValue("splitsplit") = 1 Then DocMove 0, 0    Else
      DocMove 0,(docheight)     ' SET TOP/BOTTOM
      End If 'VERTICAL SPLIT
25    If DlgValue("splitsplit") = 0 Or DlgValue("splitsplit") = 2 Then
            If DocMaximize() Or DocMinimize() Then DocRestore
            If MacroNameFromWindow$() = "" Then ViewZoom100 Else
      ViewZoom .ZoomPercent = "100"
            ToolsOptionsView .WrapToWindow = 1 'WRAP TEXT
30          DocSize(Val(AppInfo$(6)) / 2), Val(AppInfo$(7))    'SIZE
      WINDOW
            If CommandValid("ToolsProtectDocument") Then docwidth =
      DocWindowWidth()
            If DlgValue("splitsplit") = 0 Then DocMove 0, 0    Else
35    DocMove(docwidth), 0           ' SET LEFT/RIGHT
      End If
      out:
      End Sub 40    Sub quartercut 'GET SIZING VARIABLES FOR PROTECTED DOCUMENTS
      If CommandValid("ToolsProtectDocument") = 0 Then
            FileNewDefault
45          If DocMaximize() Or DocMinimize() Then DocRestore
            DocSize(Val(AppInfo$(6)) / 2), Val(AppInfo$(7))    'SIZE
      WINDOW
            docwidth = DocWindowWidth()'SET VARIABLE FOR DOC WIDTH
            DocSize(Val(AppInfo$(6)), Val(AppInfo$(7)) / 2)    'SIZE
```

```
           WINDOW
                 docheight = DocWindowHeight()'SET VARIABLE FOR DOC HEIGHT
                 FileClose
           End If
 5
           'TOP SPLIT
           If DlgValue("splitsplit") = 1 Then
                 If DocMaximize() Or DocMinimize() Then DocRestore
                 If MacroNameFromWindow$() = "" Then ViewZoom100 Else
10         ViewZoom .ZoomPercent = "100"
                 ToolsOptionsView .WrapToWindow = 1 'WRAP TEXT
                      DocSize(Val(AppInfo$(6)) / 2, Val(AppInfo$(7)) / 2)
                      DocMove 0, 0
                 If CommandValid("ToolsProtectDocument") Then docwidth =
15         DocWindowWidth()
                 If CommandValid("ToolsProtectDocument") Then docheight =
           DocWindowHeight()
                 If DlgValue("leftrightsplit") = 0 Then DocMove 0, 0     Else
           DocMove(docwidth), 0      'SET LEFT/RIGHT
20         End If 'BOTTOM SPLIT
           If DlgValue("splitsplit") = 3 Then
                 If DocMaximize() Or DocMinimize() Then DocRestore
25               If MacroNameFromWindow$() = "" Then ViewZoom100 Else
           ViewZoom .ZoomPercent = "100"
                 ToolsOptionsView .WrapToWindow = 1 'WRAP TEXT
                      DocSize(Val(AppInfo$(6)) / 2, Val(AppInfo$(7)) / 2)
                      DocMove 0, 0
30               If CommandValid("ToolsProtectDocument") Then docwidth =
           DocWindowWidth()
                 If CommandValid("ToolsProtectDocument") Then docheight =
           DocWindowHeight()
                 If DlgValue("leftrightsplit") = 0 Then DocMove 0,(docheight)
35         Else DocMove(docwidth),(docheight) 'SET LEFT/RIGHT
           End If
           off:
           End Sub 40         'CALL ARRANGE APP WINDOW MACRO
           Sub ArrangeApps If DlgEnable("split") = - 1 Then
           If DlgValue("split") = 0 Then
45               If DlgValue("leftright") = 0 Then
                      vert$ = "right"
                 ElseIf DlgValue("leftright") = 1 Then
                      vert$ = "left"
                 End If
```

```
            timeout$ = Time$()
            OnTime timeout$, "View2PlusExtra32", 0
            If MacroNameFromWindow$() <> "" Then
                FileNewDefault
 5              fix$ = "kill"
                SetDocumentVar "macrowin", fix$
            End If
            SetDocumentVar "appos", vert$
            SetDocumentVar "appname", newapp$
10      End If If DlgValue("split") = 1 Then
            If DlgValue("leftright") = 0 Then
                hoz$ = "top"
15          ElseIf DlgValue("leftright") = 1 Then
                hoz$ = "bottom"
            End If
            timeout$ = Time$()
            OnTime timeout$, "View2PlusExtra32", 0
20          If MacroNameFromWindow$() <> "" Then
                FileNewDefault
                fix$ = "kill"
            SetDocumentVar "macrowin", fix$
            End If
25          SetDocumentVar "appos", hoz$
            SetDocumentVar "appname", newapp$
        End If
        End If 30      If DlgEnable("split") = 0 Then
            max$ = "yes"
            timeout$ = Time$()
            OnTime timeout$, "View2PlusExtra32", 0
            If MacroNameFromWindow$() <> "" Then
35              FileNewDefault
                fix$ = "kill"
                SetDocumentVar "macrowin", fix$
            End If
            SetDocumentVar "appos", max$
40          yourdoc$ = Str$(yours)    'CONVERT ACTIVE DOC # TO STRING FOR
    DOC VAR
            SetDocumentVar "actdoc", yourdoc$
        End If
        End Sub
```

E.  SUPPLEMENTAL MACRO OF THE SECOND EMBODIMENT
    FOR WORD 7 (WITH 32-BIT API DECLARATIONS).

[IT CONTAINS THE CODE FOR SIZING AND POSITIONING APPLICATION
WINDOWS.  IT IS ACTIVATED FROM THE MAIN MACRO USING A TIMER
MECHANISM BECAUSE THE MODAL DIALOG BOX IN THE MAIN MACRO HAS TO
BE CLOSED BEFORE THE WORD WINDOW CAN BE RESIZED.]

```
'PREVENT SCREEN REFRESH API DECLARATIONS
Declare Function GetDesktopWindow Lib "user32"() As Integer
Declare Sub LockWindowUpdate Lib "user32"(hWnd As Integer)

Sub MAIN

For x = 1 To 49
Print "View2 Plus:" + Str$(x) + "%"
Next x
Print "View2 Plus: 50%... please wait..."

On Error Goto ErrorRecovery
hWnd = GetDesktopWindow
LockWindowUpdate(hWnd)

'SET VARIABLES
fix$ = GetDocumentVar$("macrowin")
vert$ = GetDocumentVar$("appos")
hoz$ = GetDocumentVar$("appos")
max$ = GetDocumentVar$("appos")
newapp$ = GetDocumentVar$("appname")
yourdoc$ = GetDocumentVar$("actdoc")

'CLEAR DOC VARIABLES
SetDocumentVar "appos", ""
SetDocumentVar "appname", ""
SetDocumentVar "macrowin", ""
SetDocumentVar "docact", ""

If max$ <> "yes" Then
AppMaximize 1
appwidth = AppWindowWidth()      'SET VARIABLE FOR DOC WIDTH
appheight = AppWindowHeight() 'SET VARIABLE FOR DOC WIDTH
AppRestore

'SELECTED APP ON RIGHT
```

```
        If vert$ = "left" Then
            AppRestore newapp$
            AppRestore newapp$    'bug fix
            AppSize newapp$, appwidth / 2, appheight
            AppMove newapp$,(appwidth / 2), 0        ' SET LEFT/RIGHT
            AppSize appwidth / 2, appheight
            AppMove 0, 0            ' SET LEFT/RIGHT
            DocMaximize 1
            If MacroNameFromWindow$() = "" Then ViewNormal
            ToolsOptionsView .WrapToWindow = 1
        End If 'SELECTED APP ON LEFT
        If vert$ = "right" Then
            AppRestore newapp$
            AppRestore newapp$    'bug fix
            AppSize newapp$, appwidth / 2, appheight
            AppMove newapp$, 0, 0            ' SET LEFT/RIGHT
            AppSize appwidth / 2, appheight
            AppMove(appwidth / 2), 0        ' SET LEFT/RIGHT
            DocMaximize 1
            If MacroNameFromWindow$() = "" Then ViewNormal
            ToolsOptionsView .WrapToWindow = 1
        End If 'SELECTED APP ON BOTTOM
        If hoz$ = "bottom" Then
            AppRestore newapp$
            AppRestore newapp$    'bug fix
            AppSize newapp$, appwidth, appheight / 2
            AppMove newapp$, 0,(appheight / 2)        ' SET BOTTOM
            AppSize appwidth, appheight / 2
            AppMove 0, 0            ' SET TOP
            DocMaximize 1
            If MacroNameFromWindow$() = "" Then ViewNormal
            ToolsOptionsView .WrapToWindow = 0
        End If 'SELECTED APP ON TOP
        If hoz$ = "top" Then
            AppRestore newapp$
            AppRestore newapp$    'bug fix
            AppSize newapp$, appwidth, appheight / 2
            AppMove newapp$, 0, 0            ' SET TOP
            AppSize appwidth, appheight / 2
            AppMove 0,(appheight / 2)            ' SET BOTTOM
            DocMaximize 1
            If MacroNameFromWindow$() = "" Then ViewNormal
            ToolsOptionsView .WrapToWindow = 0
```

```
        End If
        End If

'MAXIMIZE WORD
  5     If max$ = "yes" Then
             AppMaximize 1
             For count = 1 To CountWindows()
                  WindowList(count)
                  ToolsOptionsView .WrapToWindow = 0
 10          Next
             yours = Val(yourdoc$)'CONVERT ACTIVE DOC STRING TO #
             WindowList yours
             DocMaximize 1
        End If
 15
        'CLOSE TEMP DOC FOR MACRO WINDOWS
        If fix$ = "kill" Then FileClose 2

ErrorRecovery:
 20     LockWindowUpdate(0)

For x = 51 To 100
        Print "View2 Plus:" + Str$(x) + "%"
        Next x
 25     Print "View2 Plus: 100%... complete."

End Sub

30
```

What is claimed is:

1. A method for the simultaneous display on a computer screen of selected document windows in a multiple document interface computer system by means of a dialog box interface, the method comprising the steps of:

(a) opening the dialog box interface;
   (b) selecting from within the dialog box interface document windows to be displayed and their screen display positions;
   (c) closing the dialog box interface;
   (d) displaying the selected document windows simultaneously on the computer screen at the selected screen positions.

2. A method according to claim 1 wherein an active document window is a first selected document window and wherein a user selects a second document window.

3. A method according to claim 2 wherein the first and second windows are tiled when displayed.

4. A method according to claim 3 wherein the first and second windows are tiled horizontally.

5. A method according to claim 3 wherein the first and second windows are tiled vertically.

6. A method according to claim 1 wherein the multiple document interface is for a word processing application.

7. A method according to claim 1 wherein the multiple document interface is for a desktop publishing application.

8. A multiple document interface computer system with a dialog box interface for the simultaneous display on a computer screen of selected document windows, comprising:

(a) means for opening the dialog box interface;
   (b) means for selecting in the dialog box interface document windows to be displayed;
   (c) means for selecting in the dialog box interface screen display positions of selected document windows;
   (d) means for closing the dialog box interface;
   (e) means for simultaneously displaying the selected document windows at the selected screen positions on the computer screen.

9. A computer system according to claim 8 wherein said means function in accordance with the source code set forth in section III. of the Source Code Appendix entitled A FIRST PREFERRED EMBODIMENT—VIEW2™.

10. A computer system according to claim 8 wherein said means function in accordance with the source code set forth in section III. of the Source Code Appendix entitled A SECOND PREFERRED EMBODIMENT—VIEW2™ PLUS.

* * * * *